(12) United States Patent
Katsu et al.

(10) Patent No.: US 11,762,539 B2
(45) Date of Patent: Sep. 19, 2023

(54) INFORMATION PROCESSING DEVICE AND INFORMATION PROCESSING METHOD TO NOTIFY AT AN APPROPRIATE TIMING

(71) Applicant: SONY CORPORATION, Tokyo (JP)

(72) Inventors: Masanori Katsu, Tokyo (JP); Takashi Ogata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/284,901

(22) PCT Filed: Aug. 28, 2019

(86) PCT No.: PCT/JP2019/033663
§ 371 (c)(1),
(2) Date: Apr. 13, 2021

(87) PCT Pub. No.: WO2020/084896
PCT Pub. Date: Apr. 30, 2020

(65) Prior Publication Data
US 2021/0357090 A1  Nov. 18, 2021

(30) Foreign Application Priority Data
Oct. 22, 2018  (JP) .................. 2018-198298

(51) Int. Cl.
*G01C 21/00* (2006.01)
*G06Q 10/1093* (2023.01)
(Continued)

(52) U.S. Cl.
CPC ........ *G06F 3/0484* (2013.01); *G01C 21/3811* (2020.08); *G06Q 10/1097* (2013.01); *G06Q 30/0201* (2013.01)

(58) Field of Classification Search
CPC .. G06F 3/0484; G06F 3/04847; G06F 3/0482; G06F 3/0488; G01C 21/3811;
(Continued)

(56) References Cited

U.S. PATENT DOCUMENTS

2011/0306304 A1* 12/2011 Forutanpour ..... H04M 1/72457
455/67.11
2012/0309363 A1  12/2012 Gruber et al.
(Continued)

FOREIGN PATENT DOCUMENTS

CN  102803898 A  11/2012
CN  102934467 A  2/2013
(Continued)

OTHER PUBLICATIONS

International Search Report and Written Opinion of PCT Application No. PCT/JP2019/033663 dated Nov. 19, 2019, 10 pages of ISRWO.
(Continued)

*Primary Examiner* — Jennifer N Welch
*Assistant Examiner* — Amy P Hoang
(74) *Attorney, Agent, or Firm* — CHIP LAW GROUP

(57) ABSTRACT

An information processing device includes a display control unit that displays map information including a plurality of points and a route between the plurality of points, and displays at least a setting screen that enables setting of a trigger and a task to be performed in a case where the trigger is established, on the basis of a predetermined input made to the map information.

20 Claims, 71 Drawing Sheets

(51) Int. Cl.
*G06F 3/0484* (2022.01)
*G06Q 30/0201* (2023.01)

(58) Field of Classification Search
CPC . G06Q 10/1097; G06Q 30/0201; G06Q 10/10
See application file for complete search history.

(56) References Cited

U.S. PATENT DOCUMENTS

| | | | | |
|---|---|---|---|---|
| 2013/0096823 | A1* | 4/2013 | Katou | G01C 21/3697 |
| | | | | 701/410 |
| 2013/0097092 | A1* | 4/2013 | Tully | G06Q 50/18 |
| | | | | 705/317 |
| 2014/0074526 | A1* | 3/2014 | Caudron | G06Q 10/0633 |
| | | | | 705/7.13 |
| 2014/0361997 | A1* | 12/2014 | Wen | G06F 3/04883 |
| | | | | 345/173 |
| 2016/0057572 | A1* | 2/2016 | Bojorquez Alfaro | |
| | | | | H04W 12/64 |
| | | | | 455/411 |
| 2017/0091696 | A1 | 3/2017 | Funakoshi et al. | |
| 2017/0131887 | A1* | 5/2017 | Kim | G04G 5/04 |
| 2017/0132200 | A1* | 5/2017 | Noland | G06Q 10/06 |

FOREIGN PATENT DOCUMENTS

| | | |
|---|---|---|
| EP | 2546607 A1 | 1/2013 |
| EP | 2580924 A1 | 4/2013 |
| EP | 3276989 A1 | 1/2018 |
| ES | 2760556 T3 | 5/2020 |
| HU | E047075 T2 | 4/2020 |
| JP | 2004-102928 A | 4/2004 |
| JP | 2009-199251 A | 9/2009 |
| JP | 2011-185908 A | 9/2011 |
| JP | 2013-538472 A | 10/2013 |
| JP | 2014-518409 A | 7/2014 |
| JP | 2015-153379 A | 8/2015 |
| JP | 2015-159564 A | 9/2015 |
| JP | 6049085 B2 | 12/2016 |
| JP | 2017-069730 A | 4/2017 |
| KR | 10-2013-0043150 A | 4/2013 |
| WO | 2011/111275 A1 | 9/2011 |
| WO | 2011/156789 A1 | 12/2011 |
| WO | 2013/179447 A1 | 12/2013 |

OTHER PUBLICATIONS

"Also for dump operation management ! Link location information and reminder", GeoAlerts, Dec. 17, 2013, 05 pages.
Extended European Search Report of EP Application No. 19875322.0, dated Nov. 11, 2021, 07 pages.
Abhishek Macwan, "4 Tasks Android Can Do Automatically When You Reach a Specific Location", Guidetech, XP055857000, Jan. 18, 2016, 8 pages.
Kyle Vanhemert, "IFTTT's Ingenious New Feature: Controlling Apps With Your Location", Wired, XP055856974, Dec. 12, 2013, 7 pages.

* cited by examiner

Zoom Out

Zoom In

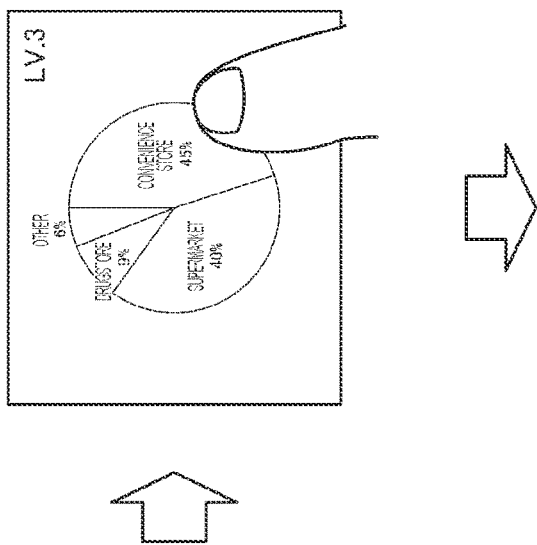
FIG. 31A  FIG. 31B  FIG. 31C
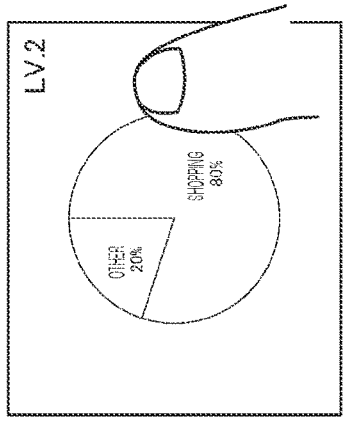
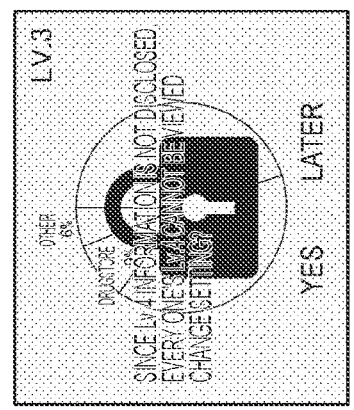
FIG. 31D
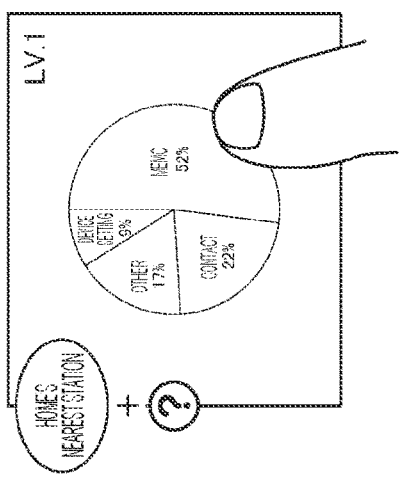
FIG. 31E
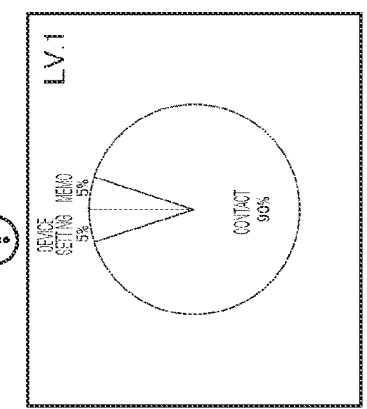

49

FIG. 33C
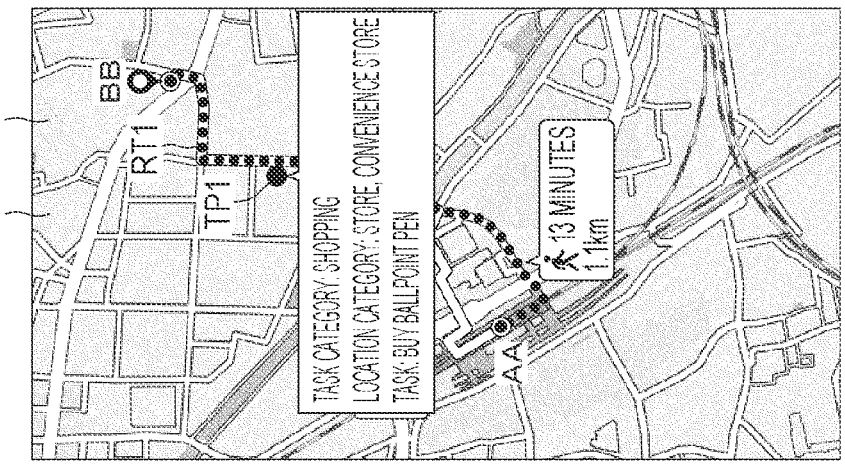
FIG. 33B
FIG. 33A
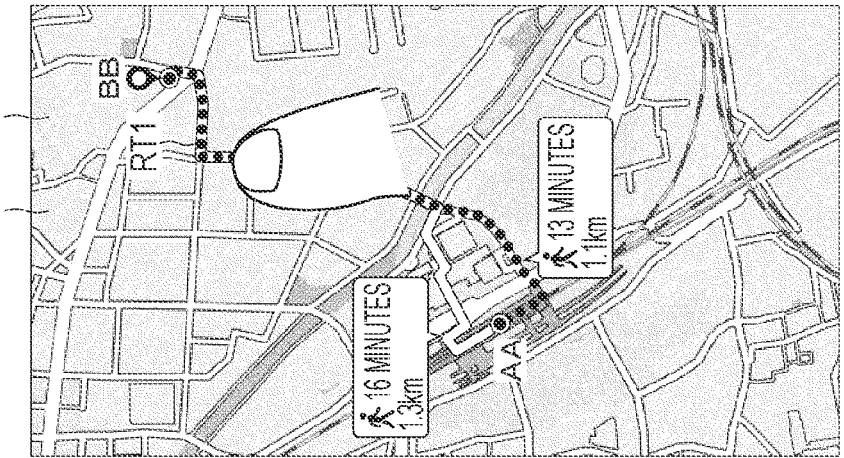

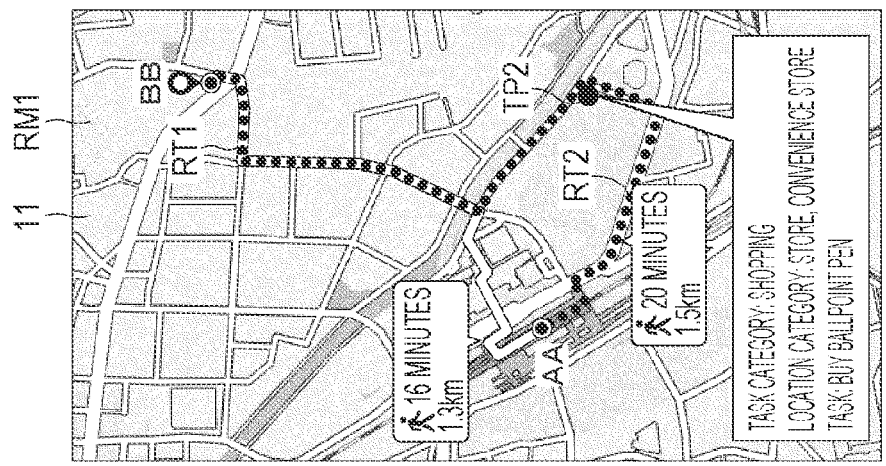
FIG. 34B
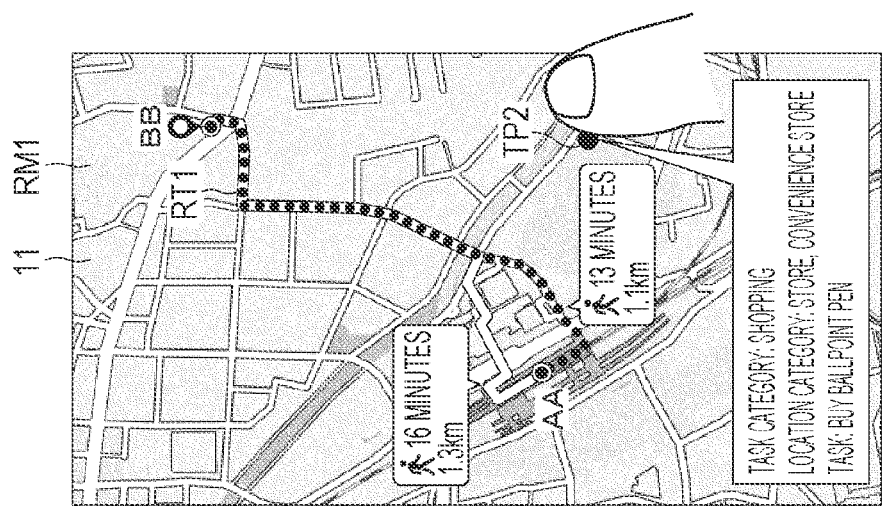
FIG. 34A

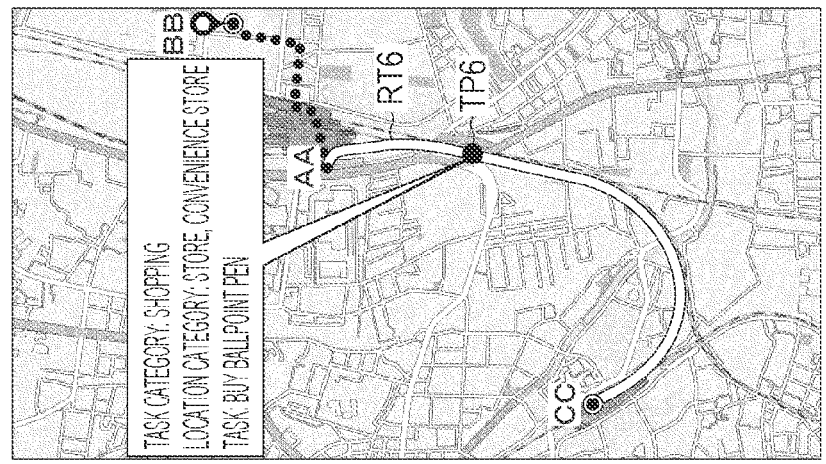
FIG. 36B
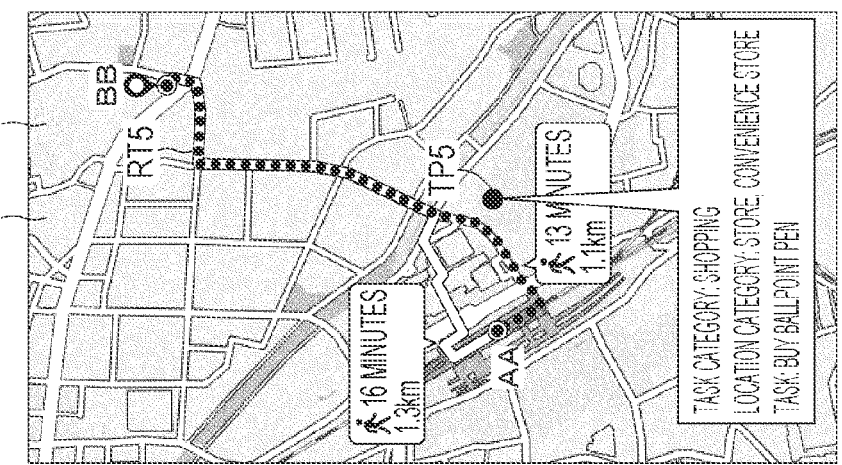
FIG. 36A

FIG. 61A   CASE WHERE THERE IS CANDIDATE OTHER THAN DESTINATION AND WAYPOINT  
FIG. 61B   CASE WHERE DESTINATION AND WAYPOINT ARE ALSO CANDIDATES  

CASE 1

BUY BALLPOINT PEN

TASK CATEGORY: SHOPPING
LOCATION CATEGORY: STORE, CONVENIENCE STORE
DEADLINE: 2018/6/7
IMPORTANCE: 1
REQUIRED TIME: 0:10
COMMENT: USED AT CRAM SCHOOL

HOME — CONVENIENCE STORE (PEN PURCHASE) — CONVENIENCE STORE (PEN PURCHASE) — CRAM SCHOOL    OUT OF SEARCH TARGET
         CA                                CB
TODAY (2018/6/7) OUTBOUND ROUTE

FIG. 76A  CASE 2
FIG. 76B
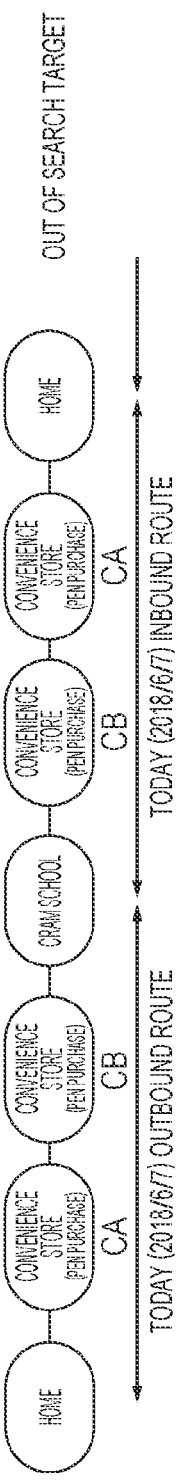

FIG. 78
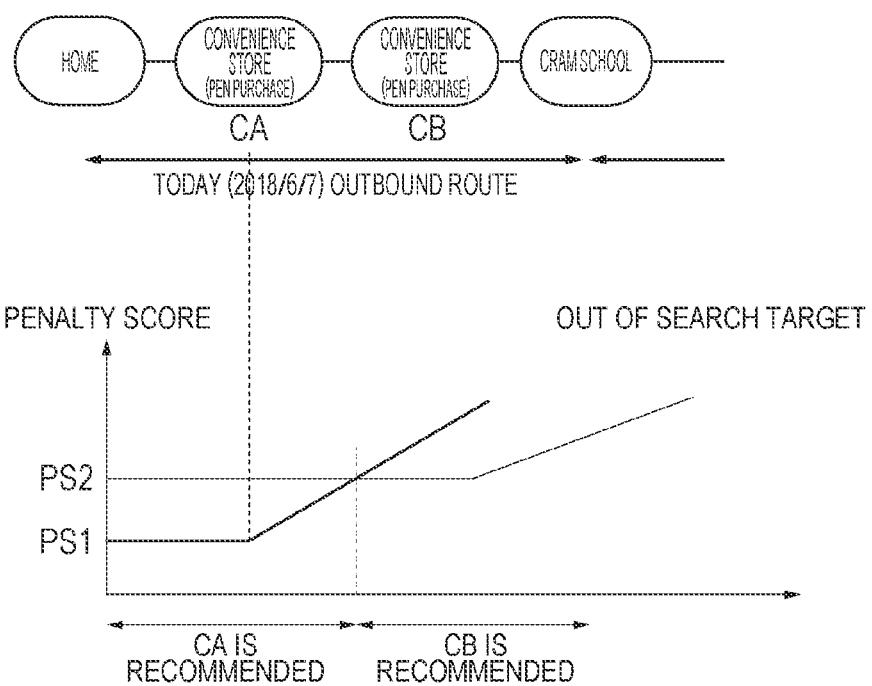

INFORMATION PROCESSING DEVICE AND INFORMATION PROCESSING METHOD TO NOTIFY AT AN APPROPRIATE TIMING

CROSS REFERENCE TO RELATED APPLICATIONS

This application is a U.S. National Phase of International Patent Application No. PCT/JP2019/033663 filed on Aug. 28, 2019, which claims priority benefit of Japanese Patent Application No. JP 2018-198298 filed in the Japan Patent Office on Oct. 22, 2018. Each of the above-referenced applications is hereby incorporated herein by reference in its entirety.

TECHNICAL FIELD

The present disclosure relates to an information processing device, an information processing method, and a program.

BACKGROUND ART

A system has been devised for notifying an information reception device owned by a user of various types of information (see, for example, Patent Document 1).

CITATION LIST

Patent Document

Patent Document 1: Japanese Patent Application Laid-Open No. 2015-153379

SUMMARY OF THE INVENTION

Problems to be Solved by the Invention

For example, if information of which a user is notified can be set together with locational information, it becomes possible to notify the user of predetermined information at an appropriate timing.

One of objects of the present disclosure is to provide an information processing device, an information processing method, and a program capable of setting information of which a user is notified together with locational information.

Solutions to Problems

The present disclosure is, for example,
an information processing device including
a display control unit that displays map information including a plurality of points and a route between the plurality of points, and displays at least a setting screen that enables setting of a trigger and a task to be performed in a case where the trigger is established, on the basis of a predetermined input made to the map information.

The present disclosure is, for example,
an information processing method including
displaying map information including a plurality of points and a route between the plurality of points, and displaying at least a setting screen that enables setting of a trigger and a task to be performed in a case where the trigger is established, on the basis of a predetermined input made to the map information, by a display control unit.

The present disclosure is, for example,
a program causing a computer to execute an information processing method including
displaying map information including a plurality of points and a route between the plurality of points, and displaying at least a setting screen that enables setting of a trigger and a task to be performed in a case where the trigger is established, on the basis of a predetermined input made to the map information, by a display control unit.

BRIEF DESCRIPTION OF DRAWINGS

FIGS. 31A, 31B, 31C, 31D, and 31E are diagrams referred to when processing of hierarchically viewing a task set by another user is explained.

FIGS. 33A, 33B, and 33C are diagrams referred to when a task is set with use of a real map.

FIGS. 34A and 34B are diagrams referred to when an example of rerouting to a route in which a task is prioritized is explained.

FIGS. 36A and 36B are diagrams referred to when processing is explained of re-proposing a location where a task can be executed in a case where rerouting is performed.

FIG. 38 is a diagram illustrating a specific display example of a task pool and the like.

FIG. 39 is a diagram illustrating a specific display example of the task pool and the like.

FIGS. 61A and 61B are diagrams referred to when a modification is explained that corresponds to the seventh example in which the display content changes depending on the operation onto the display unit.

FIGS. 76A and 76B are diagrams referred to when a second example is explained of limiting the search range of the location where the task is performed in the case where the deadline is set for the task in the embodiment.

FIG. 78 is a diagram referred to when processing is explained of presenting a recommended location where a task is performed in the embodiment.

MODE FOR CARRYING OUT THE INVENTION

Figure 1:
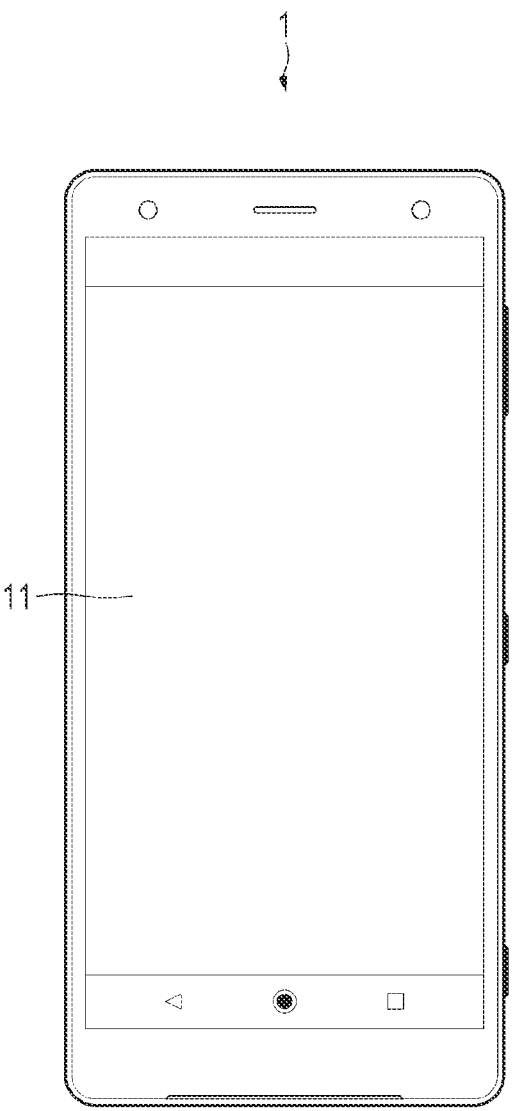
FIG. 1 is a diagram illustrating an appearance example of a smartphone according to an embodiment.

Hereinafter, an embodiment and the like of the present disclosure will be described with reference to the drawings. Note that, the description will be made in the following order.

Embodiment

<Modifications>

The embodiment and the like described below are preferred specific examples of the present disclosure, and the contents of the present disclosure are not limited to the embodiment and the like.

Note that, in the following description, the same or equivalent configurations, display contents, and the like will be designated by the same reference numerals, and duplicate description will be omitted as appropriate.

Embodiment

[Appearance Example of Information Processing Device]

FIG. 1 illustrates an appearance example of an information processing device according to an embodiment. The information processing device according to the present embodiment is implemented as, for example, an electronic device that can be carried by a user, more specifically, a smartphone 1. The smartphone 1 includes at least a display unit 11. The display unit 11 is configured as, for example, a touch screen, and is configured to be able to accept various operation inputs. Various types of information are displayed on the display unit 11. Note that, details will be described later of a specific example of the display content displayed on the display unit 11, an example of an operation input performed on the display unit 11, an example of transition of the display content depending on the operation input, and the like.

Note that, in the following description, an example will be described in which the operation input to the smartphone 1 is performed by touching (may be a proximity to) the display unit 11 with a finger or an instrument such as a stylus pen, but this is not a limitation. The operation input to the smartphone 1 may be performed by an operation input to a button or a pressure sensor, a voice input, or the like.

Note that, the information processing device according to the present technology is not limited to the smartphone, and may be another device. For example, the information processing device may be a tablet computer, a wearable device typified by a wristband type device, a mobile phone, a device that implements Augmented Reality (AR) or Virtual Reality (VR), or the like. Furthermore, the information processing device does not have to be a portable electronic device, and may be a stationary electronic device, for example, a television device, a personal computer, a projector, an in-vehicle device, or another device (Internet of Things (IoT) device) connected to a network, or the like.

[Internal Configuration Example of Information Processing Device]

(Outline)

Figure 2:
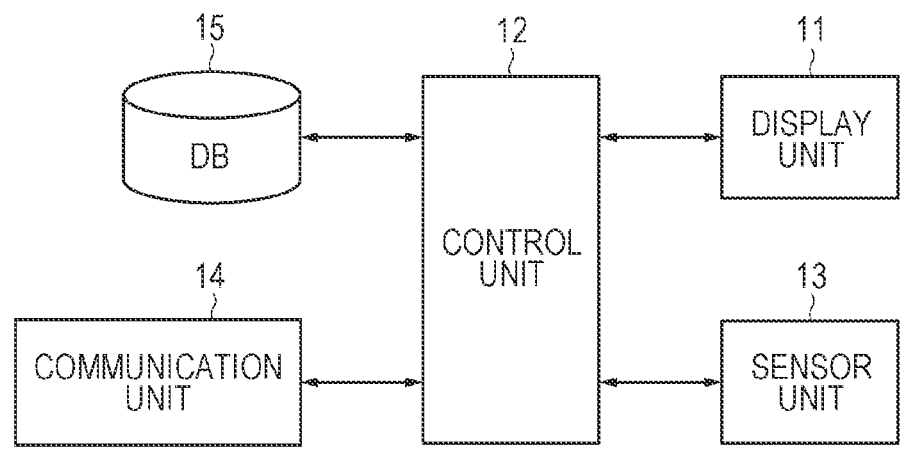
FIG. 2 is a block diagram illustrating an outline of an internal configuration example of the smartphone according to the embodiment.

Next, a description will be given of an internal configuration example of the smartphone 1 that is an example of the information processing device. FIG. 2 is a block diagram illustrating an outline of the internal configuration example of the smartphone 1. Schematically, the smartphone 1 includes, for example, a control unit 12, a sensor unit 13, a communication unit 14, and a database (DB) 15 in addition to the display unit 11 described above. The display unit 11, the sensor unit 13, the communication unit 14, and the database 15 are each connected to the control unit 12.

The control unit 12 includes a central processing unit (CPU) and the like, and comprehensively controls each part of the smartphone 1. Unless otherwise specified, individual processing described later is performed by the control unit 12. Furthermore, the control unit 12 functions as a display control unit that controls the display content on the display unit 11 described later. The control unit 12 includes a read only memory (ROM) and a random access memory (RAM) (not illustrated). A program executed by the control unit 12 is stored in the ROM. The RAM is used as a temporary storage area for data and as a work memory when the control unit 12 executes the program. Note that, a specific function and the like of the control unit 12 will be described later.

The sensor unit 13 is a general term for sensors that acquire various sensing data. A specific example of the sensor unit 13 will be described later.

The communication unit 14 is a component for communicating with other devices. The communication unit 14 includes a modulation/demodulation circuit and the like corresponding to a communication method. The communication may be wired communication, wireless communication, or both. Examples of wireless communication include a local area network (LAN), Bluetooth (registered trademark), Wi-Fi (registered trademark), wireless USB (WUSB), and the like. Various data and commands are exchanged between the smartphone 1 and other devices via the communication unit 14.

The database 15 is a device that stores various types of information. Examples of the database 15 include a magnetic storage device such as a hard disk drive (HDD), a semiconductor storage device, an optical storage device, and a magneto-optical storage device. Specific examples of the data stored in the database 15 will be described later.

Note that, the smartphone 1 does not have to include all of the configuration of the smartphone 1 exemplified, and may have a configuration in which another device includes a part of the configuration or a functional block for executing a predetermined function, for example. For example, a configuration may be adopted in which another device on the cloud may include the database 15, or the communication unit 14 may be a communication adapter or the like detachable to the smartphone 1.

(Detailed Internal Configuration Example)

Figure 3:
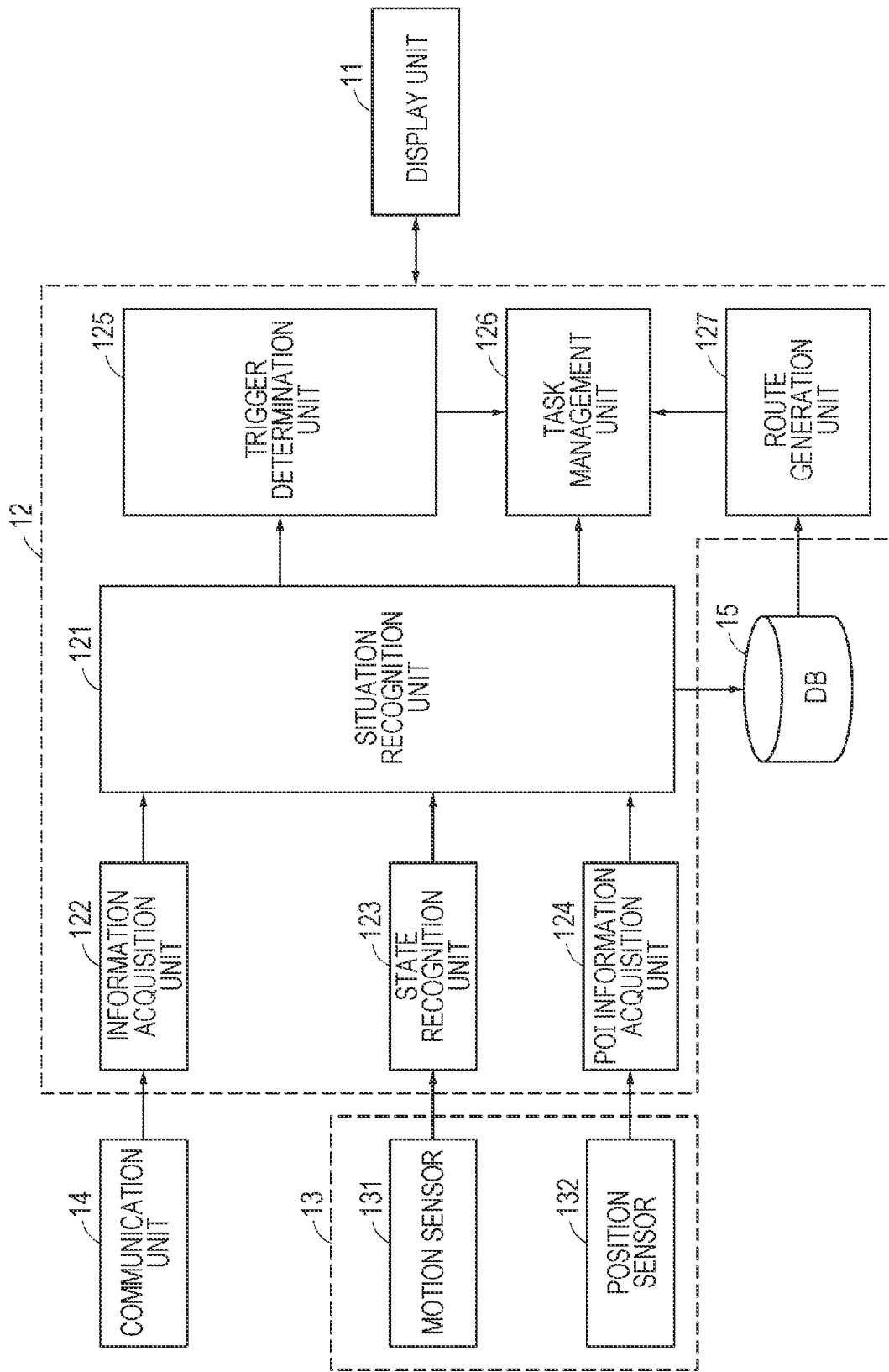
FIG. 3 is a block diagram illustrating a detailed internal configuration example of the smartphone according to the embodiment.

FIG. 3 is a block diagram illustrating a detailed internal configuration example of the smartphone 1. The control unit 12 includes, for example, a situation recognition unit 121, an information acquisition unit 122, a state recognition unit 123, a point of interest (POI) information acquisition unit 124, a trigger determination unit 125, a task management unit 126, and a route generation unit 127. The sensor unit 13 includes, for example, a motion sensor 131 and a position sensor 1132. Note that, in addition to the motion sensor 131 and the position sensor 132, the sensor unit 13 may include a biometric sensor capable of measuring the user's blood pressure, body temperature, pulse, and the like, and an environmental sensor capable of measuring temperature, humidity, atmospheric pressure, wind speed, and the like.

The situation recognition unit 121 recognizes actions and situations of the user of the smartphone 1 in the present, past, future, and the like. The situation recognition unit 121 recognizes the user's situation by appropriately referring to information supplied from the information acquisition unit 122, the state recognition unit 123, and the POI information acquisition unit 124. The situation recognition unit 121 outputs a recognition result to the trigger determination unit 125 and the database 15. The database 15 stores the recognition result by the situation recognition unit 121, specifically, a history of the actions, a history of the situations, and the like as a log.

The information acquisition unit 122 acquires various types of information via the communication unit 14, and outputs the acquired information to the situation recognition unit 121. The information acquired by the information acquisition unit 122 includes, but is not limited to, purchase information indicating a history of purchases made by the user in the past, date and time information regarding a date and a time, information regarding a position of a store or a facility, and the like. The information acquisition unit 122 outputs the acquired information to the situation recognition unit 121.

The state recognition unit 123 recognizes the user's state. The user's state includes, for example, the user's motion obtained on the basis of sensor data output by the motion sensor 131. The state recognition unit 123 outputs the recognized user's state to the situation recognition unit 121.

The POI information acquisition unit 124 acquires information regarding a POI on the basis of sensor data output by the position sensor 132. The POI is, for example, information regarding a location in which the user is interested or a location to which the user frequently goes, and includes at least information (for example, latitude and longitude, which may include altitude information.) for specifying the location. The POI may include information related to the location, for example, the location's phone number or address, an evaluation comment posted via a network, and the like. These pieces of related information are acquired by, for example, the information acquisition unit 122. The POI information acquisition unit 124 determines, for example, a location where the motion has stopped (a location where standing still has temporarily occurred) on the basis of sensing data of the position sensor 132, and determines that the location is the POI. The information acquisition unit 124 outputs the acquired information regarding the POI to the situation recognition unit 121.

Note that, the information acquired by the information acquisition unit 122, the recognition result by the state recognition unit 123, the information regarding the POI acquired by the POI information acquisition unit 124, and the like may be stored in the database 15 as appropriate.

The trigger determination unit 125 determines whether or not a set trigger (condition) is established on the basis of the recognition result by the situation recognition unit 121. The trigger determination unit 125 outputs a determination result to the task management unit 126.

The task management unit 126 performs processing regarding task management. The processing regarding task management according to the present embodiment includes task registration processing, task notification processing, display processing when registration or change of a task is performed, and the like. A display depending on the processing by the task management unit 126 is displayed on the display unit 11. Note that, the task may be processing to be performed by the smartphone 1 or another electronic device, an action to be performed by the user of the smartphone 1 or another person, or both.

The route generation unit 127, for example, refers to the information stored in the database 15 to generate information (hereinafter, referred to as virtual map information as appropriate) regarding a virtual map including a predetermined route. Here, the virtual map means a virtual map adapted to the log of the user's actions and situations, and specifically, a map appropriately customized for the user (may be another user) of the smartphone 1.

As an example, the route generation unit 127 refers to the information regarding the POI stored in the database 15 to generate virtual map information. The route generation unit 127 generates, for example, a virtual map in which POIs are connected to each other, and generates virtual map information corresponding to the virtual map.

Note that, the virtual map can be changed as appropriate depending on the log of the user's actions and situations. In the present embodiment, it is possible to perform setting, changing, deleting, and the like of a task using the virtual map. Furthermore, although it is assumed that the virtual map is automatically generated by the route generation unit 127, all or part of the virtual map may be generated by a manual operation input by the user. The route generation unit 127 outputs the generated virtual map information to the task management unit 126.

[Specific Example Regarding Task Management Using Virtual Map]

(Trigger and Task Setting Example)

Next, a specific example will be described regarding task management using a virtual map. First, a description will be given of a task setting example using a virtual map.

First Example

Figure 4:
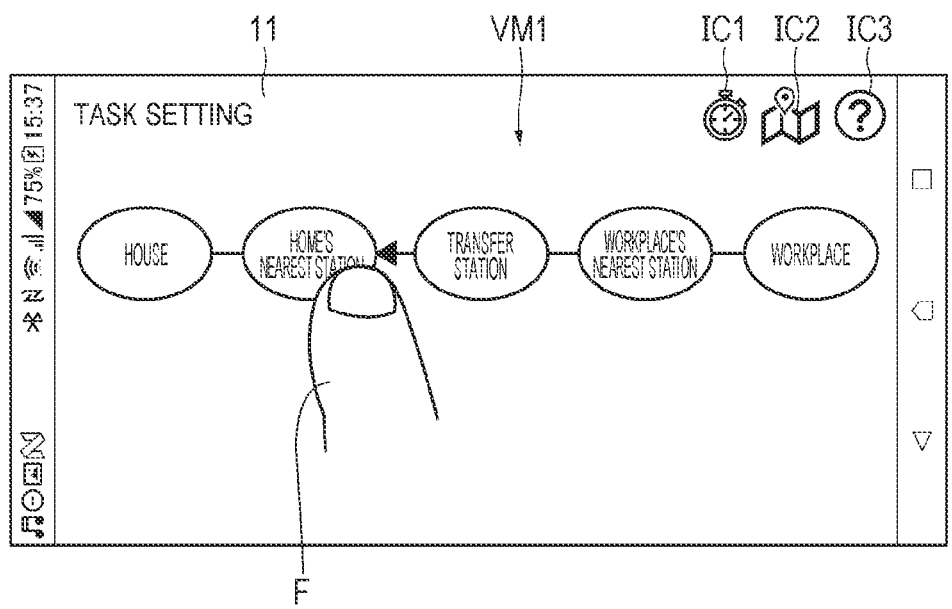
FIG. 4 is a diagram referred to when a task setting example (first example) in the embodiment is explained.

FIG. 4 is a diagram referred to when a task setting example (first example) is explained. As illustrated in FIG. 4, a virtual map VM1 is done on the display unit 11. The virtual map VM1 is generated by the route generation unit 127, for example, and is displayed on the display unit 11 in accordance with control by the task management unit 126. Note that, although the display unit 11 is illustrated in landscape orientation in FIG. 4, it may be in portrait orientation. The same applies to other figures.

The virtual map VM1 is displayed, for example, near the center of the display unit 11. For example, a clock icon IC1 imitating a clock, a map icon IC2 imitating a map, and a help icon IC3 displayed as "?" are displayed side by side in the upper right corner of the display unit 11. In addition, the display unit 11 displays a time, a remaining battery level, a radio wave condition, an icon for activating a specific application, and the like.

The virtual map VM1 includes, for example, a plurality of POIs and routes connecting the POIs to each other. The virtual map VM1 includes "house (home)", "home's nearest station", "transfer station", "workplace's nearest station", and "workplace" as examples of the POI. In the virtual map VM1, each POI is surrounded by an oval frame, and the POIs are connected to each other by a straight line corresponding to a route. As described above, the virtual map is, for example, a map based on an actual map, and more specifically, a map customized depending on the user's daily action (habitual action).

A trigger is set with use of the virtual map VM1. For example, an example is considered of setting a trigger "timing when the home's nearest station is reached during returning to home from the workplace". In other words, the trigger in the first example is a trigger corresponding to a timing of going in (entering) a predetermined range (for example, several tens of meters) centered on a predetermined POI.

For example, the user taps (has proximity to or touches) the route between the "home's nearest station" and the "transfer station" with a finger F of the user oneself, for example. Then, while a state of tapping with the finger F is kept, the finger F is dragged (traced) to the left side. Drag operation is performed from the route between the "home's nearest station" and the "transfer station" toward the "home's nearest station" to the left side, whereby it becomes possible to set a trigger of during returning to home, not during going to the workplace.

A triangular arrow corresponding to a drag direction (left direction in the example of FIG. 4) is displayed on the route between the "home's nearest station" and the "transfer station" in accordance with the drag operation. The arrow may be colored in an appropriate color and displayed. Then, the user selects a POI for which notification of the task is desired. In this example, the POI is selected by the user releasing the finger F at the location of the "home's nearest station". Note that, at this time, a display mode of the selected POI may be changed so that the display is emphasized more than other POIs. For example, the location of the "home's nearest station" blinks, a display color changes, or the location of the "home's nearest station" is enlarged and displayed compared to other POIs, whereby the "home's nearest station" is highlighted. Performing setting in this way to cause a task to be executed in the case of approaching a certain location, or in the case of moving away from a certain location as described later, is sometimes referred to as "fencing".

By such operation, it becomes possible to perform setting of a trigger using the virtual map VM1. The virtual map VM1 is a map optimized for the user's life pattern. Thus, by intuitive operation using the virtual map VM1, the user can set a trigger corresponding to a target location or route without requiring many operations.

Figure 5:
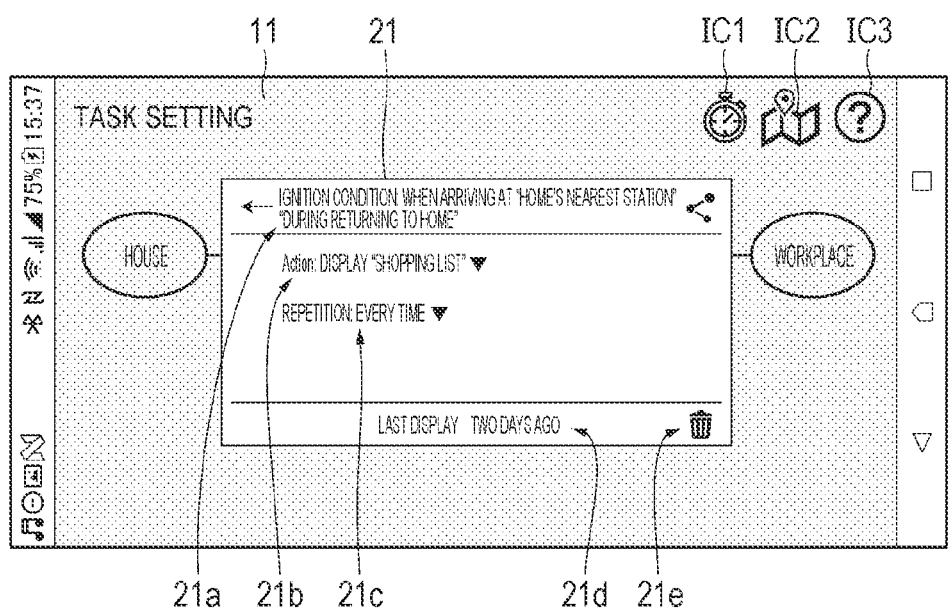
FIG. 5 is a diagram for explaining a setting screen example in the first example according to the embodiment.

When setting of a trigger is performed, setting of a task is performed. FIG. 5 is a diagram illustrating a screen example displayed when the finger F is released from the display unit 11. When the finger F is released from the display unit 11, a setting screen 21 is displayed in a pop-up display (display that is emphasized compared to the periphery). The periphery of the setting screen 21 is displayed with a lower illuminance than the setting screen 21. Note that, the setting screen 21 is not limited to the pop-up display, and may be displayed, for example, by transition of a screen content from the display illustrated in FIG. 4.

On the setting screen 21, a trigger (ignition condition) 21a is displayed. As described above, the trigger 21a is a content automatically set depending on the input using the virtual map VM1, and specifically is a condition "when the "home's nearest station" is reached "during returning to home"". The setting screen 21 further displays a task 21b. The task 21b corresponds to, for example, an action to be performed by the user or the smartphone 1 in a case where the trigger 21a is established. The setting screen 21 in this example further includes: a repetition display 21c (every time in the illustrated example) indicating frequency of execution or frequency of repetition of the trigger 21a and the task 21b; a history display 21d (two days ago in the illustrated example) indicating a history in which the trigger 21a is established last time; and a trash can icon 21e imitating a trash can for canceling (discarding) a content of the setting screen 21. The user performs various settings by using the setting screen 21.

Second Example

Figure 6:
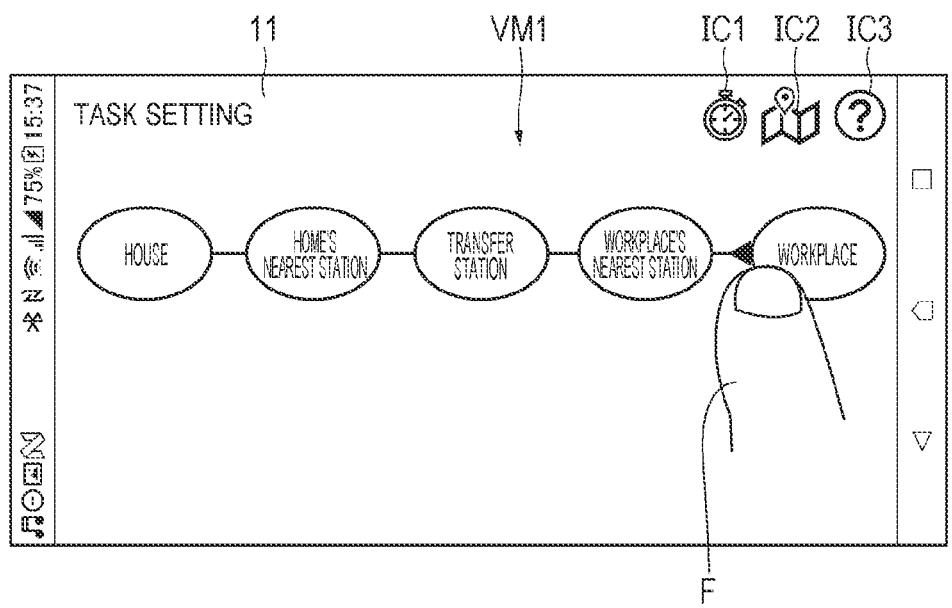
FIG. 6 is a diagram referred to when a task setting example (second example) in the embodiment is explained.

FIG. 6 is a diagram referred to when a task setting example (second example) is explained. As illustrated in FIG. 6, the virtual map VM1 described above is displayed on the display unit 11.

A trigger is set with use of the virtual map VM1. For example, an example is considered of setting a trigger "when leaving the workplace". In other words, the trigger in the second example is an example of a trigger corresponding to a timing of going out of (exiting) a predetermined range from a certain POI with the POI as the center.

For example, the user taps the "workplace" that is one of the POIs with the finger F of the user oneself, for example. At this time, the "workplace" may be highlighted compared to other POIs. Then, while a state of tapping with the finger F is kept, the finger F is dragged to the left side. Drag operation is performed from the "workplace" to the left side, whereby it becomes possible to set a trigger of during returning to home, not during going to the workplace.

When the drag operation is performed, a triangular arrow is displayed corresponding to a drag direction (left direction in the example of FIG. 6) with the "workplace" as a starting point. The arrow may be colored in an appropriate color and displayed. Then, the user releases the finger F at a location where notification of the task is desired. In this example, operation is performed in which the user releases the finger F at the location of the route between the "workplace" and the "nearest station".

Figure 7:
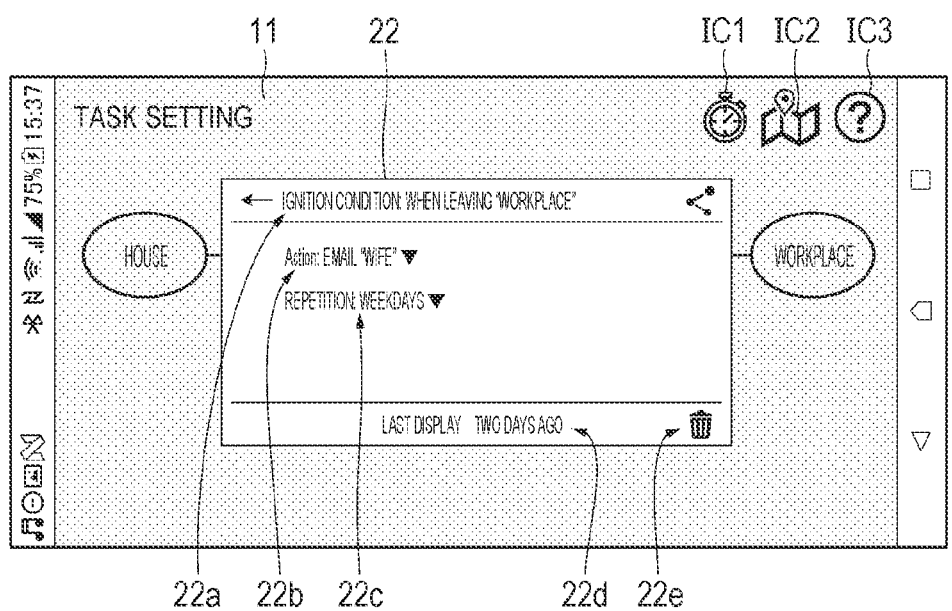
FIG. 7 is a diagram for explaining a setting screen example in the second example according to the embodiment.

When setting of a trigger is performed, setting of a task is performed. FIG. 7 is a diagram illustrating a screen example displayed when the finger F is released from the display unit 11. When the finger F is released from the display unit 11, a setting screen 22 is displayed on the display unit 11. When the finger F is released from the display unit 11, the setting screen 22 is displayed, for example, in a pop-up. The periphery of the setting screen 22 is displayed with a lower illuminance than the setting screen 22. Note that, the setting screen 22 is not limited to the pop-up display, and may be displayed, for example, by transition of a screen content from the display illustrated in FIG. 6.

On the setting screen 22, a trigger 22a is displayed. Trigger 22a is set with use of the virtual map VM1 as described above. The setting screen 22 further displays a task 22b. The task 22b corresponds to, for example, an action to be performed by the user or the smartphone 1 in a case where the trigger 22a is established. The setting screen 22 in this example, the setting screen 22 in this example further includes: a repetition display 22c ("weekday" in the illustrated example) indicating frequency of performing or frequency of repetition of the trigger 22a and the task 22b; a history display 22d (two days ago in the illustrated example) indicating a history in which the trigger 22a is established last time; and a trash can icon 22e imitating a trash can for canceling (discarding) a content of the setting screen 22. The user performs various settings by using the setting screen 22.

(Details of Setting Screen)

The first and second examples described above are basic modes regarding setting of a task. Here, details will be described of the setting screen described above. Note that, in the following, the setting screen 21 will be described as an example, but the same applies to the setting screen 22.

Figure 8A:
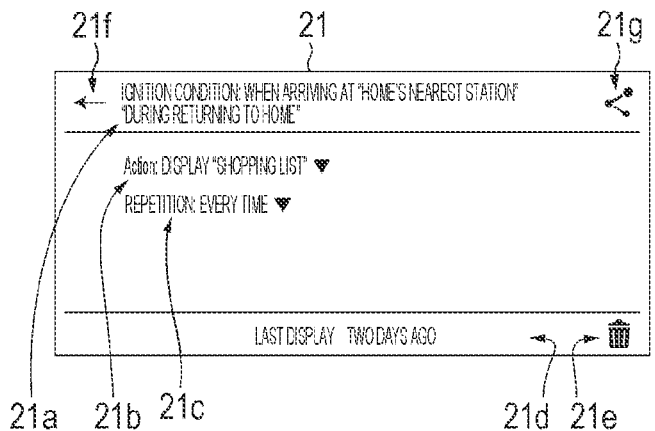
FIG. 8A is a diagram illustrating a setting screen example in the first example.

FIG. 8A is a diagram illustrating the setting screen 21 in the first example described above. As described above, the setting screen 21 includes the trigger 21a, the task 21b, the repetition display 21c, the history display 21d, and the trash can icon 21e. In addition, the setting screen 21 includes an arrow icon 21f imitating an arrow pointing to the left side and a sharing icon 21g. For example, the arrow icon 21f is displayed in the upper left of the setting screen 21, and the sharing icon 21g is displayed in the upper right of the setting screen 21.

Hereinafter, specific examples will be described of a content of each item on the setting screen 21 and operation using the item. The trigger 21a is a verbalization (character representation) of a content that is set with use of the virtual map VM1. Note that, there may be a case where setting of the trigger 21a using the virtual map VM1 is not appropriate due to an operation error or the like. Thus, it may be enabled to edit the content of the trigger 21a by using the setting screen 21. For example, it may be enabled to display the virtual map VM1 by long press of the location of the trigger 21a and to reset the content of the trigger. Furthermore, it may be enabled to correct the content inside " " of the trigger 21a by manual input.

The task 21b is a character string indicating a content of the task 21b. When the location of " " of the character string is tapped, a specific content inside the " " can be designated.

Figure 8B:
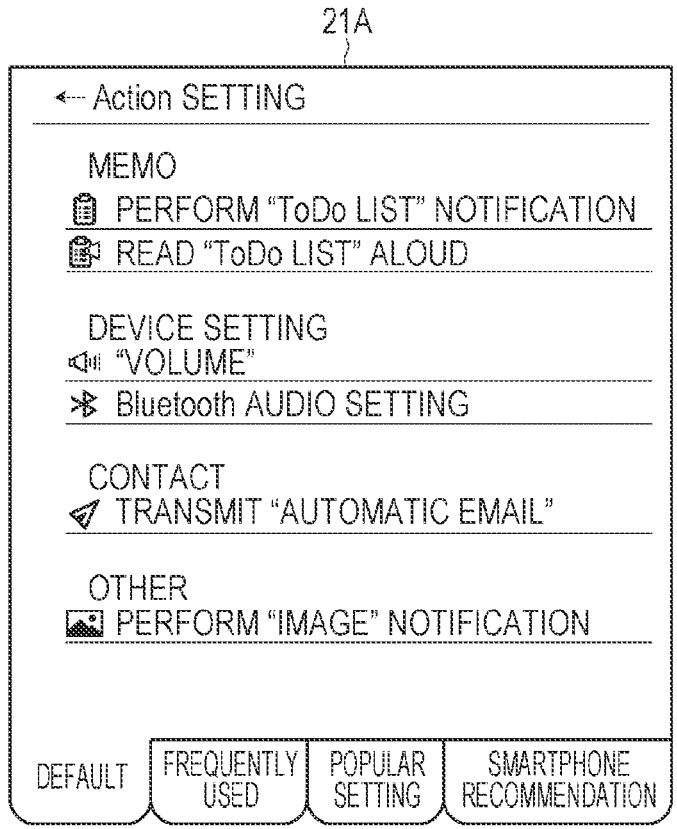
FIG. 8B is a diagram illustrating a task setting screen example.

For example, on the right side of the character string of the task 21b, a downward black triangle is displayed. By clicking on the black triangle, a screen content transitions from the setting screen 21 to a task setting screen 21A illustrated in FIG. 8B. The task setting screen 21A is a screen for performing setting how notification of the content inside " " of the task 21b is performed, or the like. For example, four tabs are displayed under the task setting screen 21A, and each tab can be selected by the user. The four tabs are, for example, "default", "frequently used", "popular setting", and "smartphone recommendation", and in the example illustrated, "default" is selected.

On the task setting screen 21A, "memo", "device setting", "contact", and "other" are displayed as items. The item "memo" is an item for setting a notification mode of a ToDo list ("shopping list" in this example) corresponding to the content of the task 21b. For example, a content of "perform notification of ToDo list" and a content of "read ToDo list aloud" can be set. When "perform notification of ToDo list" is selected, the user is notified of the content (shopping list in this example) inside " " of the task 21b by display. When "read ToDo list aloud" is selected, the user is notified of the shopping list that is the content inside " " of the task 21b by voice.

The item "device setting" is an item for performing setting of the volume when notification of the content of the task 21b is performed, and setting regarding Bluetooth (registered trademark) in a case where processing using the Bluetooth (registered trademark) is performed. As a specific example, it is possible to perform setting such as automatically reducing the volume depending on the user's action (for example, walking from now on) and the like, by performing setting regarding the "volume" of the item "device setting".

The item "contact" is an item for performing setting whether or not to automatically notify others of a content of an ignition condition of the task 21b by means such as email. When this item is selected, the content of the task 21b is switched to "perform transmission by automatic email". In this item, a transmission destination of the email is also set. As a specific example, when the "home's nearest station" is reached, a fixed phrase indicating that fact is automatically transmitted. Note that, in addition to notification of the task 21b by display and voice, it may be enabled to perform automatic transmission of an email.

The item "other" is, for example, an item for performing setting whether or not to perform notification of a list or an image. When this item is selected, the list or image designated by the user is displayed. Note that, it may be enabled to specifically designate a notification mode other than the notification of the list or image after designating this item.

Each item described above is displayed in the default display order in a case where the "default" tab is selected. In a case where the "frequently used" tab is selected, the items are sorted depending on the set frequency and displayed. In a case where the "popular setting" tab is set, the settings of the user of the smartphone 1 and the settings of other users are shared, and the items are sorted depending on the frequency of the shared settings and displayed. In a case where the "smartphone recommendation" tab is selected, the items, such as those not used by the user but used by other users, are sorted in the order of new items and displayed.

Figure 8C:
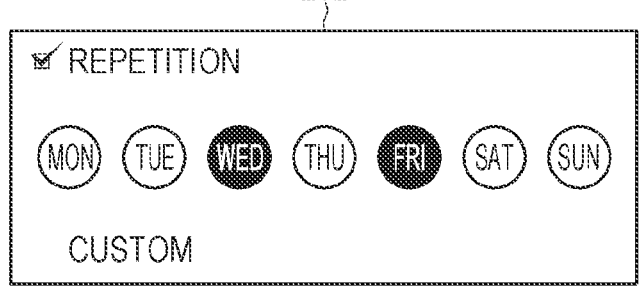
FIG. 8C is a diagram illustrating a repetition setting screen example.

The repetition display 21c is a character indicating a content of the number of repetitions. For example, on the right side of a character string indicating the content of the number of repetitions, a downward black triangle is displayed. When the black triangle is tapped, a content of the screen transitions to a repetition setting screen 21B illustrated in FIG. 8C. As illustrated in FIG. 8C, on the repetition setting screen 21B, for example, the days of the week marked with a circle, and characters "repetition" and "custom" are displayed. The user can set the day of the week when repetition is performed, by selecting a predetermined day of the week (Wednesday and Friday in the illustrated example). Note that, in a case where a check box displayed next to the characters "repetition" is not checked, the day of the week and the characters "custom" are not displayed. Furthermore, by selecting the characters "custom", it becomes possible to perform setting not only regarding the day of the week but also regarding the time zone.

The history display 21d is a character string indicating the latest history in which the trigger 21a is established. By tapping the location of the history display 21d, the past history in which the trigger 21a is established may be displayed.

The trash can icon 21e is an icon for discarding the contents of the trigger 21a and the task 21b that are set with use of the virtual map VM1 and the setting screen 21. When the trash can icon 21e is tapped, the contents of the trigger 21a and the task 21b are discarded. When the trash can icon 21e is tapped, a confirmation screen may be displayed for confirming whether or not processing of discarding the contents of the trigger 21a and the task 21b may be performed.

When the arrow icon 21f is tapped, the screen transitions to the previous screen content. For example, when the arrow icon 21f is tapped, the screen content transitions from the setting screen 21 to a screen on which the virtual map VM1 is displayed.

The sharing icon 21g is an icon for sharing a set content made with use of the setting screen 21 with other users. Note that, a specific example of processing using the sharing icon 21g will be described later.

Operation Example

Next, an operation example in the smartphone 1 will be described. Note that, in the following, the description will be given assuming that the trigger and the task are set of the contents described in the first example described above.

Information indicating a position where the user carrying the smartphone 1 exists is acquired by the position sensor 132. The sensing data output from the position sensor 132, for example, position information including latitude and longitude is supplied to the situation recognition unit 121. The situation recognition unit 121 outputs the position information to the trigger determination unit 125. The position information is periodically output to the trigger determination unit 125, for example.

Furthermore, the situation recognition unit 121 acquires set contents of the trigger 21a and the like. The set contents of the trigger 21a and the like are stored in the database 15, for example. The situation recognition unit 121 supplies the acquired set contents of the trigger 21a and the like to each of the trigger determination unit 125 and the task management unit 126.

The trigger determination unit 125 determines whether or not the user arrives at the "home's nearest station", in other words, whether or not the trigger 21a is established, on the basis of the user's position information. The trigger determination unit 125 determines that the user arrives at the "home's nearest station" in a case where the user's position information approaches an area within, for example, about several tens of meters from the "home's nearest station".

In a case where it is determined that the user arrives at the "home's nearest station", the trigger determination unit 125 notifies the task management unit 126 that the trigger 21a is established. The task management unit 126 executes the content of the set task 21b. For example, the shopping list is displayed on the display unit 11. At this time, processing may be performed for notifying the user that the task 21b is being executed. For example, processing of vibrating the smartphone 1 or processing of reproducing a predetermined melody may be performed. Note that, the task management unit 126 may read the shopping list aloud. The notification mode of the task 21b is determined with use of the setting screen 21 as described above.

The user confirms the content of the display unit 11, specifically, the shopping list. As a result, the user can shop without forgetting to shop and the contents of things to buy. As described above, according to the present embodiment, it becomes possible to set the information of which the user is notified, together with the locational information (for example, a POI and the route between POIs).

Note that, the operation input to the virtual map VM1 and the setting screen 21 described above is an example and is not limited. For example, operation is performed of dragging the finger F to a predetermined POI in the virtual map VM1, and the setting screen 21 may be displayed in accordance with operation of pressing the finger F in that state. Furthermore, it is also possible to perform similar processing by Augmented Reality (AR) using a glasses-type device or the like without using the smartphone 1. In the case of such a configuration, a predetermined gesture can also be an operation input.

(Other Task Setting Examples)

The above is the task setting example using the virtual map, but it is not limited to this. Other task setting examples will be described.

Third Example

Figure 9:
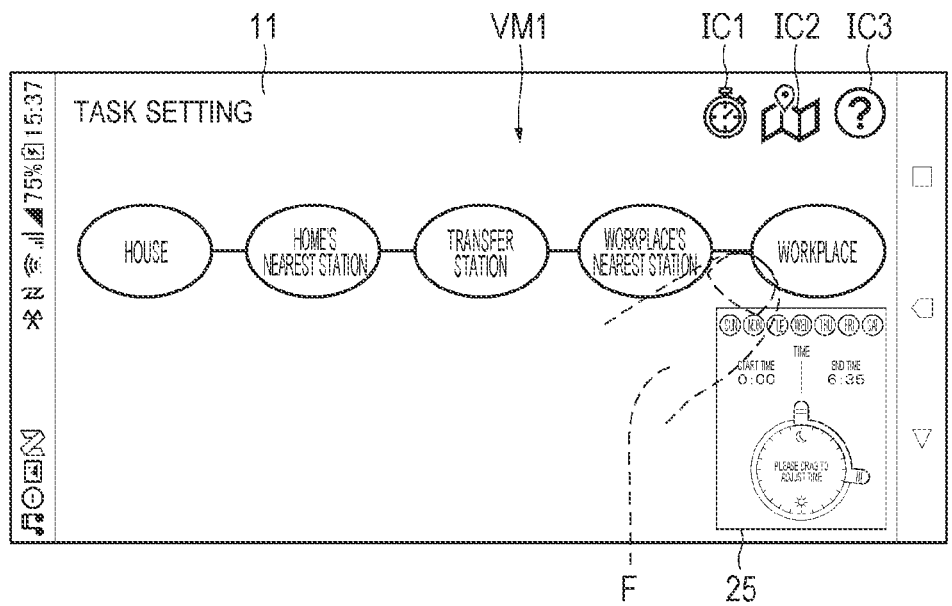
FIG. 9 is a diagram referred to when a task setting example (third example) in the embodiment is explained.

FIG. 9 is a diagram referred to when a task setting example (third example) is explained. As illustrated in FIG. 9, the virtual map VM1 described above is displayed on the display unit 11.

A trigger is set with use of the virtual map VM1. For example, an example is considered of setting a trigger "when being at the workplace at 12:00". In other words, the trigger in the third example is an example of a trigger corresponding to a timing including time information as well as locational information.

First, a predetermined POI is tapped with the finger F and selected. For example, the "workplace" is selected that is one of the POIs. With the selection, the "workplace" may be highlighted compared to other POIs. Then, with the "workplace" tapped, drag operation is performed in a direction where there is no route. For example, drag operation is performed downward from a display position of the "workplace". When the finger F is released from the display unit 11, a time information input screen 25 is displayed in a direction along the drag operation, that is, below the display position of the "workplace".

Figure 10:
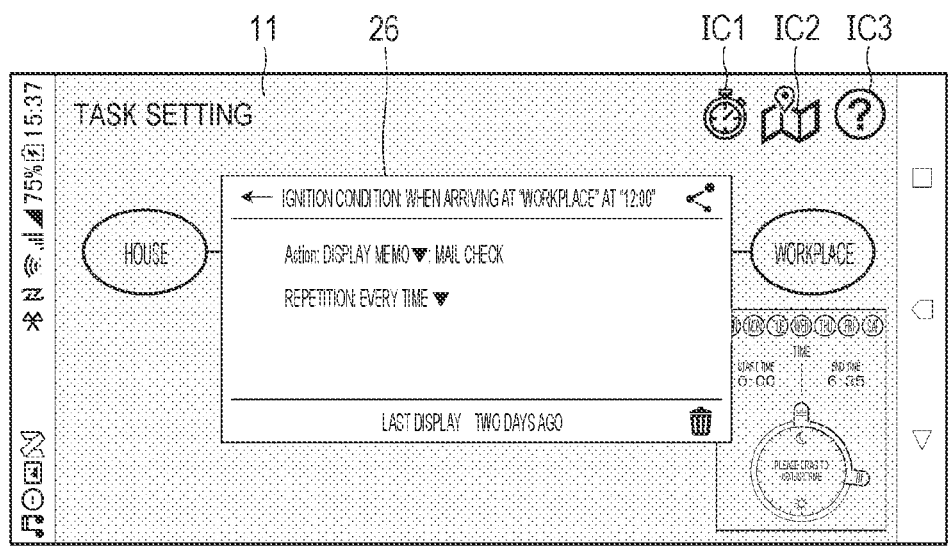
FIG. 10 is a diagram for explaining a setting screen example in the third example according to the embodiment.

The time information input screen 25 includes, for example, a clock, characters indicating the time, and a day of the week. The user designates the time (12:00 in this example) included in the trigger by, for example, performing drag operation for the clock. When the time is designated and the drag operation is canceled, a setting screen 26 illustrated in FIG. 10 is displayed. The setting screen 26 includes the content of the trigger set by the operation described above. Since a method for setting other information, task, or the like included in the setting screen 26 is similar to, for example, that in the setting screen 21 described above, duplicate description will be omitted.

Note that, the time information input screen 25 may be displayed by tapping of the clock icon IC1. For example, the "workplace" is selected by tapping of the "workplace". Subsequently, by tapping of the clock icon IC1, the time information input screen 25 may be displayed in the vicinity of the "workplace". Although the time information input screen 25 is preferably displayed in the vicinity of the corresponding POI ("workplace" in this example), its display position is not necessarily limited to below the display position of the "workplace", and can be set to an appropriate position.

Fourth Example

Figure 11:
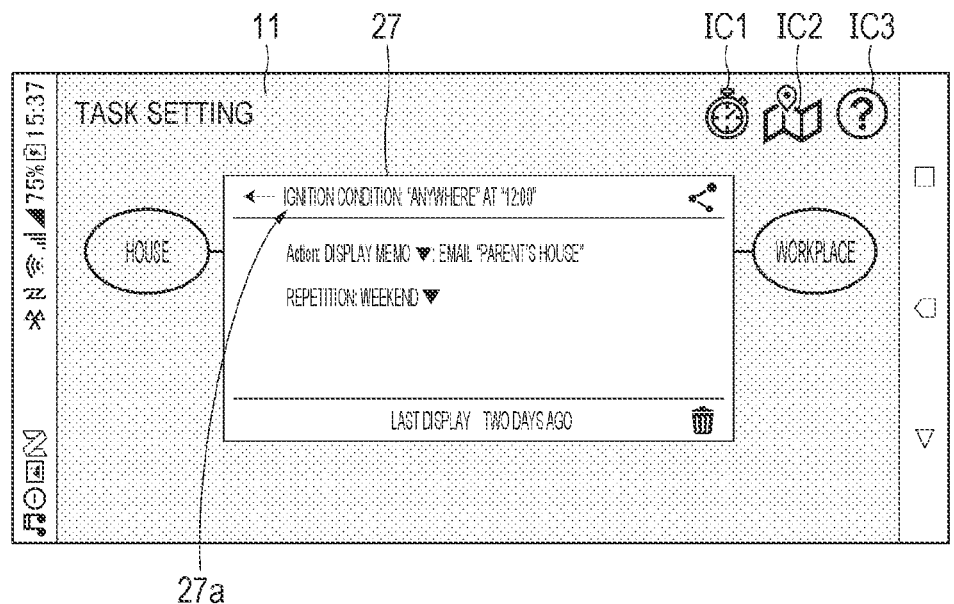
FIG. 11 is a diagram referred to when a task setting example (fourth example) in the embodiment is explained.

FIG. 11 is a diagram referred to when a task setting example (fourth example) is explained. In the first to third examples described above, an example has been described of setting a task associated with some location with use of the virtual map VM1, but in the present embodiment, it is also possible to perform setting of a location-independent task that is not associated with a location. The fourth example is an example of setting a location-independent task that is not associated with a location.

For example, the clock icon IC1 is tapped in a state where the virtual map VM1 is displayed and the POI is not selected. Then, as illustrated in FIG. 11, a setting screen 27 is displayed. The setting screen 27 is displayed in a pop-up, for example.

The setting screen 27 includes a trigger 27a that is a character string indicating a content of the trigger. In this example, since it is a location-independent task, a locational content of the trigger 27a is "anywhere". In a case where it is location-independent, other information is defined for the trigger 27a. In the example illustrated in FIG. 11, the time "12:00" is defined for the trigger 27a. A configuration is made in which the time can be changed by tapping of the location of "12:00". Regarding the task setting and the like using the setting screen 27, the method is similar to that described above, duplicate description will be omitted.

Fifth Example

Figure 12:
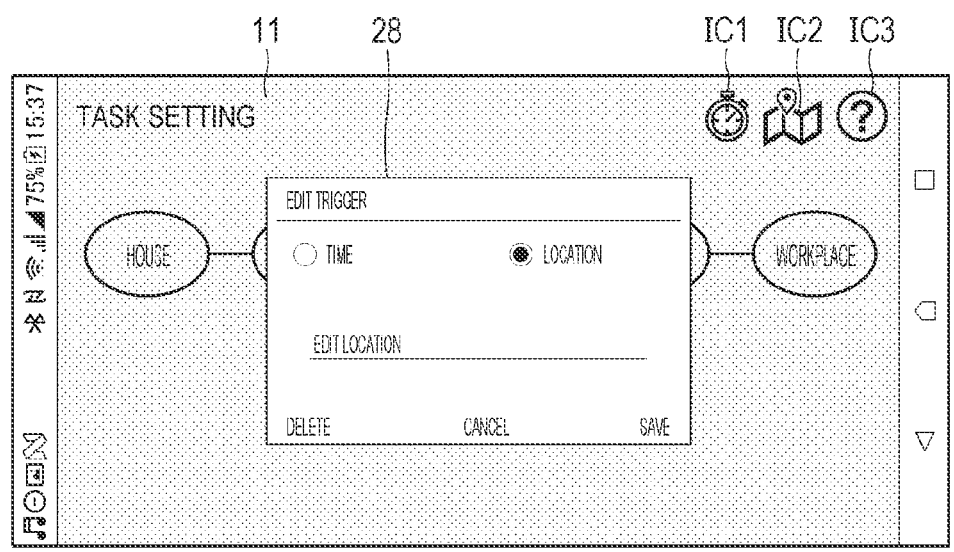
FIG. 12 is a diagram referred to when a task setting example (fifth example) in the embodiment is explained.

FIG. 12 is a diagram referred to when a task setting example (fifth example) is explained. The fifth example is an example of setting a trigger and a task at any location or time that does not appear in the virtual map VM1. For example, the map icon IC2 is tapped in a state where the virtual map VM1 is displayed and the POI is not selected. Then, as illustrated in FIG. 12, a setting screen 28 is displayed. The setting screen 28 is displayed in a pop-up, for example.

With use of the setting screen 28, a trigger can be set at at least one of any location or time. The location may be enabled to be selected from a list of POIs acquired by the POI information acquisition unit 124 in the past, or may be specifically designated by inputting of information that specifies the location (address, facility name, latitude, longitude, or the like). Note that, although not illustrated, it may be enabled to set a specific content of the task by providing the setting screen 28 with an item in which the content of the task can be input. The content of the task may be set with use of a screen different from the setting screen 28.

Sixth Example

Figure 13:
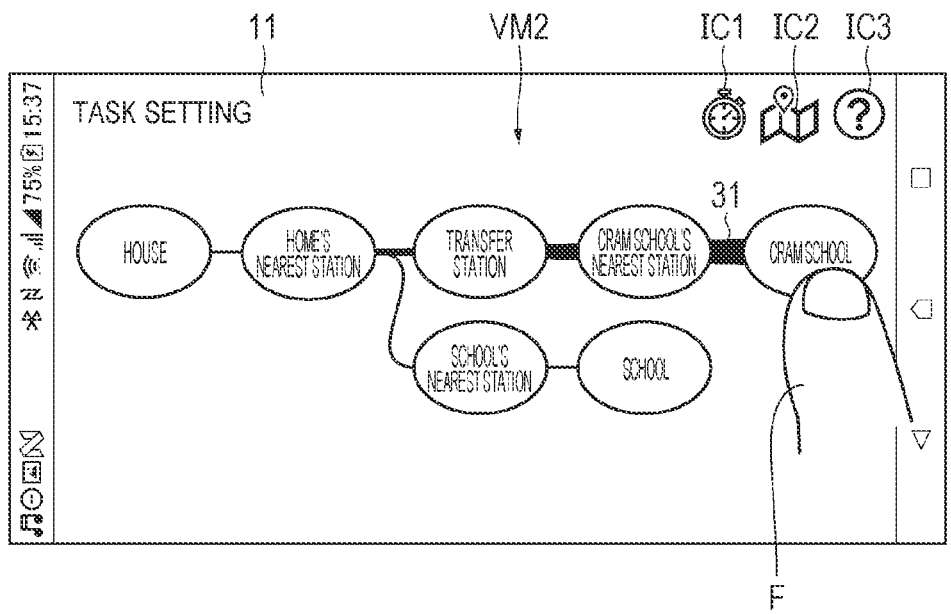
FIG. 13 is a diagram referred to when a task setting example (sixth example) in the embodiment is explained.

Next, a sixth example will be described. FIG. 13 is a diagram referred to when a task setting example (sixth example) is explained. As illustrated in FIG. 13, a virtual map VM2 is displayed on the display unit 11. Similarly to the virtual map VM1, the virtual map VM2 is, for example, a map created depending on the user's daily action (habitual action). The clock icon IC1, the map icon IC2, and the help icon IC3 described above are displayed on the display unit 11.

The virtual map VM2 includes a plurality of POIs and includes a plurality of routes. The virtual map VM2 includes "house (home)", "home's nearest station", "transfer station", "cram school's nearest station", "cram school", "school's nearest station", and "school" as examples of the plurality of POIs. Furthermore, the virtual map VM2 includes, as the plurality of routes, a route "house—home's nearest station—transfer station—cram school's nearest station—cram school" that goes back and forth between the "house" and the "cram school", and a route "house—home's nearest station—school's nearest station—school" that goes back and forth between the "house" and "school". The sixth example is an example of setting a trigger that specifies a route in a case where the virtual map includes the plurality of routes.

For example, an example is considered of setting a trigger "when the "home's nearest station" is reached during returning from the "cram school"". In this case, the user first taps the location of the "cram school" and selects the POI. At this time, the location of the "cram school" that is the selected POI may be highlighted compared to other POIs. Then, the user performs drag operation from the "cram school" toward the "home's nearest station". In accordance with the drag operation, a display 31 is displayed in which the route from the "cram school" toward the "home's nearest station" is tapered. The display 31 makes it easier for the user to recognize the selected route and its direction. Then, the drag operation is canceled at the location of the "home's nearest station".

Figure 14:
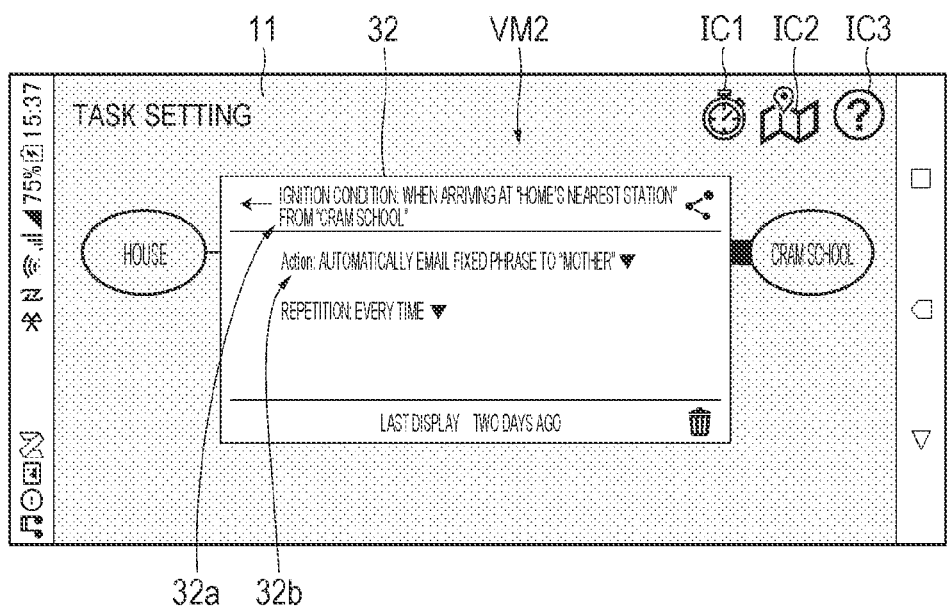
FIG. 14 is a diagram for explaining a setting screen example in the sixth example according to the embodiment.

When the drag operation is canceled, a setting screen 32 is displayed as illustrated in FIG. 14. The setting screen 32 is displayed in a pop-up, for example. The setting screen 32 includes a trigger 32a and a task 32b. The trigger 32a is a display that expresses a content set with use of the virtual map VM2 in characters, and specifically is a trigger of the content based on the route for which "when the "home's nearest station" is reached from the "cram school"" is specified. The task 32b on the setting screen 32 has, for example, a content of "automatically emailing a fixed phrase to "mother"", and, as a specific example, is a content of automatically transmitting an email of a content indicating arrival, without any trouble, at the "home's nearest station" from the "cram school".

In the example illustrated in FIG. 14, an email is automatically transmitted to the mother when the "home's nearest station" is reached from the "cram school". In a case where the "home's nearest station" is reached from the "school", the email is not transmitted since the route does not correspond to the route set as the trigger.

Since the processing of setting the contents of the task 32b and the like on the setting screen 32 is similar to that of the first example and the like, duplicate description will be omitted. As in this example, even in a case where the plurality of routes is included in the virtual map, it is possible to set a trigger that specifies a predetermined route among the plurality of routes.

Note that, in the above example, a case is assumed where the "cram school's nearest station" and the "home's nearest station" are different stations; however, even if they are the same station (station AA), it becomes possible to perform setting of a trigger in which a predetermined route is set.

Figure 15:
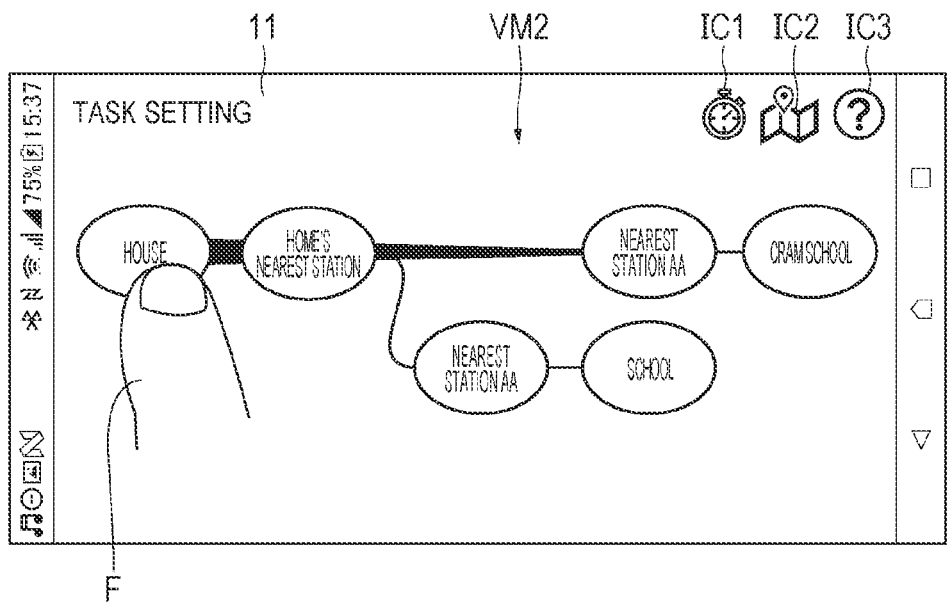
FIG. 15 is a diagram for explaining an example of setting a trigger in which a predetermined route is specified.
Figure 16:
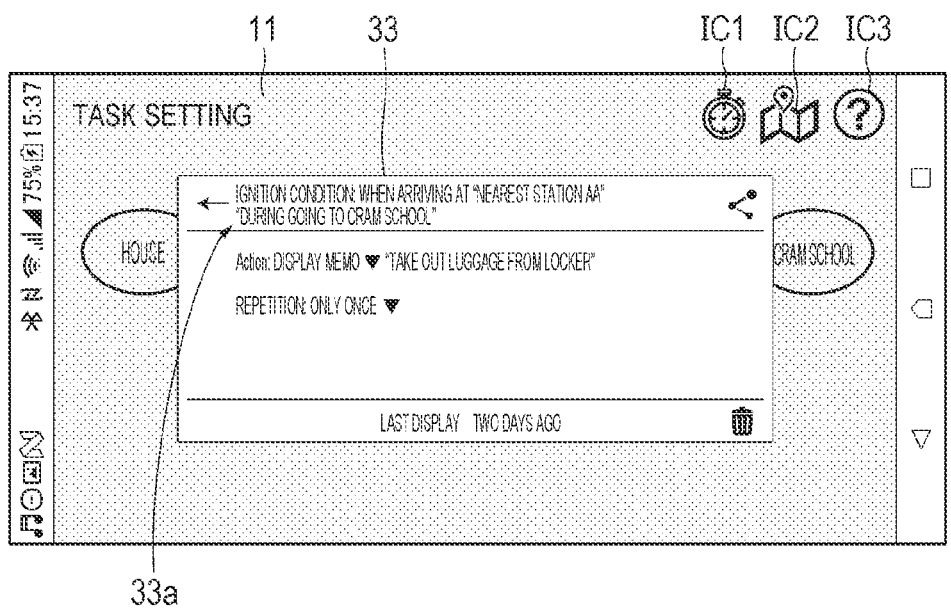
FIG. 16 is a diagram for explaining another example of the setting screen.

For example, a trigger "when the nearest station AA is reached during heading from the house to the cram school" is considered. In this case, it is sufficient that the "house" is tapped as illustrated in FIG. 15 and then drag operation is performed to the "nearest station AA" in which the route is connected to the "cram school". When the drag operation is canceled, a setting screen 33 illustrated in FIG. 16 is displayed. The setting screen 33 includes a trigger 33a. The content of the trigger 33a is the content set by the operation described above, and specifically, is the content "when the "nearest station AA" is reached during heading to the "cram school"". Since a content of the setting screen 33 and operation onto the setting screen 33 are similar to those in the first example and the like, duplicate description will be omitted.

Figure 17:
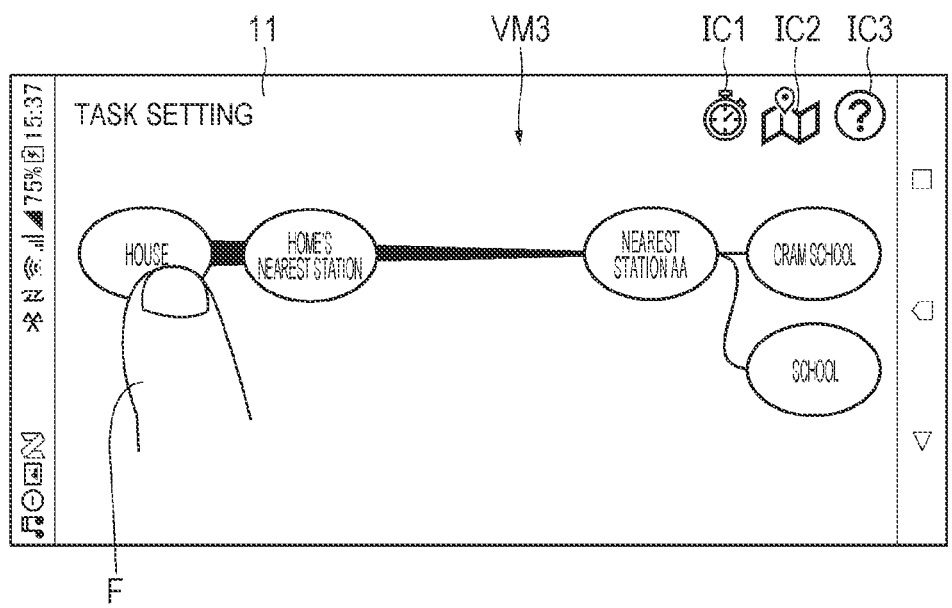
FIG. 17 is a diagram for explaining another example of a virtual map.

Note that, depending on a display of the route on the virtual map, it may be difficult to specify a predetermined route. For example, an example is considered in which a virtual map VM3 illustrated in FIG. 17 is displayed on the display unit 11. The virtual map VM3 includes "house (home)", "home's nearest station", "nearest station AA", "cram school", and "school" as examples of the plurality of POIs. The "nearest station AA" is the nearest station common to the "cram school" and the "school". In this case, an example is considered of setting a trigger "when the "nearest station AA" is reached during heading from the "house" to the "cram school"". Since the routes to the "cram school" and the "school" branch off from the "nearest station AA", for example, in a case where drag operation is performed from the "house" to the "nearest station AA" similarly to the operation described above, even in a case where the "nearest station AA" is reached during heading to the "school", it is regarded that the trigger is established and the task may be executed.

To avoid such a problem, for example, in a case where the destination of the end point designated by the drag operation (destination of a direction corresponding to the drag operation) branches off into a plurality of routes, the situation recognition unit 121 may specify a predetermined route as the content of the trigger by referring to the user's action history stored in the database 15.

For example, in a case where the "school" has a long vacation such as summer vacation, users spend more days going to the "cram school" instead of the "school" as a place for learning. The user's action history is sensed by the position sensor 132 and stored in the database 15 as the user's action history. On the other hand, in a case where the drag operation as illustrated in FIG. 17 is performed, it is considered that the route intended by the user is often based on the recent action history. Thus, in the case where the drag operation as illustrated in FIG. 17 is performed, the situation recognition unit 121 reads a tendency of the user's recent (for example, within one week or the like) action from the database 15, and, in a case where it is more often that the user goes to the "cram school" instead of going to the "school", sets a trigger that specifies a route, which is "when the "nearest station AA" is reached during heading from the "house" to the "cram school". That is, the task is prevented from being executed even in a case where "the "nearest station AA" is reached during heading from the "house" to the "school"".

Note that, the determination of whether or not the user is heading from the "house" to the "cram school" is determined by referring to time information (for example, a time when the user normally attends the "cram school"), a moving direction of the user moving from the "nearest station AA" (whether or not the user is heading to the "cram school"), and the like.

As described above, it is also possible to predict the user's intention, specify the route, and set the trigger that specifies the route. Of course, as described in the third example, it is also possible to avoid the problem described above by setting a trigger using the time information after the dragging operation to the "nearest station AA". That is, the trigger may be set so that the task is executed at the approximate time when the "nearest station AA" is reached during heading to the "cram school".

Seventh Example

Figure 18:
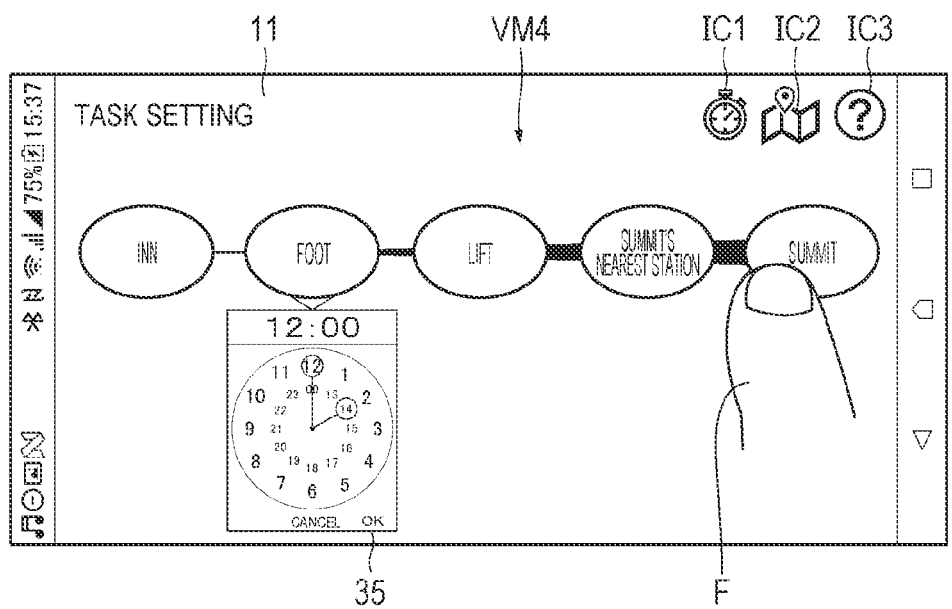
FIG. 18 is a diagram referred to when a task setting example (seventh example) in the embodiment is explained.

Next, a seventh example will be described. FIG. 18 is a diagram referred to when a task setting example (seventh example) is explained. As illustrated in FIG. 18, a virtual map VM4 is done on the display unit 11.

The virtual map VM4 includes "inn", "foot", "lift", "summit's nearest station", and "summit" as examples of the plurality of POIs. This example is an example regarding a trigger and a task set when the user skis. Each POI may be acquired by the POI information acquisition unit 124, or may be set by input by the user. Furthermore, whether or not the user is skiing may be determined by the situation recognition unit 121 on the basis of the information of the position sensor 132 and behavior of the user indicated by the position sensor 132 (for example, the user is repeatedly moving back and forth (sliding) in the same location in a location where the ski slope is located).

When skiing, the user repeatedly slides down between the "foot" and the "summit". Thus, for example, when a trigger "when the foot is reached from the summit" is set, the task may be executed every time the user slides down to the "foot", and the task may be executed at a timing different from the user's intention. This example corresponds to such a problem, and specifically, is an example of setting a trigger including a moving direction and a time.

For example, an example is considered of setting a trigger "when sliding around 12:00". In this case, the user first taps the "summit", for example. Then, drag operation is performed from there toward the "foot", and drag operation is performed, for example, downward from the location of the "foot". In accordance with the operation, clock information 35 indicating the time is displayed in the vicinity (lower side in this example) of the "foot". The user inputs "12:00" as the time by tap operation to the clock indicated in the clock information 35, or by operation directly inputting the time. At this time, by giving a temporal width, it may be enabled to set as around 12:00, specifically, "between 11:50 and 12:30".

Figure 19:
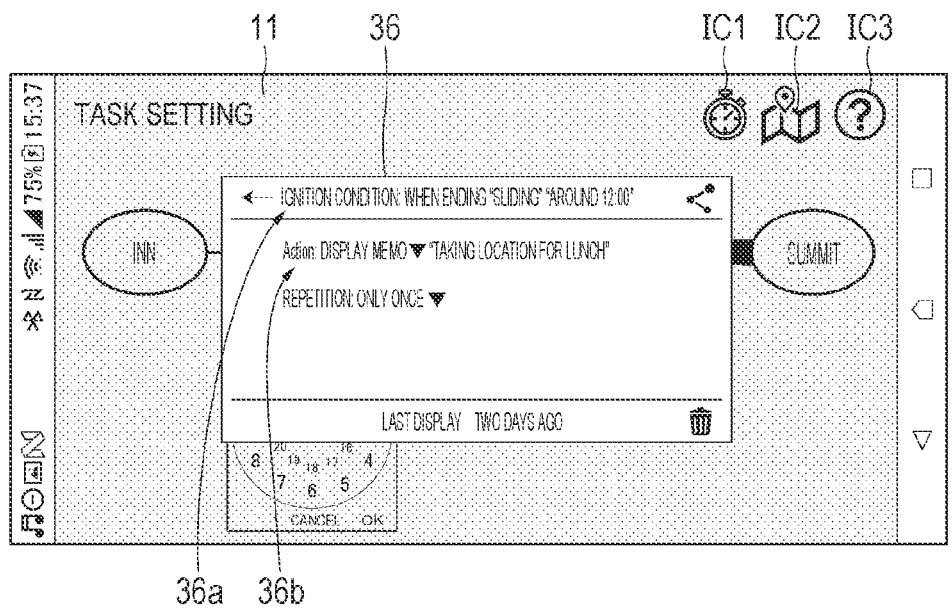
FIG. 19 is a diagram for explaining a setting screen example in the seventh example according to the embodiment.

When the input of the time ends, a setting screen 36 is displayed as illustrated in FIG. 19. The setting screen 36 is displayed in a pop-up, for example. The setting screen 36 includes a trigger 36a. The trigger 36a is a character representation of the content set by the operation described above, specifically, the content "when the "sliding" ends "around 12:00"". The setting screen 36 includes a task 36b. Task 36b has a content of, for example, "taking a location for lunch", and is displayed on the display unit 11 when the trigger 36a is established.

As described above, even in a case where moving is repeatedly performed in a predetermined location like skiing, it is possible to set a trigger for executing the task in a case where the time when the sliding ends is around 12:00.

For example, in a case where the user climbs up with the lift around 12:00, the task is not executed since the direction of the user's action is different.

Note that, in the case of skiing, basically the same course is repeated many times, so for example, if the position information acquired by the position sensor 132 is referred to, it is possible to calculate an average value of sliding time that is a time required from climbing to the summit with the lift to ending sliding. The timing at which the task is executed may be adjusted depending on the sliding time. For example, a case is considered where a trigger "when the sliding ends between 11:50 and 12:30" is set and the sliding time is about 50 minutes. For example, when the sliding ends around 11:50, if another lap of sliding is performed, a time range included in the trigger is exceeded, so the task is executed when the sliding ends. Alternatively, if the sliding is performed in a hurry, the sliding time can be shortened to 40 minutes, and there is a possibility that the sliding can end within the time range included in the trigger, so for example, the user is notified of a content such as "if in a hurry, another lap can be made" by display or voice. Furthermore, in a case where the sliding ends around 12:15, it is obviously impossible to perform another lap of sliding, so the task is executed at the time point when the sliding ends. As described above, the timing at which the task is executed within the time range designated by the trigger may be adjusted as appropriate.

The trigger and task setting examples have been described above. Note that, the trigger and the task may be predicted on the basis of the user's habitual action and automatically set on the basis of the prediction result.

(Preliminary Trigger Setting Example)

The trigger and task setting examples have been described. By the way, even in a case where a set trigger is established and the user is notified of a content of a task, there is a possibility that the task is not executed by the user. For example, there is a possibility that the task is not executed in a case where the user is in a hurry or forgets. Thus, assuming a case where a predetermined trigger and a task are set and then the task is not executed, a preliminary trigger may be automatically set.

Figure 20:
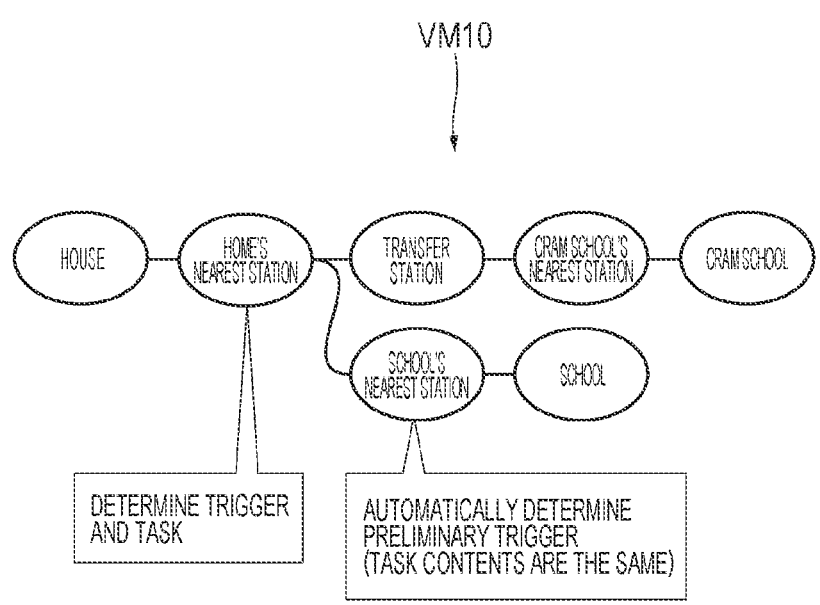
FIG. 20 is a diagram illustrating an example of a virtual map referred to when processing of setting a preliminary trigger is explained.

For example, an example is considered in which a virtual map VM10 illustrated in FIG. 20 is displayed on the display unit 11, and with use of the virtual map VM10, a trigger "when the "home's nearest station" is reached during heading to the "school"", and a task "charge electronic money of a transportation system" are set. In this case, there is a possibility that the electronic money is not charged for some reason, such as in a case where a train arrives at the "home's nearest station" and the user gets on the train in a hurry. Considering the possibility, a preliminary trigger is set at the "school's nearest station" that is a destination of the train. For example, a preliminary trigger "when the electronic money is not charged at the "home's nearest station" and the "school's nearest station" is reached" is set. Note that, a content of a task corresponding to the preliminary trigger is the same (charge electronic money). The preliminary trigger is set by, for example, the situation recognition unit 121, and whether or not the preliminary trigger is established is determined by the trigger determination unit 125. Note that, the user may be enabled to select whether or not to set the preliminary trigger. Furthermore, the preliminary trigger may be set in a case where the task corresponding to the original trigger (trigger "when the "school's nearest station" is reached") is not executed.

Here, whether or not the user arrives at the "home's nearest station" or the "school's nearest station" can be determined on the basis of the position information acquired by the position sensor 132. Furthermore, whether or not the electronic money is charged is determined by, for example, a residence time at the "home's nearest station" or the "school's nearest station" determined on the basis of the position information. For example, if the residence time at the "home's nearest station" or "school's nearest station" is greater than or equal to a certain time (for example, 10 minutes), it is determined that the electronic money is charged. Note that, the communication unit 14 accesses a server device or the like for confirming a balance of the electronic money and the information acquisition unit 124 acquires a change in the balance, whereby it may be determined whether or not the electronic money is charged.

Figure 21:
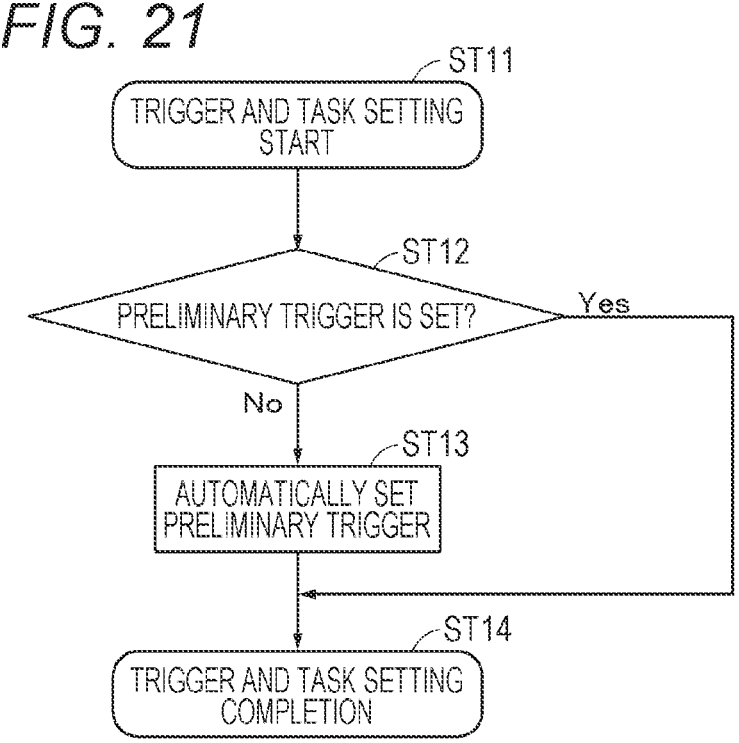
FIG. 21 is a flowchart illustrating a flow of the processing of setting a preliminary trigger according to the embodiment.

"Flow of processing of setting preliminary trigger" FIG. 21 is a flowchart illustrating a flow of processing of setting a preliminary trigger according to the embodiment. In step ST11, a trigger and a task are set. The trigger and task settings are performed on the basis of, for example, any of the first to seventh examples described above. Then, the processing proceeds to step ST12.

In step ST12, whether or not a preliminary trigger is set is determined by, for example, the situation recognition unit 121. In a case where the preliminary trigger is set, the processing proceeds to step ST14, and trigger (including the original trigger and the preliminary trigger) and task setting processing is completed. In a case where no preliminary trigger is set, the processing proceeds to step ST13.

In step ST13, the situation recognition unit 121 automatically sets a preliminary trigger for the POI for which the original trigger is set, the POI ahead of the route, or the like. The task corresponding to the preliminary trigger has the content similar to the task corresponding to the original trigger. Preliminary triggers may be set at multiple locations. After the preliminary trigger is set, the processing proceeds to step ST14, and the trigger and task setting processing is completed.

"Flow of processing of executing task corresponding to preliminary trigger"

Figure 22:
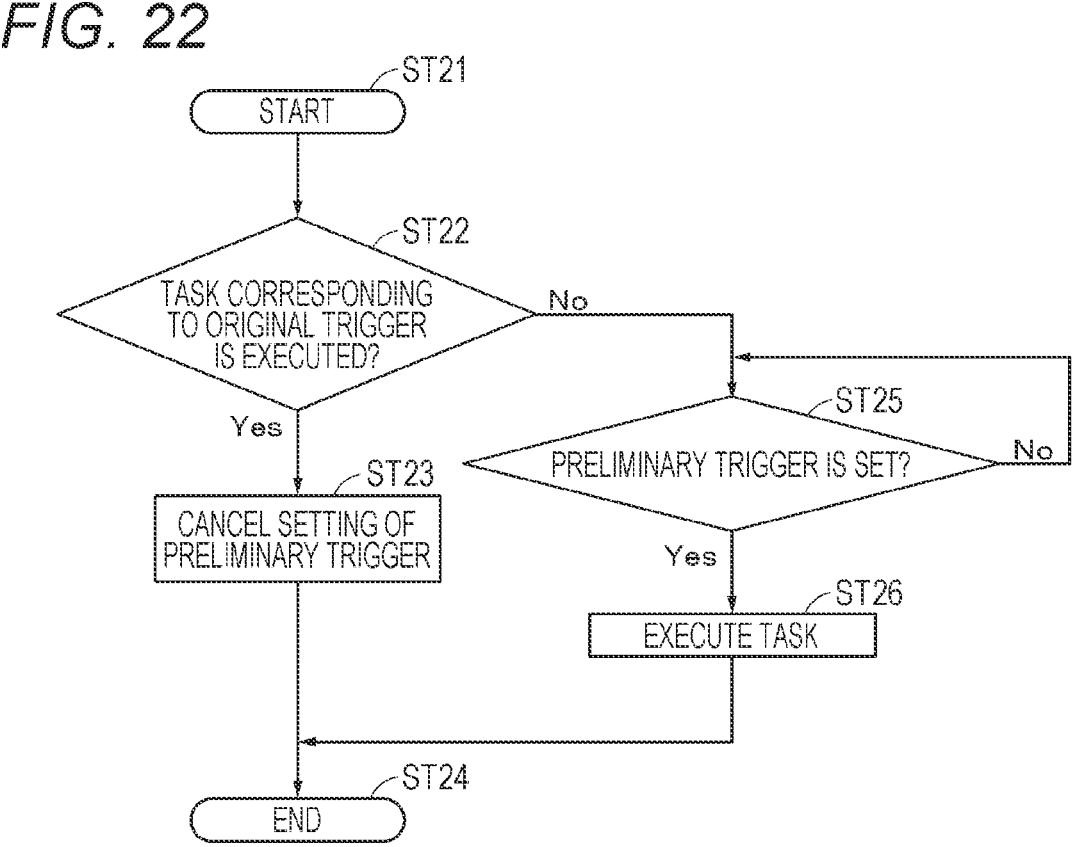
FIG. 22 is a flowchart illustrating a flow of processing of executing a preliminary trigger according to the embodiment.

FIG. 22 is a flowchart illustrating a flow of processing of executing a task corresponding to a preliminary trigger. In step ST21, processing is started. Then, the processing proceeds to step ST22.

In step ST22, it is determined whether or not the task corresponding to the original trigger (for example, the trigger set by the user) is executed. Such a determination is performed, for example, by the task management unit 126. Here, in a case where the task corresponding to the original trigger has already been executed, the processing proceeds to step ST23.

In step ST23, processing of canceling the setting regarding the preliminary trigger is performed. That is, since the task has already been executed, the same task is prevented from being executed. For example, in a case where the preliminary trigger is set in the trigger determination unit 125, the trigger determination unit 125 cancels setting of the preliminary trigger on the basis of a determination result by the task management unit 126. Then, the processing proceeds to step ST24, and the processing ends.

On the other hand, in the determination processing of step ST22, in a case where the task has not been executed yet, the processing proceeds to step ST25. The task management unit 126 notifies the trigger determination unit 125 of the determination result in step ST22. Then, in step ST25, the trigger determination unit 125 determines whether or not the preliminary trigger is established. In a case where the preliminary trigger is not established, the processing returns to step ST25. In a case where the preliminary trigger is established, the processing proceeds to step ST26.

In step ST26, since the preliminary trigger is established, the task corresponding to the preliminary trigger, that is, the same task as the task corresponding to the original trigger is executed by the task management unit 126. Then, the processing proceeds to step ST24, and the processing ends.

(Trigger and Task Viewing Example)

As described above, a trigger and a task are set. By the way, when many triggers and tasks are set, the user may forget what kind of task is set with what kind of trigger. Thus, it is desirable that the set tasks can be viewed (confirmed) with an easy-to-read User Interface (UI). A task viewing example based on this viewpoint will be described.

"Task Hierarchization"

Figure 23:
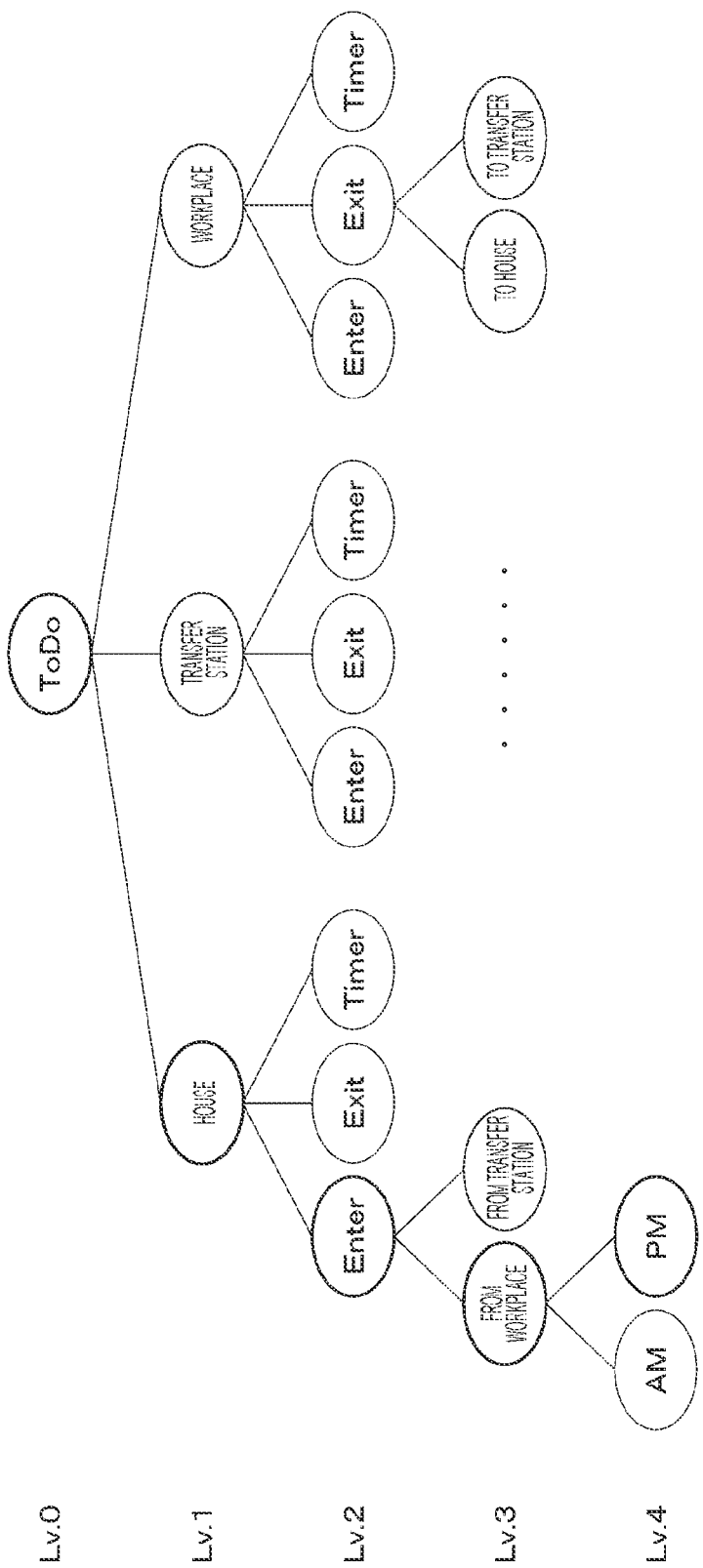
FIG. 23 is a diagram illustrating an example of a hierarchical structure according to the embodiment.

To implement an effective UI for viewing tasks, in the present embodiment, for example, tasks are held in a hierarchical structure. FIG. 23 is a diagram illustrating an example of such a hierarchical structure. The hierarchical structure has, for example, five layers of levels (Lv) 0 to 4. Lv.0 is the highest level layer, and in the order of Lv.1, 2 . . . 4, it is a lower layer.

Lv.0 is a ToDo list including all triggers and tasks, and is a level that corresponds to a route. Lv.1 is a level that corresponds to a POI unit (for example, house, transfer station, workplace, or the like). Lv.2 is a level that corresponds to a direction corresponding to a POI (for example, entering to the house, exit from the nearest station, or the like). Lv.2 also includes a case where there is no direction (for example, a timer at the workplace, or the like). Lv.3 is a level that corresponds to a route corresponding to a direction of a POI (for example, entering from the workplace to the house, exit from the workplace's nearest station during heading to the workplace). Lo.4 is a level that corresponds to a time corresponding to a route of a POI.

Figure 24A:
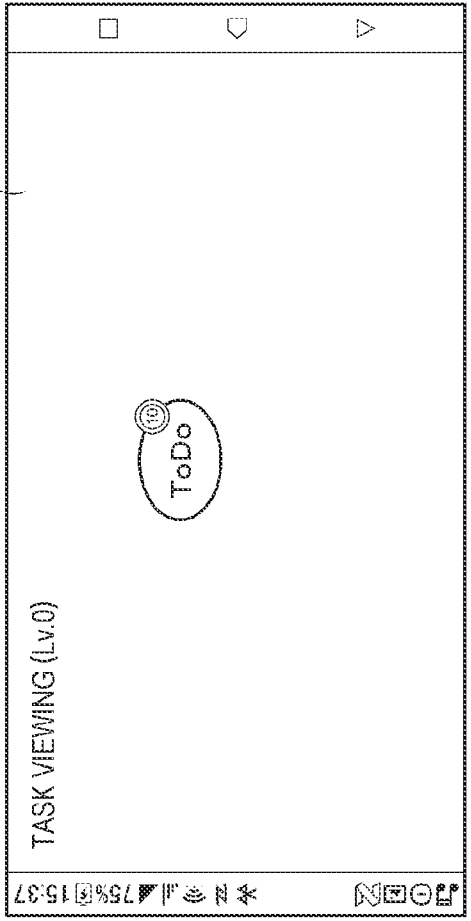
FIGS. 24A and 24B are diagrams referred to when a task viewing example according to the embodiment is explained.

A specific task viewing example will be described. As illustrated in FIG. 24A, a content included in the highest level Lv.0 is first displayed on the display unit 11. Characters indicating which layer the user is viewing, specifically, the characters "task viewing (Lv.0)" is displayed.

Figure 24B:
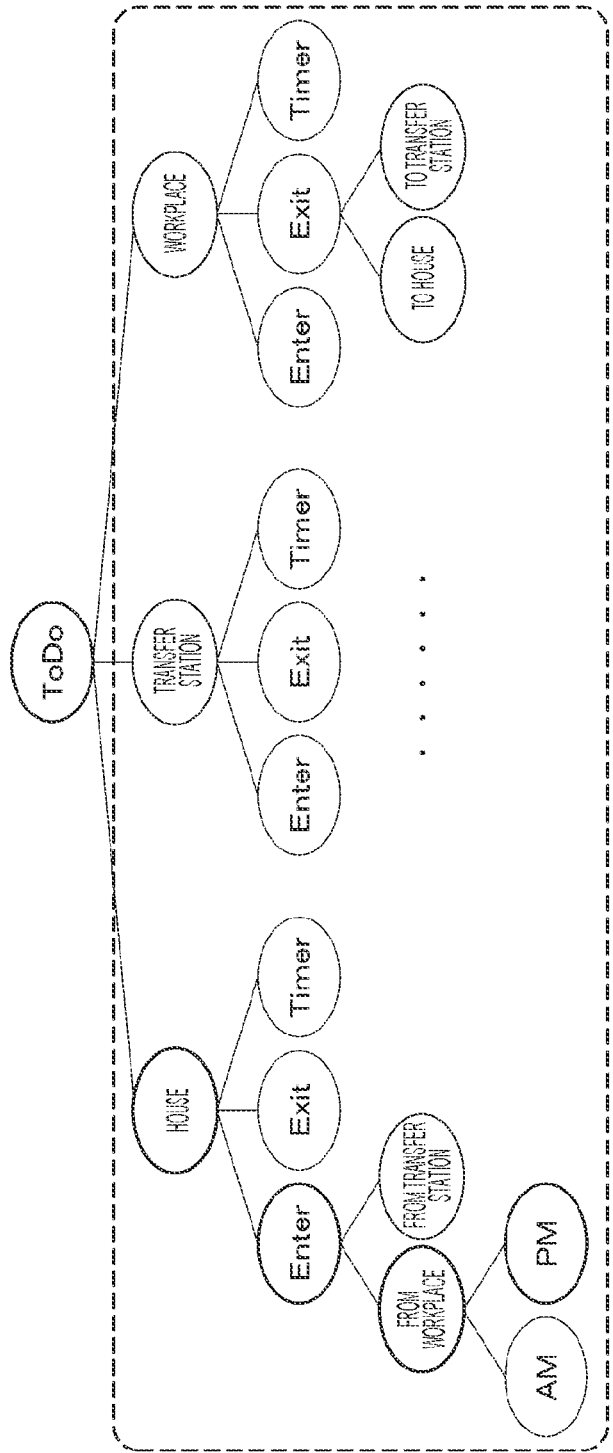

For example, on the display unit 11, characters "ToDo" surrounded by an oval frame are displayed. A numeral "10" is indicated in the vicinity, for example, in the upper right corner, of the characters "ToDo". As illustrated in FIG. 24B, the numeral "10" indicates the number of tasks included in a layer of ToDo, that is, a lower level layer than the layer of Lv.0. For example, when the location of the numeral is tapped, the screen transitions to a content indicating the next layer (Lv.1).

Figure 25A:
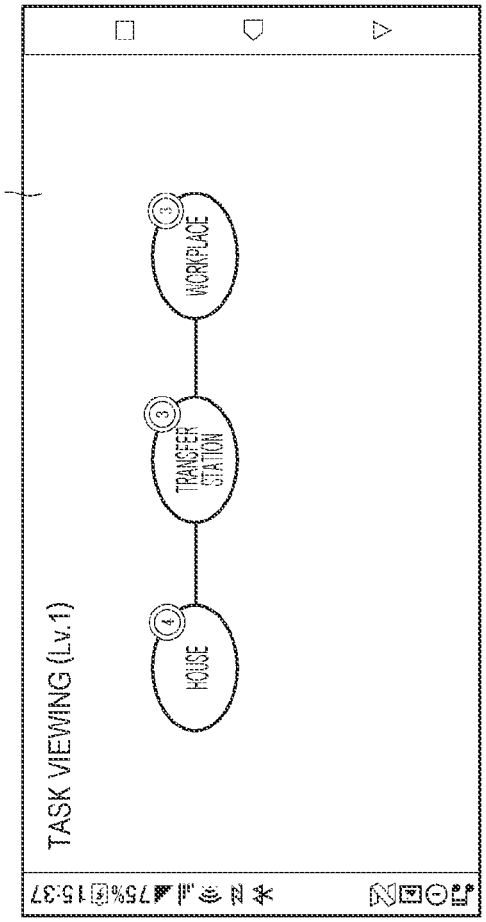
FIGS. 25A and 25B are diagrams referred to when a task viewing example according to the embodiment is explained.
Figure 25B:
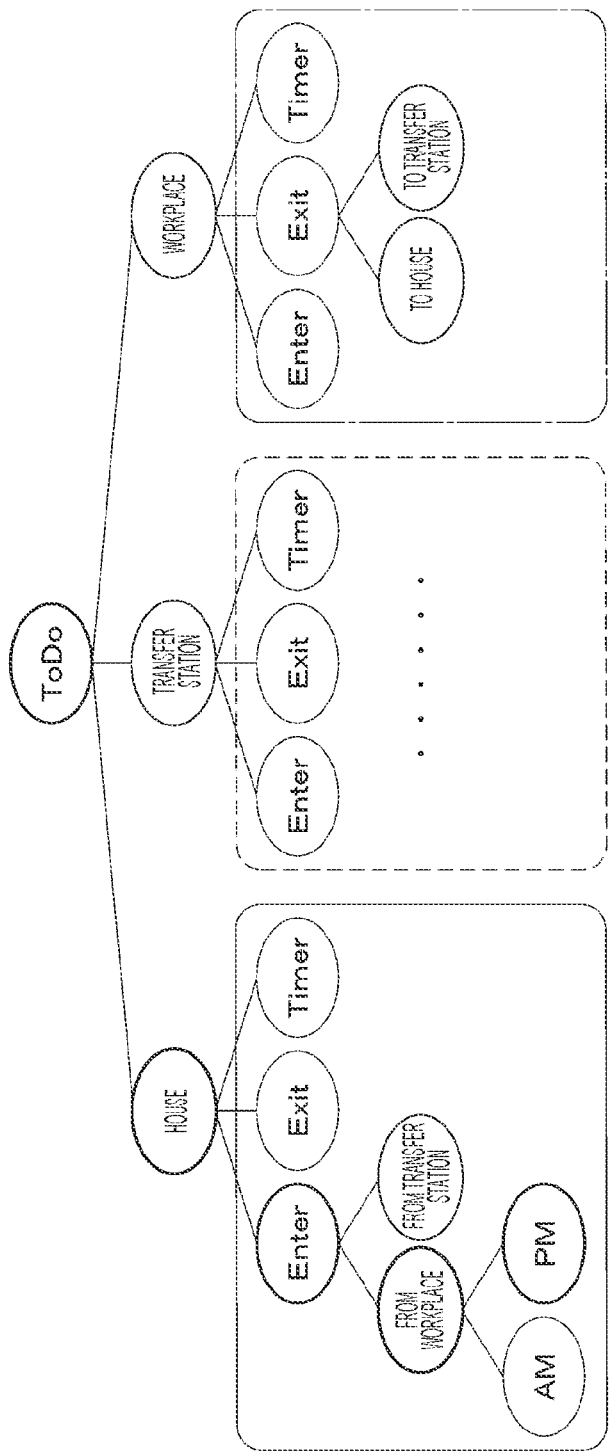

FIG. 25A is a diagram illustrating a screen example after the transition. A plurality of POIs corresponding to the content of Lv.1 is displayed on the display unit 11. For example, as example of the POI, "house", "transfer station", and "workplace" are displayed on the display unit 11. A numeral "4" is displayed in the vicinity of the "house", a numeral "3" is displayed in the vicinity of the "transfer station", and a numeral "3" is displayed in the vicinity of the "workplace". Each numeral indicates the number of tasks of Lv.2 and lower levels associated with each POI as illustrated in FIG. 25B. Specifically, the numeral indicated in the vicinity of each POI indicates that the number of tasks in a range surrounded by the solid line in FIG. 25B is "4", the number of tasks in a range surrounded by the dotted line is "3", and the number of tasks in a range surrounded by the one-dot chain line is "3". For example, when the location of the numeral is tapped, the screen transitions to a content indicating the next layer (Lv.2). Here, the description will be given assuming that the location of the "house" is tapped.

Figure 26A:
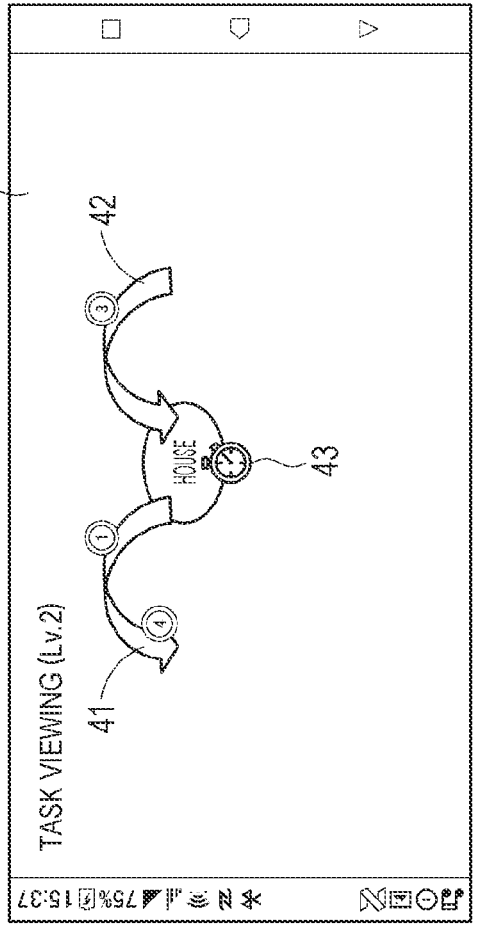
FIGS. 26A and 26B are diagrams referred to when a task viewing example according to the embodiment is explained.
Figure 26B:
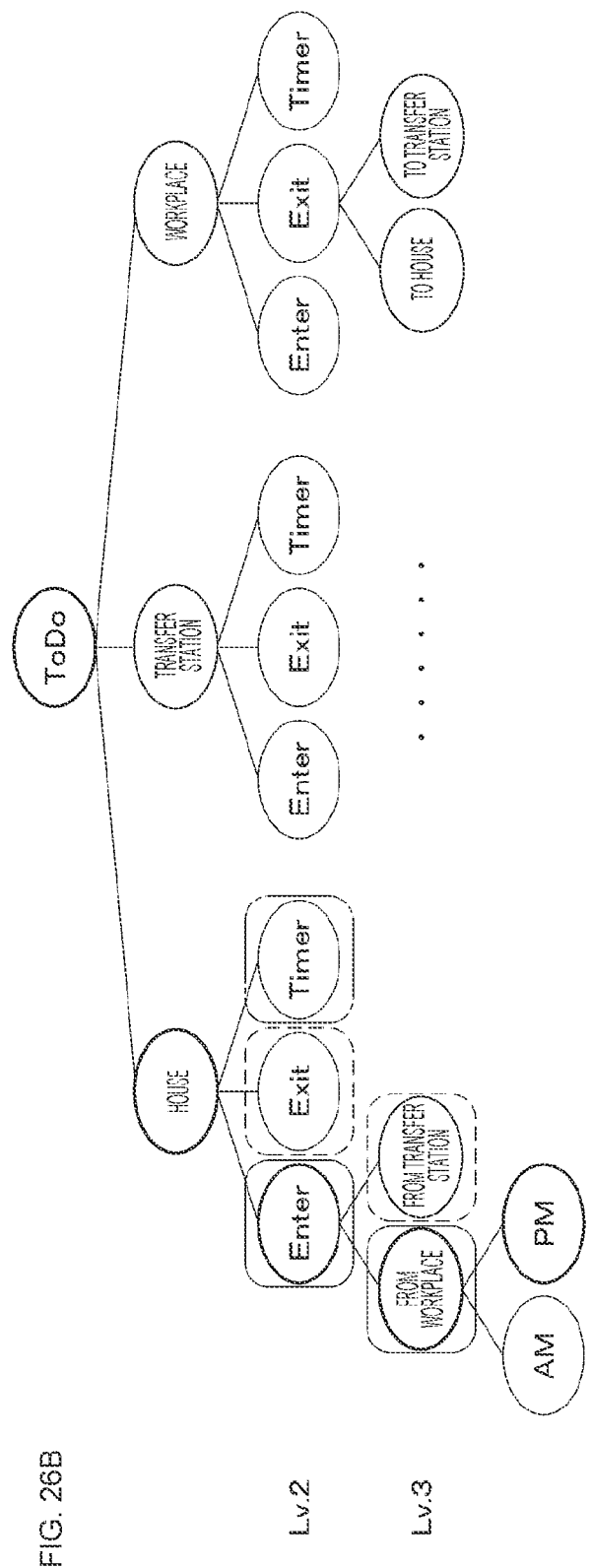

FIG. 26A is a diagram illustrating a screen example after the transition. A POI corresponding to the content of Lv.2, specifically, the "house" is displayed on the display unit 11. Furthermore, an arrow 41 extending out of a display of the "house", an arrow 42 entering the display of the "house", and a timer display 43 indicating a clock are displayed in the vicinity of characters of the "house". Moreover, a numeral "1" is displayed in the vicinity of the arrow 41, and a numeral "3" is displayed in the vicinity of the arrow 42. Each numeral indicates the number of tasks of Lv.3 and lower levels associated with a direction corresponding to each POI as illustrated in FIG. 26B. Specifically, the numeral indicated in the vicinity of each POI indicates that the number of tasks in a range surrounded by the solid line in Lv.2 of FIG. 26B is "3", the number of tasks in a range surrounded by the dotted line is "1", and the number of tasks in a range surrounded by the one-dot chain line is "0". For example, when the location of the numeral is tapped, the screen transitions to a content indicating the next layer (Lv.3). Here, the description will be given assuming that the location of the arrow 42 is tapped.

Figure 27:
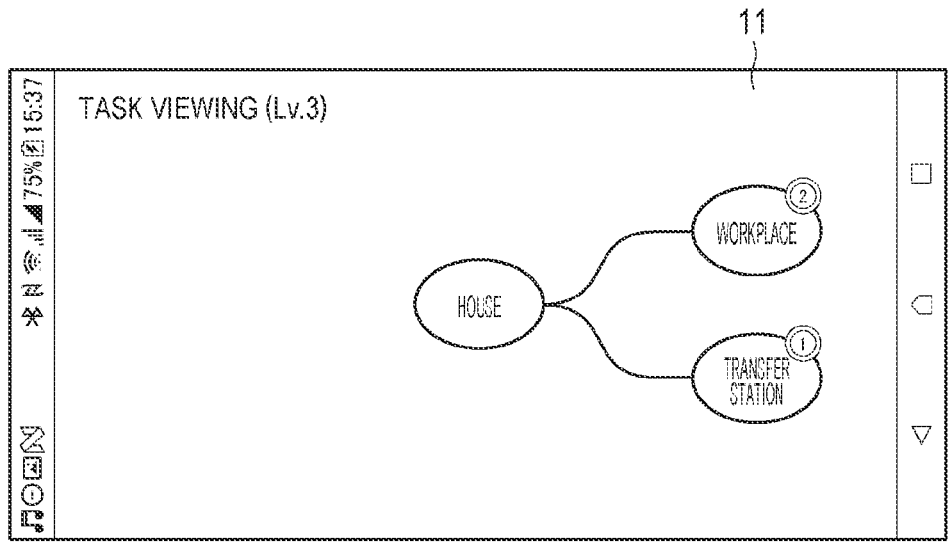
FIG. 27 is a diagram referred to when a task viewing example according to the embodiment is explained.

FIG. 27 is a diagram illustrating a screen example after the transition. Contents corresponding to the content of Lv.3, specifically, the "workplace" and the "transfer station" are displayed on the display unit 11 as departure points in the case of heading to the "house". Displays of the "workplace" and the "transfer station" are connected to a display of the "house" by lines. A numeral "2" is displayed in the vicinity of the "workplace", and a numeral "1" is displayed in the vicinity of the "transfer station". The numerals indicate that the number of tasks in a range surrounded by the solid line in Lv.3 of FIG. 26B is "2", and the number of tasks in a range surrounded by the dotted line is "1". As described above, the display is made that causes the levels to transition from each other. Note that, in a case where a content of Lv.4 is set, the content of the screen transitions from Lv.3 to Lv.4, similarly.

Figure 28A:
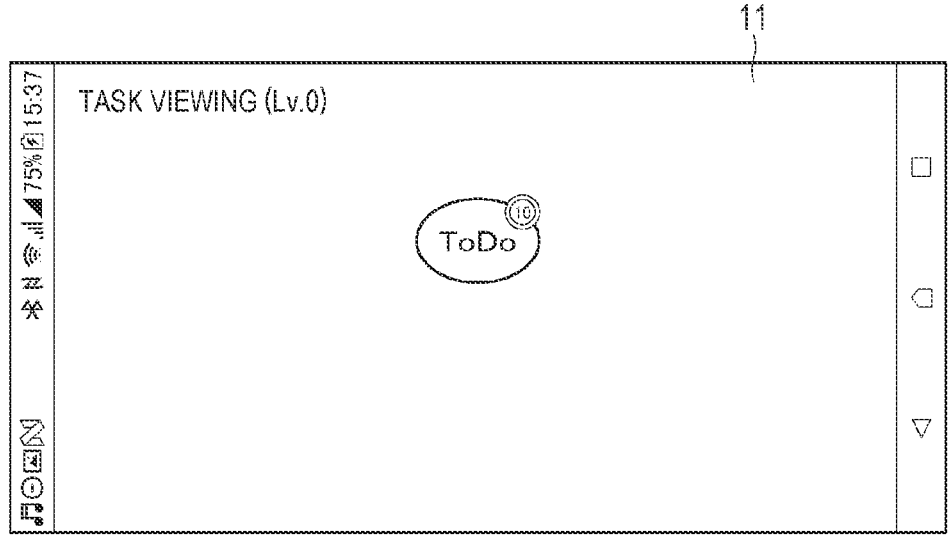
FIGS. 28A, 28B, and 28C are diagrams for explaining another example of operation of causing a display corresponding to each level to transition.
Figure 28B:
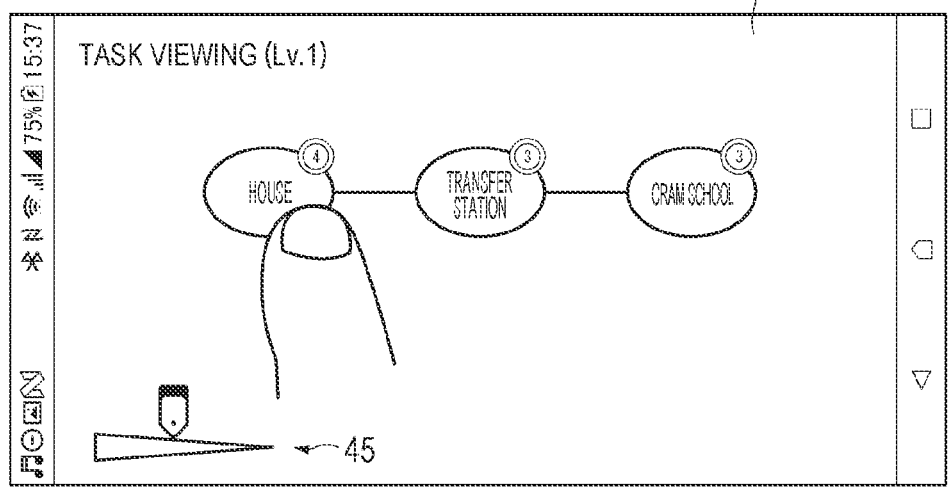
Figure 28C:
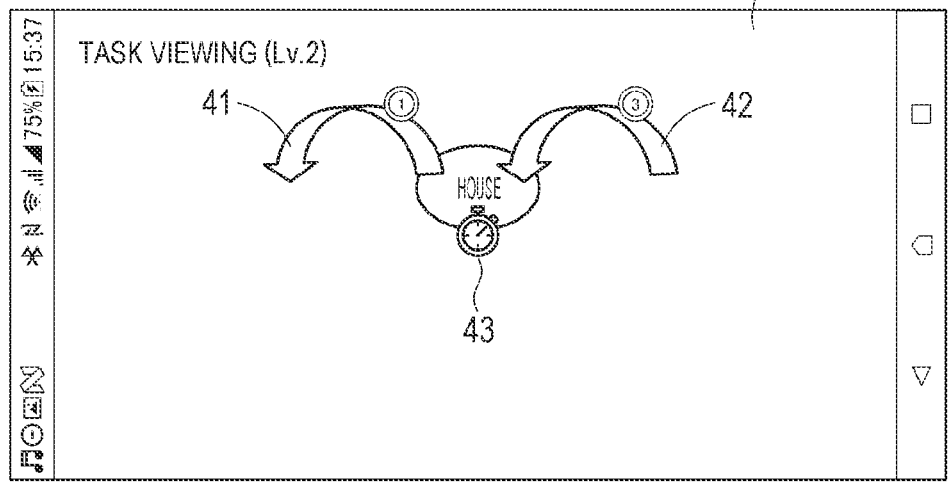

Note that, the operation of causing the displays corresponding to respective levels to transition from each other is not limited to the operation described above. For example, as illustrated in FIG. 28B, it is assumed that the content corresponding to the level Lv.1 is displayed on the display unit 11. A slider 45 is displayed, for example, at the lower left of the display unit 11. When zoom-out operation of dragging the slider 45 to the left side is performed, the content corresponding to a higher level layer, specifically, the content corresponding to Lv.0 may be displayed as illustrated in FIG. 28A. On the contrary, when zoom-in operation of dragging the slider 45 to the right side is performed, the content corresponding to a lower level layer, specifically, the content corresponding to Lv.2 are displayed as illustrated in FIG. 28C. Depending on the amount (finger displacement) of drag operation, the content corresponding to a further higher level or further lower level layer may be displayed. Of course, not limited to the operation using the slider 45, the display transition corresponding to each level may be performed depending on the number of taps, the touch time, the strength of the pressure when the display unit 11 is touched, or the like.

After causing the contents of respective levels to transition from each other as described above, the user views a specific content of the task by performing predetermined operation in an appropriate display. A description will be given of an example of operation of viewing the specific content of the task with reference to FIGS. 29A, 29B, and 29C.

Figure 29A:
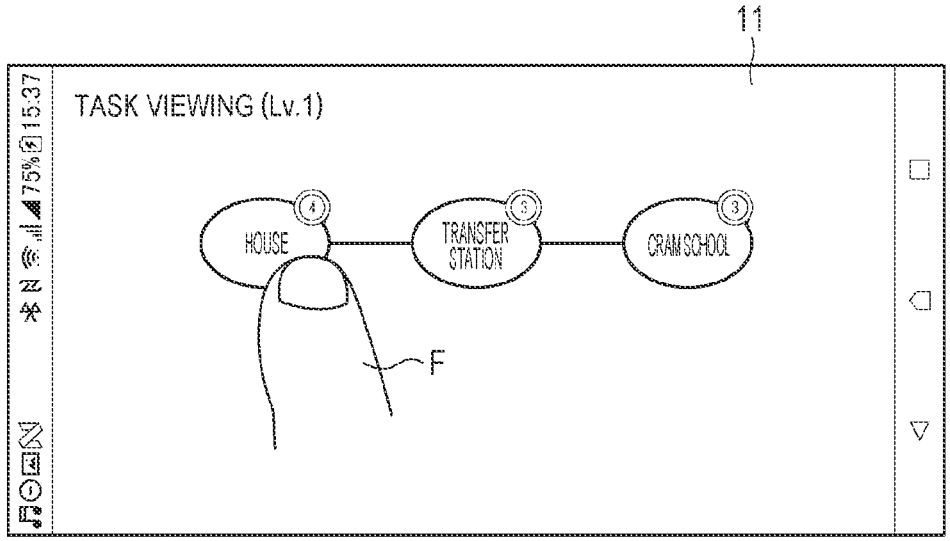
FIGS. 29A, 29B, and 29C are diagrams referred to when an operation example of viewing a specific content of a task is explained.

For example, as illustrated in FIG. 29A, it is assumed that the content corresponding to Lv.1 is displayed on the display unit 11. Here, an example is considered in which the user wants to view the specific content of the task instead of confirming the contents of the further lower level layer. Specifically, a case is considered where the user wants to view the content of the task set in the "house" that is one of the POIs, in a display state of FIG. 29A.

Figure 29B:
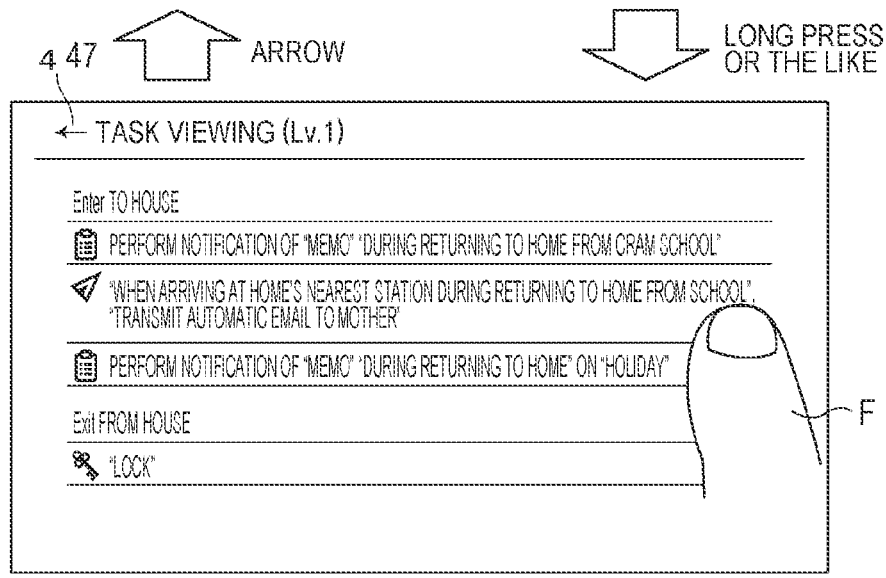

For example, the user presses and holds the location where "house" is displayed. In accordance with the long press operation, the screen content transitions to the content illustrated in FIG. 29B. As illustrated in FIG. 29B, contents of a plurality of tasks (four tasks in the illustrated example) corresponding to the "house" are displayed in a list on the screen after the transition. Specifically, three tasks are displayed as tasks at the time of entering to the "house", and one task is displayed as a task at the time of exiting from the "house". Note that, as illustrated in FIG. 29B, an arrow 47 is displayed, for example, on the upper left of the display unit 11. The arrow 47 is tapped, whereby the display content of the display unit 11 returns to the content of the previous screen (screen illustrated in FIG. 29A).

Figure 29C:
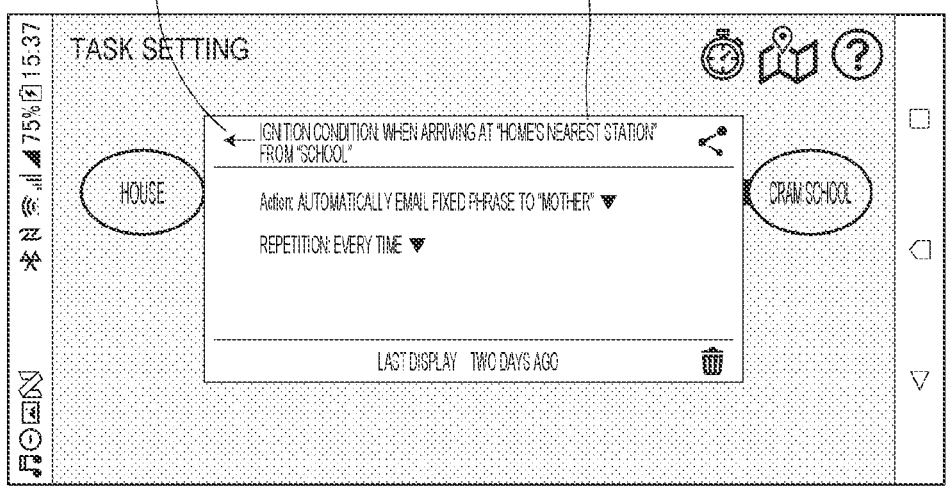

Since the contents of the tasks are displayed in a list in this way, the user can easily confirm the contents of the tasks associated with the "house". In the present embodiment, a predetermined task is tapped among the tasks displayed in the list, whereby transition is performed to an individual screen of the task. For example, when a task (including a trigger) "transmit an automatic email to the mother when the nearest station is reached during returning to home from the school" is tapped among the tasks displayed in the list, a task setting screen 48 of the tapped task is displayed on the display unit 11 as illustrated in FIG. 29C. By displaying the individual setting screen 48, it is possible to view a more detailed content of the task. Moreover, the content of the task may be enabled to be edited with use of the setting screen 48. Since the display content of the setting screen 48 is similar to that of the setting screen 21 and the like, duplicate description will be omitted. Note that, an arrow 48a is displayed, for example, on the upper left of the setting screen 48. When the arrow 48a is tapped, the display content of the display unit 11 transitions to the content of the previous screen (screen illustrated in FIG. 29B).

Note that, the task setting and viewing described above may be enabled to be selected as a setting mode and a viewing mode by predetermined operations respectively performed, or the setting and viewing may be enabled to be performed at the same time without being distinguished as the modes.

(About Task Sharing)

By the way, even if the task can be set as described above, it is conceivable that there are some users who are not sure what kind of task should be set in what kind of location. Thus, in the present embodiment, a content of a task is shared so that the user of the smartphone 1 can view a task set by another user.

For example, the information acquisition unit 124 of the smartphone 1 accesses a server device (hereinafter, appropriately referred to as a task management server) that manages a task via the communication unit 14. Then, information regarding a task set by another user is acquired from the task management server. Furthermore, the user of the smartphone 1 transmits, for example, a content of a task set by the user oneself to the task management server.

Figure 30A:
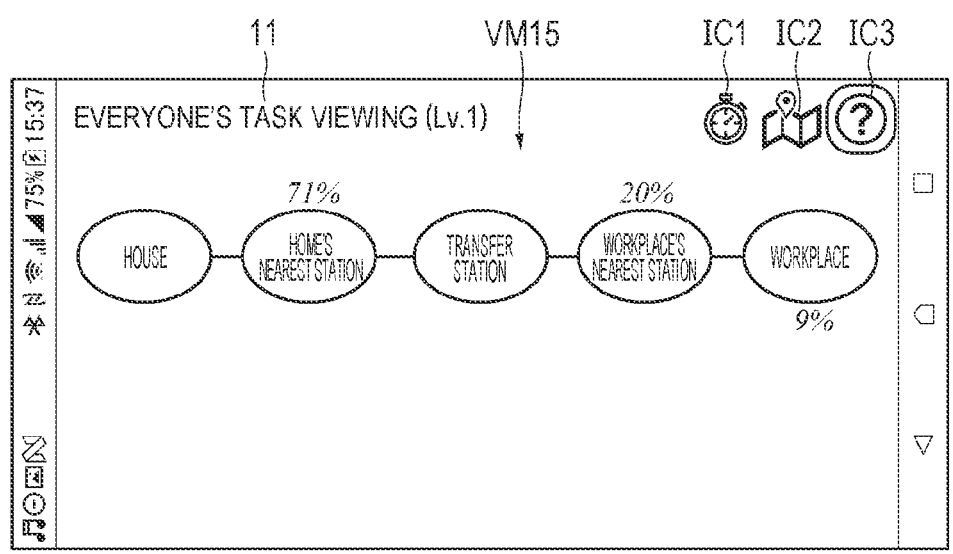
FIGS. 30A and 30B are diagrams referred to when processing of viewing a task set by another user is explained.

For example, as illustrated in FIG. 30A, a virtual map VM15 is displayed on the display unit 11. In this state, for example, the help icon IC3 is tapped by the user. In accordance with this operation, the information acquisition unit 124 acquires a task setting status for each POI from the task management server. Then, for example, the task management unit 126 normalizes the number of settings for each POI illustrated in the virtual map VM15 by 100%, and displays the number of tasks set for each POI as a percentage. An example is illustrated in FIG. 30A. In the example illustrated, 71% of tasks are set for the "home's nearest station", 20% of tasks are set for the "workplace's nearest station", and 9% of tasks are set for the "workplace". When a specific POI is not selected, a comprehensive ratio is displayed as illustrated in FIG. 30A.

Figure 30B:
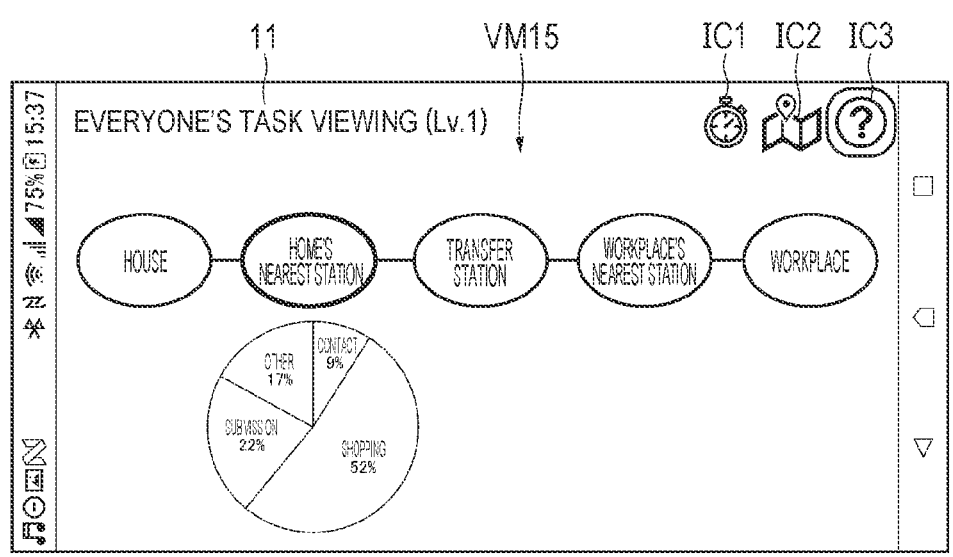

When a POI is selected, a more specific content of the task set for the POI is displayed. For example, when the "home's nearest station" is selected, as illustrated in FIG. 30B, contents of tasks set in the "home's nearest station" are displayed by percentages using, for example, a pie chart. Specifically, tasks related to "shopping" are set most, followed by tasks related to some "submission".

Contents of shared tasks may be enabled to be viewed hierarchically. For example, in a case where the shared tasks are displayed as illustrated in FIG. 31A, the user taps the location of the "memo". Then, as illustrated in FIG. 31B, percentages are displayed of specific contents of the memo. In the illustrated example, it is indicated that many users set a task to display a memo regarding "shopping" at the "home's nearest station". Moreover, when the location of the "shopping" is tapped, the screen transitions to a display illustrated in FIG. 31C. As illustrated in FIG. 31C, percentages are indicated of where the shopping is performed. Information on where the shopping is performed is managed by the task management server.

However, disclosing the contents of the tasks excessively in detail is to disclose actions of individuals, which may infringe on privacy. Thus, it may be enabled to view the contents of the tasks of other users up to a layer (level) disclosed by the user to the task management server.

For example, in a case where the user tries to view a layer lower than a layer that the user oneself allows disclosing, as illustrated in FIG. 31D, a content is displayed indicating that viewing is not possible. In this case, a question to change the settings may be given. That is, the level of disclosing the contents of the tasks of the user oneself may be lowered, that is, more detailed contents may be disclosed. In a case where the user of the smartphone 1 agrees to disclose the more detailed contents, it may be enabled to view the contents illustrated in FIG. 31D.

Note that, even in a case where the same "home's nearest station" is selected, in a case where designation is made including the route, the contents may change significantly of the tasks of other users that can be viewed. For example, as illustrated in FIG. 31E, in a case where the "home's nearest station" is selected after designating returning from school, the majority of the task of other users is not the "memo" but is the "contact", and the contents of the tasks shared with other users change. Note that, designation of the route can be performed, for example, by tapping the help icon IC3 after performing drag operation from the "school" to the "home's nearest station".

Figure 32:
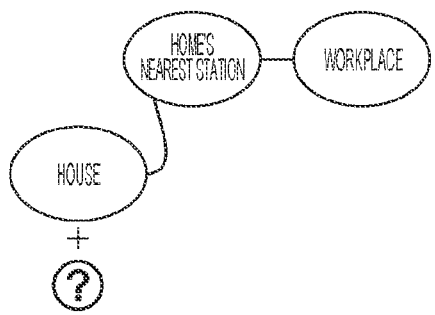
FIG. 32 is a diagram for explaining another example of viewing a task set by another user.

Note that, the display related to the tasks shared with other users is not limited to the display of the percentage using the pie chart. For example, as illustrated in FIG. 32, among the shared tasks of other users, the contents of tasks having a large number of settings may be displayed in a list format.

Furthermore, in a case where the user wants to use the shared task, it may be enabled to select and set the task to be used. Selection of a task is made, for example, by checking a check box displayed on the left side of the task. Note that, in this case, a display that enables setting may be displayed on the display unit 11, for example, an icon 49 including characters "try to use" as illustrated in FIG. 32. The selected task may be automatically set by tapping of the icon 49.

[Specific Example of Task Management Using Real Map]

In the above description, a description has been given of a specific example of task management using a virtual map. Next, a description will be given of a specific example of task management using a real map. The real map is, for example, information corresponding to an actual map, and specifically, means a map corresponding to map data provided by a service provider or the like via a network or a medium, a map obtained by capturing a map drawn on a paper medium, or the like (Task Setting Example)

First, a description will be given of a task setting example using a real map. As illustrated in FIG. 33A, a real map RM1 is displayed on the display unit 11. The real map RM1 is, for example, a map corresponding to a content in which the station AA is designated as a starting point and a workplace BB is designated as an arrival point. On the real map RM1, a route RT1 from the station AA toward the workplace BB is displayed.

For example, the user presses and holds any location on the route RT1. Then, as illustrated in FIG. 33B, a task setting screen 51A is displayed. Using the task setting screen 51A, the user can set a task content, a task notification mode, and the like. Since the setting method has already been described in the description part regarding the task setting screen 21A and the like, duplicate description will be omitted. When a task is set at a predetermined location on the route RT1 with use of the task setting screen 51A, a task point TP1 is displayed that is a display indicating that the task is set at the location, as illustrated in FIG. 33C. In FIG. 33C, the task point TP1 is indicated by a colored circle, but a display mode of the task point TP1 can be appropriately set.

The task point TP1 is usually indicated by a circle. When the task point TP1 is tapped, a detailed content of the task is displayed in a pop-up, as illustrated in FIG. 33C. Note that, the detailed content of the task may be displayed by screen transition.

(Route Setting Example in which Execution of Task is Prioritized)

Next, a description will be given of a route setting example in which execution of a task is prioritized. For example, as illustrated in FIG. 34A, the real map RM1 is displayed on the display unit 11. As described above, the real map RM1 includes the station AA, the workplace BB, and the route RT1 that is the shortest route connecting the station AA to the workplace BB. Furthermore, the real map RM1 includes a task point TP2 set at a location deviating from the route RT1.

The task corresponding to the task point TP2 includes a content that the task category is "shopping", the location category is "store, convenience store", and the task content is "buy a ballpoint pen". Here, when the task point TP2 is, for example, pressed and held, the route RT1 is changed to a route RT2 including the task point TP2, as illustrated in FIG. 34B. That is, a route is reset and displayed that passes through a location of the task point TP2 during heading from the station AA to the workplace BB. Note that, an icon that can designate task-priority route setting that can execute more tasks may be displayed on the display unit 11. Then, in a case where the icon is tapped, a route in which more tasks can be executed may be displayed on the display unit 11.

Figure 35:
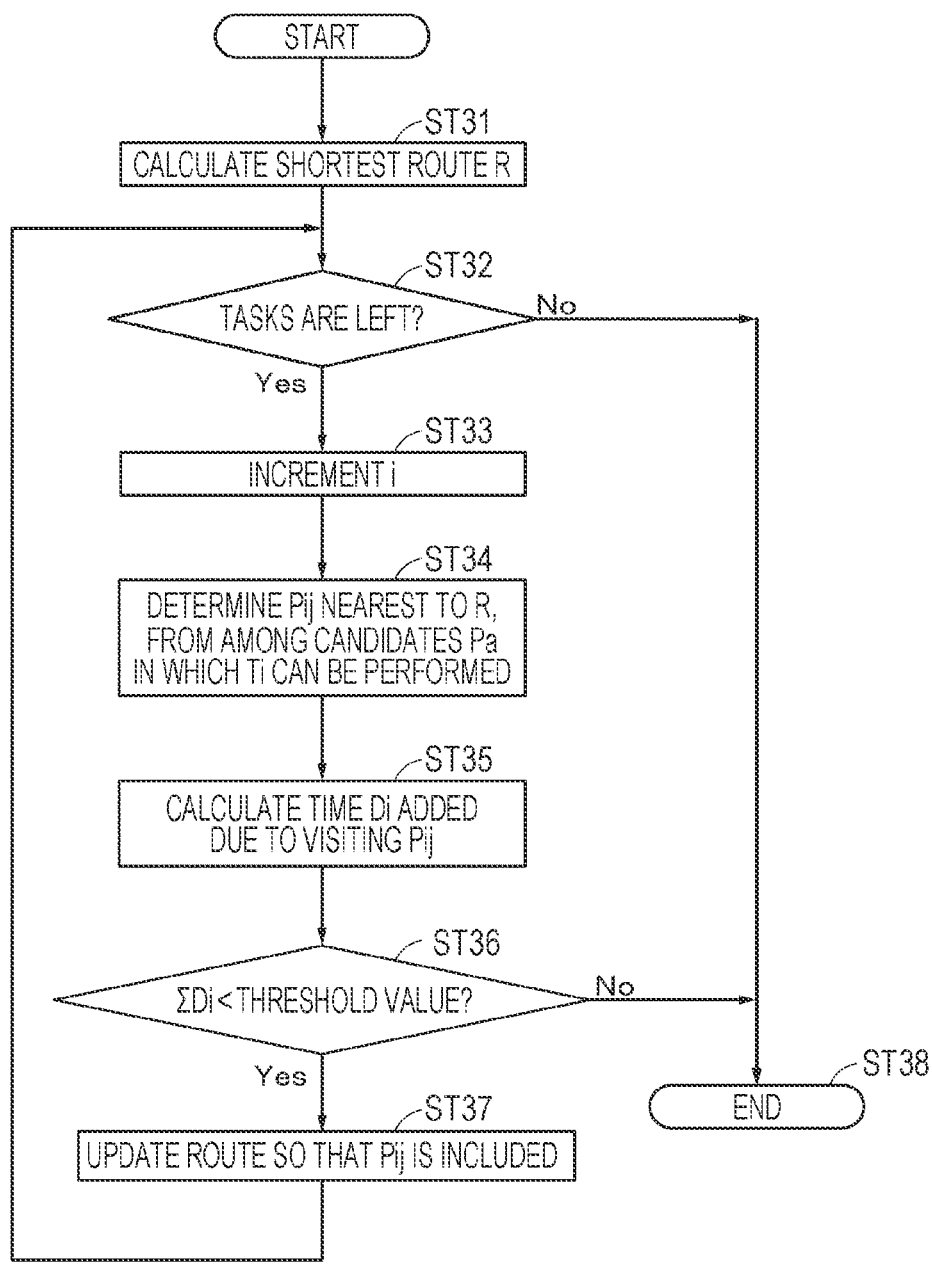
FIG. 35 is a flowchart illustrating a flow of processing of resetting a predetermined route such as the shortest route to a route in which execution of a task is prioritized.

A description will be given of a flow of processing of resetting a predetermined route such as the shortest route to a route that gives priority to task execution, with reference to the flowchart illustrated in FIG. 35. In the following description, a case is considered where a departure point is S and a destination is E, and tasks (T1 to TN) to be processed are fixed. For each task, it is assumed that point candidates are known in which the task can be performed. For example, for a task "license renewal", there is a list of test sites and designated police stations as the point candidates. Furthermore, it is assumed that the tasks T1 to TN are sorted in descending order of priority (importance). Note that, the processing described below is executed by the control unit 12, specifically the task management unit 126, and it is possible to appropriately set which functional block performs the processing.

When the processing is started, in step ST31, a shortest route R from the departure point S to the destination E is calculated. Then, the processing proceeds to step ST32. In step ST32, it is determined whether or not there are any tasks left for which rerouting is performed. In a case where there are no tasks left, the processing proceeds to step ST38 and the processing ends. In a case where there are tasks left, the processing proceeds to step ST33.

In step ST33, a variable i is incremented. Then, the processing proceeds to step ST34. In step ST34, from among candidates Pa in which a task Ti can be performed, a candidate point (location where a predetermined task is executed) Pij nearest to the shortest route R is determined. Then, the processing proceeds to step ST35.

In step ST35, a time Di is calculated that is required to be added due to visiting (stopping) the candidate point Pij. Then, the processing proceeds to step ST36.

In step ST36, it is determined whether or not ΣDi that is an integrated value of Di is smaller than a threshold value. Even if the task can be executed, if a time required from the departure point S to the destination E is significantly increased due to that, it is not appropriate as a recommended route for the user. Thus, in this example, it is determined whether or not ΣDi that is the integrated value of Di is smaller than the threshold value. In a case where ΣDi is greater than or equal to the threshold value, the processing proceeds to step ST38, and the processing ends without updating the route. In a case where ΣDi is less than the threshold value, the processing proceeds to step ST37.

In step ST37, the route is updated to include the candidate point Pij. The updated route is displayed on the display unit 11. Then, the processing returns to step ST32, and the processing of step ST32 and subsequent steps are repeated.

(Re-Proposal of Task Execution Location Corresponding to Rerouting)

In a case where rerouting is performed, a location where the task is executed may be re-proposed to the user. For example, an example is considered in which a route RT5 from the station AA to the workplace BB is set as illustrated in FIG. 36A, and a task point TP5 is set in the vicinity of a predetermined location on the route RT5. The task corresponding to the task point TP5 includes a content that the task category is "shopping", the location category is "store, convenience store", and the task content is "buy a ballpoint pen".

For example, it is assumed that the destination is changed from the workplace BB to a visit destination CC. In this case, a re-search is performed for the route in accordance with the change of the destination, and as illustrated in FIG. 36B, a route RT6 is displayed that is a new route to the visit destination CC that is the destination. In a case where there is a location where a task can be executed on the route RT6, for example, a convenience store, a new task point TP6 may be automatically set and displayed. As a result, even in a case where rerouting is performed, the user does not need to again set the location where the task is executed, and can recognize the automatically reset location where the task can be executed.

Note that, for example, in a case where a public transportation is used, D may be obtained by re-search instead of simple addition. As a result, for example, in a case where an express train operating only once in an hour is to be missed due to shopping, it is possible to avoid recommending the route. Furthermore, searching in order of task priority is not essential. In the above flow, the tasks are looked in order from the highest priority, but for example, a case may occur where "amount of addition D2 in a case where both tasks with second and third priority are performed"<"amount of addition D1 in a case where a task with first priority is performed". Thus, search for an appropriate route may be performed by performing a full search of routes, and a found route may be recommended.

[Linked Display of Virtual Map and Real Map]

In the above description, a description has been given of task management using a virtual map and task management using a real map. However, in the present embodiment, it is possible to perform display (linked display) in which the virtual map and the real map are linked with each other, and task management based on the linked display is also possible.

(Outline)

Figure 37:
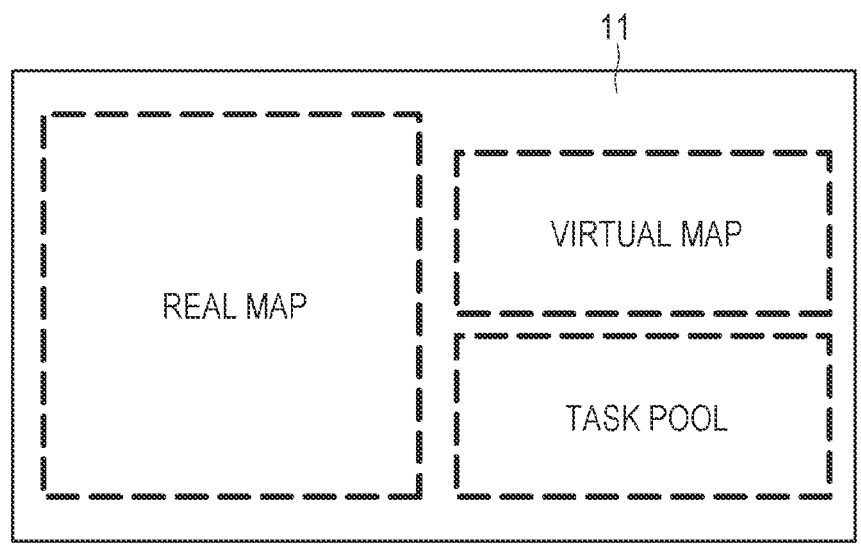
FIG. 37 is a diagram for explaining an outline of a linked display of the virtual map and the real map.

First, an outline will be described of the linked display of the virtual map (second map information) and the real map (first map information). FIG. 37 is a diagram illustrating an outline of the linked display of the virtual map and the real map. As illustrated in FIG. 37, the display unit 11 displays the real map, the virtual map, and a task pool that is an area where tasks are displayed. Display positions and sizes of the real map and the like can be set as appropriate. In the present embodiment, the real map is displayed on the left side of the display unit 11, the virtual map is displayed on the upper right side, and the task pool is displayed on the lower right side. To facilitate operation described later, it is preferable that boundary lines bordering the real map, the virtual map, and the task pool are displayed, but it does not have to be displayed.

For example, POIs existing in the real map and a route connecting the POIs are displayed on the virtual map. Thus, a locational range of the real map and a locational range of the virtual map are almost the same. Tasks existing in the range are displayed in the task pool.

When a map content illustrated in the real map is enlarged or reduced, a content of the virtual map may change accordingly. On the contrary, when operation to enlarge the locational range or operation to reduce the locational range is performed on the virtual map, the map content illustrated in the real map may also be expanded or reduced accordingly. When a change occurs in the locational range indicated by the real map and the virtual map, the tasks included therein may also change. Thus, in a case where a change of the task occurs, a display content in the task pool also changes. Thus, at least one display content of the real map, the virtual map, or the content of the task pool changes depending on an operation input to the display unit 11. In the case of a linked change, at least two display contents of the real map, the virtual map, or the task pool change depending on the operation input to the display unit 11.

Note that, in a case where the number of tasks in the task pool is large, a display area may be dynamically changed so that a display area of the task pool itself is enlarged, and areas of the virtual map and the real map are reduced accordingly.

An outline will be described of a task and the task pool including the task. For example, it is possible to set the following properties for the task. Note that, in the following, specific examples are indicated in association with the respective properties.

Task category/shopping
Location category/store, convenience store
Location candidate setting/Yes
Deadline to execute the task/2018 Jun. 7
Task importance/1 (for example, the higher the importance, the more important)
(Note that, in addition to importance, urgency, ease of execution, and the like can be set)
Task required time (minute)/10 minutes The task pool has, for example, the following characteristics.

Tasks in the task pool can be sorted and displayed. The sort order is made depending on the importance, urgency, and ease of execution.

The display can be switched depending on presence or absence of an execution location set flag.

It is possible to set display/non-display for an execution location set task.

(Specific Display Example of Task Pool)

Figure 38:
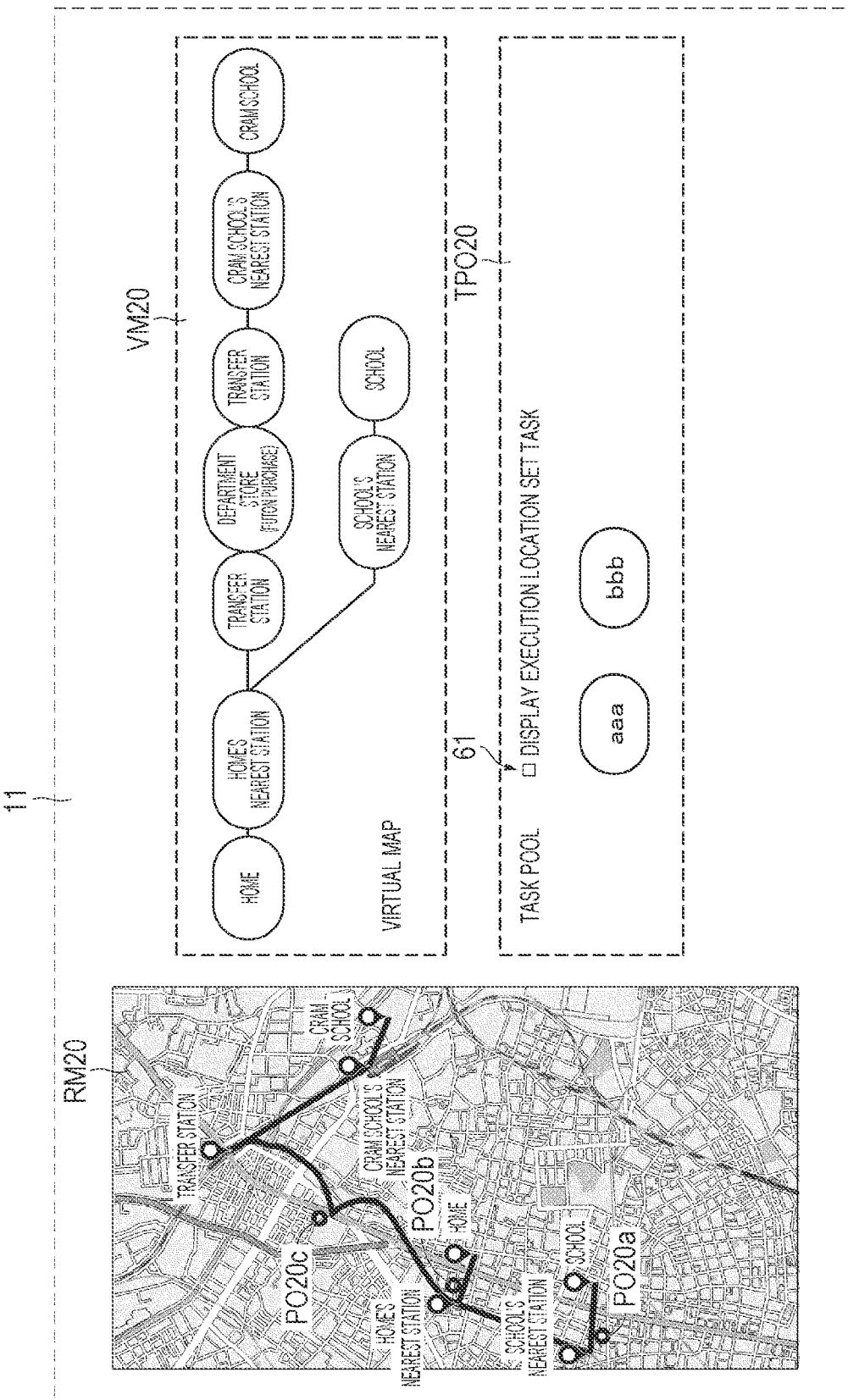

Next, a description will be given of a specific display example of the task pool and the like. FIG. 38 is a diagram illustrating a specific display example of the task pool and the like. A real map RM20, a virtual map VM20, and a task pool TPO20 are displayed on the display unit 11.

The virtual map VM20 includes "home", "home's nearest station", "transfer station", "department store", "cram school's nearest station", "cram school", "school's nearest station", and "school" as examples of the POI, and the POIs are connected to each other by lines corresponding to routes. The position of each POI is mapped in the real map RM20 in a display form in which each position can be understood by the user. Note that, "futon purchase" is displayed under the "department store" that is one of the POIs. This indicates a task to be performed in the department store. That is, the task "buy a futon" is a task for which a location where the task should be performed has been set.

In the task pool TPO20, for example, a task "aaa" and a task "bbb" are displayed. Note that, specific contents of "aaa" and "bbb" can be set as appropriate. Furthermore, a check box 61 is displayed in the task pool TPO. The check box 61 is for setting whether or not to display a task for which an execution location has been set. In a case where the check box 61 is checked, the task for which the execution location has been set is displayed, and in a case where the check box 61 is not checked, the task for which the execution location has been set is not displayed. FIG. 38 illustrates an example of the latter. Note that, the check setting for the check box 61 can be performed, for example, by tapping the check box 61.

In the real map RM20, candidate points are indicated as candidates for locations where the task "aaa" or the task "bbb" can be executed, and specifically, in the real map RM20, three candidate points (candidate points PO20a, PO20b, PO20c) are displayed. Note that, each candidate point may be displayed in a manner in which the user can recognize which task can be executed in the candidate points. For example, it is assumed the task "aaa" in the task pool TPO20 is displayed in red and the task "bbb" is displayed in yellow. In this case, a candidate point where the task "aaa" can be executed may be displayed in red, and a point where the task "bbb" can be executed may be displayed in yellow. Furthermore, in a case where the task "aaa" is tapped, the candidate point where the task "aaa" can be executed may be displayed, and in a case where the task "bbb" is tapped, the candidate point where the task "bbb" can be executed may be displayed.

The user selects a candidate point desired by the user oneself or the task. When the candidate point is selected, a content of the selection is reflected in the real map RM20 and the virtual map VM20. For example, it is assumed that the candidate point PO20b is selected at a location where the task "aaa" is executed. In this case, a name of a POI corresponding to the candidate point PO20b and a content of the task "aaa" are added between the "home" and the "home's nearest station" of the virtual map VM20. Furthermore, the candidate point PO20b is displayed on the real map RM20 as a task execution point that is a location where the task should be executed. Furthermore, the task "aaa" is erased from the task pool TPO20 since the location where the task is performed has been set.

Figure 39:
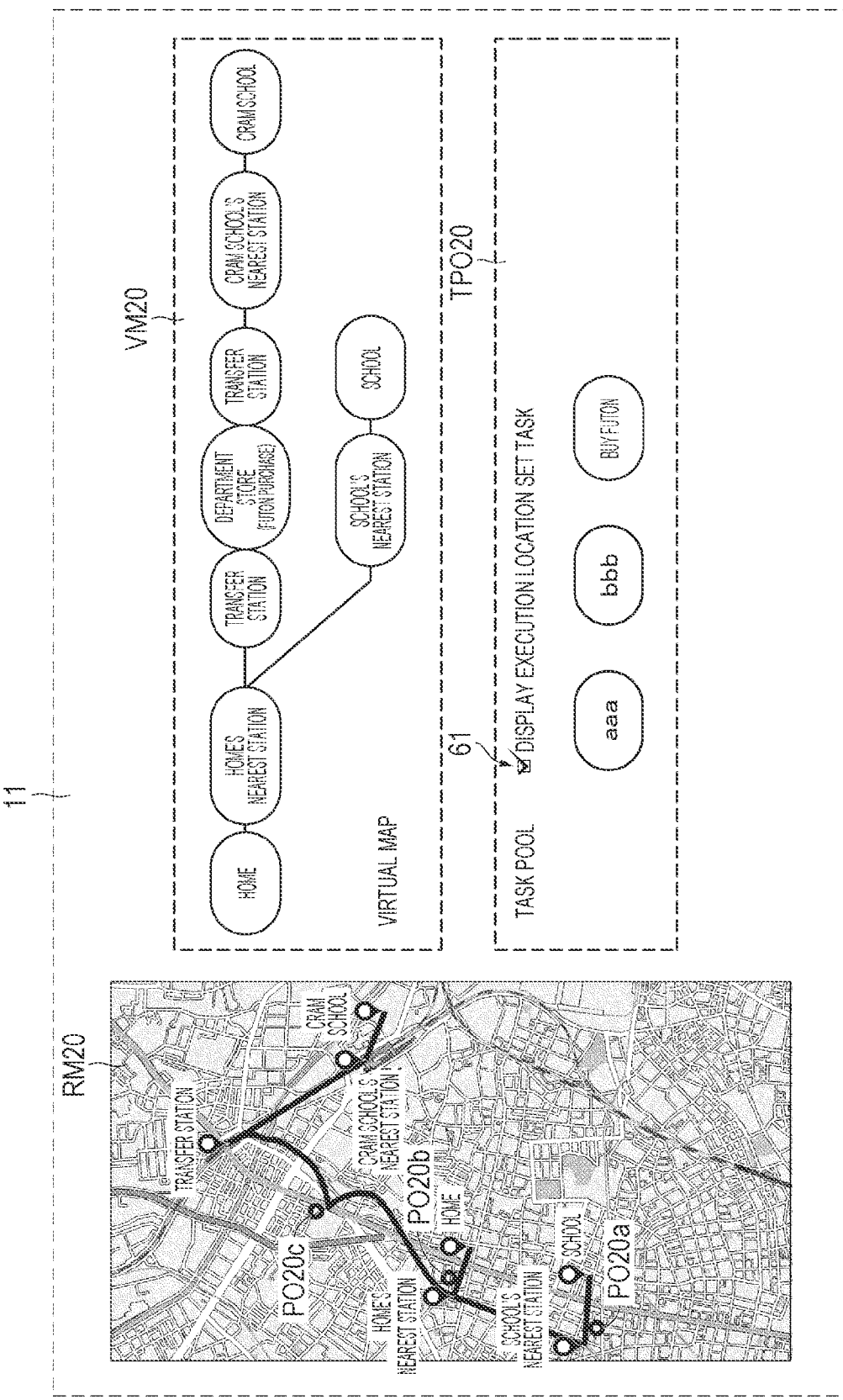

FIG. 39 is a diagram illustrating a specific display example of the task pool and the like. The point in the content illustrated in FIG. 39 different from the content illustrated in FIG. 38 is that the check box 61 is checked. In this case, the task for which the execution location has been set, specifically, the task "buy a futon" is displayed in the task pool TPO20.

Note that, in a case where the task for which the execution location is set is not executed, the execution location setting state may be continued, or the execution location setting state may be canceled and the task may temporarily return to the task pool. For example, in a case where the urgency of the task is low (there is a period before the execution deadline), and the like, the task may be returned to the task pool to wait for resetting of the task execution location.

In a case where a set content for which a certain point (A) is set as the task execution location is set to another point (B), task properties are changed to the new location (B). In a case where the task is not executed as a result, the task may be returned to the task pool as described above. Furthermore, a change history of a set location and presence or absence of execution may be recorded as a history.

When the execution location is set for the task returned to the task pool, the points (A) and (B) that have once been set as priority candidates for the execution location may be preferentially recommended. In the case of a UI with which the execution location is manually set, it is conceivable to display the points (A) and (B) at the top of the candidate list of execution locations. In a case where the execution location of the task is automatically set, the execution location at the top of the list may be automatically set.

In a case where the task is to be performed repeatedly, the execution location, or a location that has been set as the execution location but in which the task has not been performed, may be weighted and handled. Depending on the task, in the execution location, there is a case where the task is highly likely to be executed next time, but there is also a case where the task is not executed. The location that has been set as the execution location but in which the task has not been performed may have been set with an intention of performing the task, and may be prioritized as a candidate for the set location also in the future.

(Specific Example of Task Pool)

Figure 40:
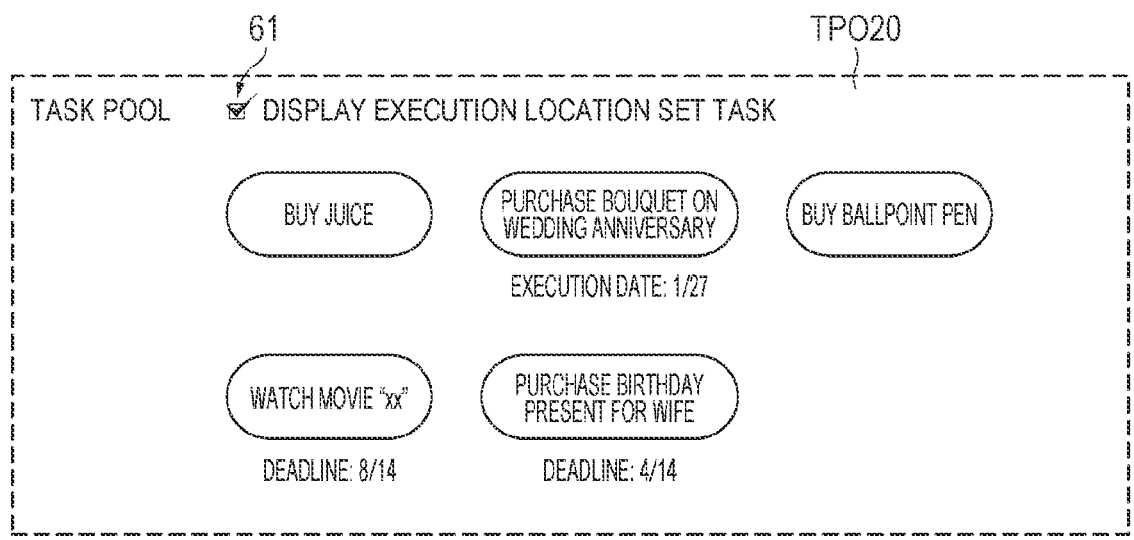
FIG. 40 is a diagram illustrating a specific display example of the task pool.

FIG. 40 is a diagram illustrating a specific display example of the task pool. Note that, in FIG. 40, only the task pool part is illustrated independently. In the task pool, tasks to be performed in a range of the location defined by the real map and the virtual map displayed at the same time are displayed side by side. The content of the task may be displayed as a pictorial content (for example, an image of a ballpoint pen or a ring, a thumbnail image of a movie, or the like) instead of characters so that the content of each task can be more easily recognized by the user.

In the example illustrated in FIG. 40, five tasks are displayed. Each task may be displayed in an order corresponding to a predetermined rule. Examples of the predetermined rule include the order of importance, the order of urgency, the order of ease of execution, and the like associated with the task. A content of the predetermined rule may be set by the user. All or part of the task properties (execution date and execution deadline in the illustrated example) may be displayed together with the content of the task. Furthermore, in a case where execution order of a plurality of tasks is designated, the ease of execution of the tasks lower in the order may be lowered (execution is difficult).

Figure 41A:
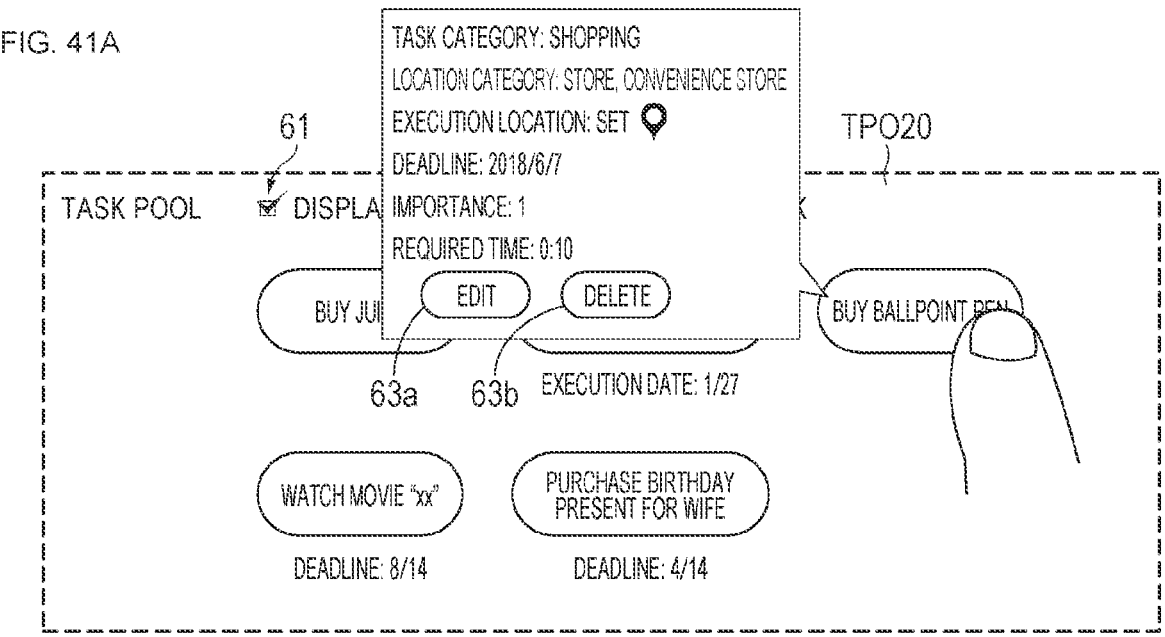
FIGS. 41A and 41B are diagrams for explaining a display example made when a task in the task pool is tapped.
Figure 41B:
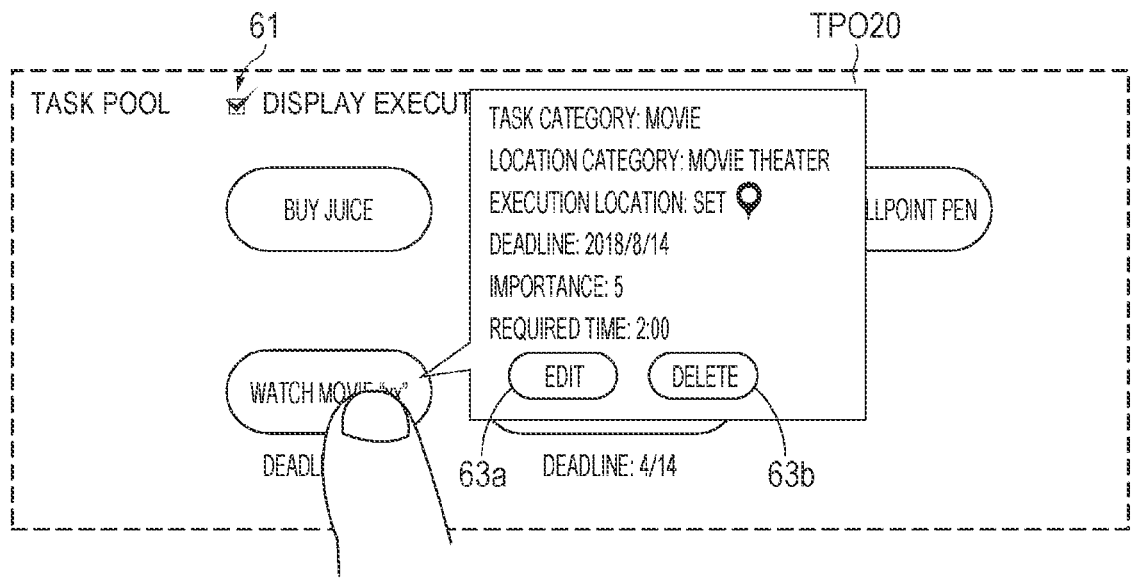

As illustrated in FIGS. 41A and 41B, when the user taps a task in the task pool, specific contents (properties) of the task can be displayed. FIG. 41A illustrates a display example when a task "buy a ballpoint pen" is tapped. Furthermore, FIG. 41B illustrates a display example when a task "watch the movie "xx"" is tapped. Note that, in a state where a specific content of a task is displayed, the content of the task can be edited or deleted. For example, in the example illustrated in FIG. 41A, in a case where the task "buy a ballpoint pen" is desired to be edited, it becomes possible to edit the task if an edit button 63a is tapped. Furthermore, by tapping a delete button 63b, it becomes possible to delete the task "buy a ballpoint pen".

(Specific Display Example Depending on Operation)

First Example

Figure 42:
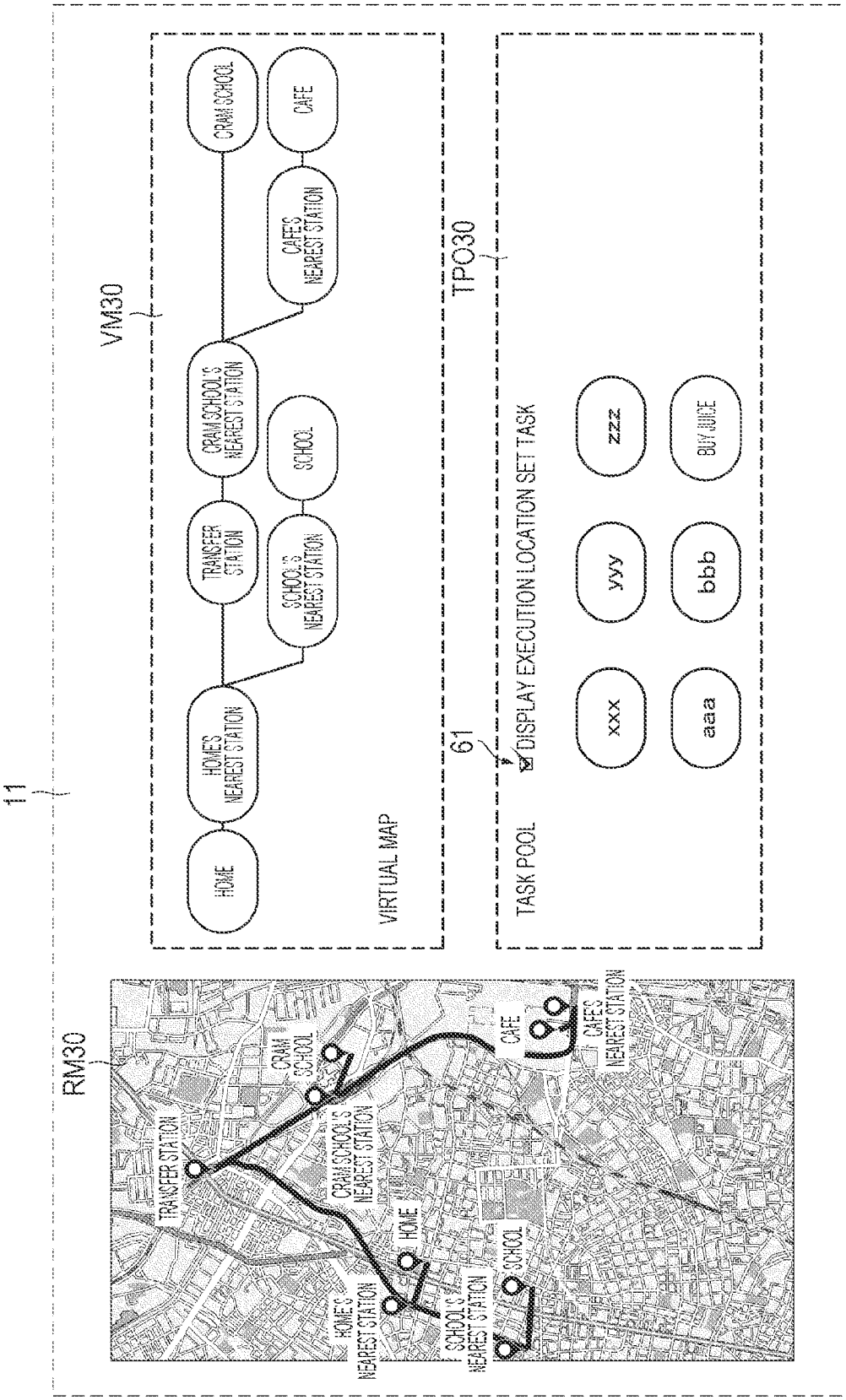
FIG. 42 is a diagram referred to when a first example is explained in which a display content changes depending on operation onto a display unit.

Next, a first example will be described in which the display content of the display unit 11 changes depending on operation performed on a predetermined display area of the display unit 11. For example, as illustrated in FIG. 42, it is assumed that a real map RM30, a virtual map VM30, and a task pool TPO30 are displayed on the display unit 11. As POIs, "home", "home's nearest station", "transfer station", "cram school's nearest station", "cram school", "school's nearest station", "school", "cafe's nearest station", and "cafe" are included, and the POIs are connected to each other by lines indicating routes.

Figure 43:
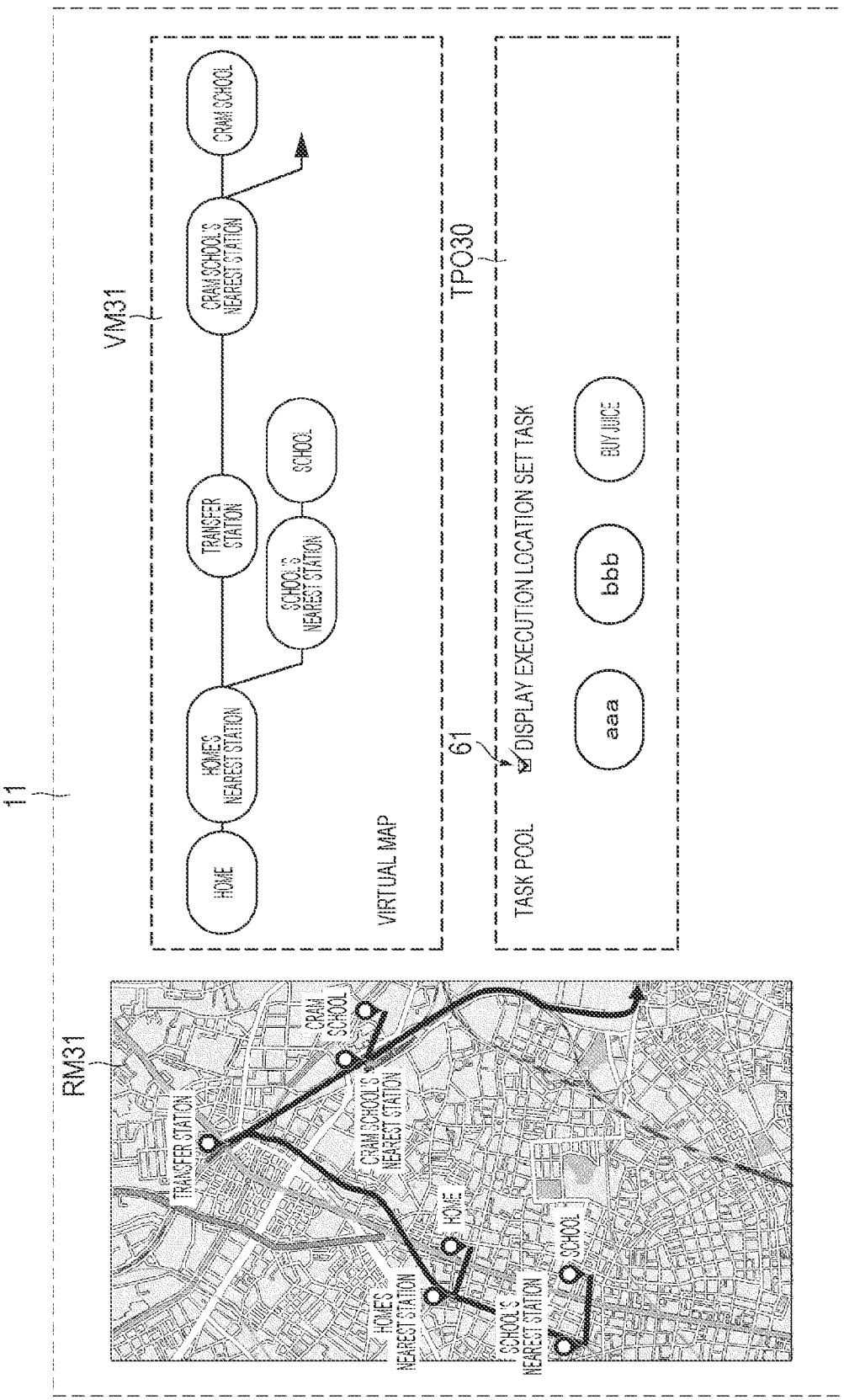
FIG. 43 is a diagram referred to when the first example is explained in which the display content changes depending on the operation onto the display unit.

Here, for example, an example is considered in which operation is performed of enlarging the real map RM30, more specifically, operation of zooming in on the real map RM30 by pinch operation on the display unit 11. Then, as illustrated in FIG. 43, a real map RM31 is displayed in which the display content of the real map RM30 is enlarged by zooming in. The real map RM30 is enlarged, whereby, in the real map RM31, the "cafe's nearest station" and the "cafe" that are each one of the POIs are out of a range indicated by the real map RM31. In this case, the content of the virtual map also changes in conjunction with the operation, whereby the virtual map changes from the virtual map VM30 to the virtual map VM31. Specifically, the virtual map VM31 is a virtual map in which the "cafe's nearest station" and the "cafe" are erased. Note that, in the present embodiment, the display of the route extending from the "cram school's nearest station" is left so that the user can recognize that there is a POI other than the "cram school" ahead of the "cram school's nearest station".

Moreover, as the locational range corresponding to the real map and the virtual map changes, tasks that can be performed in the range may also change. In a case where there is a change in the tasks that can be performed in the locational range corresponding to the real map and the virtual map, the content of the tasks in the task pool TPO30 also changes. For example, it is assumed that locations no longer exist where the task "xxx", the task "yyy", and the task "zzz" can be executed, in the locational range after the change. In this case, the three tasks are erased from the task pool TPO30.

Second Example

Figure 44:
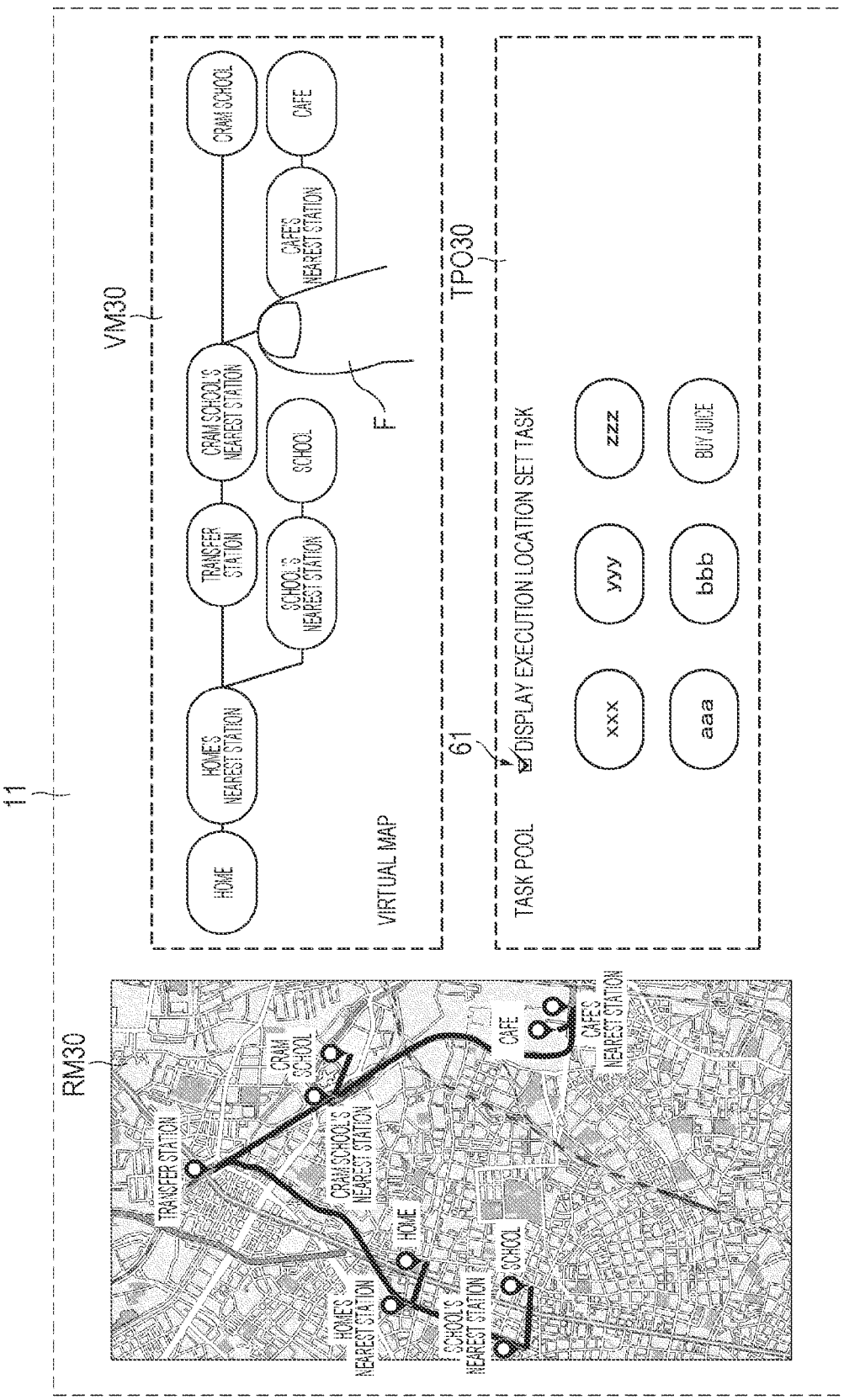
FIG. 44 is a diagram referred to when a second example is explained in which the display content changes depending on the operation onto the display unit.

Next, a second example will be described in which the display content of the display unit 11 changes depending on operation performed on a predetermined display area of the display unit 11. As illustrated in FIG. 44, the real map RM30, the virtual map VM30, and the task pool TPO30 are displayed on the display unit 11 similarly to the first example. In such a display state, for example, operation is performed of tapping the route between the "cram school's nearest station" and the "cafe's nearest station" with the finger F and pulling the route in a predetermined direction.

Figure 45:
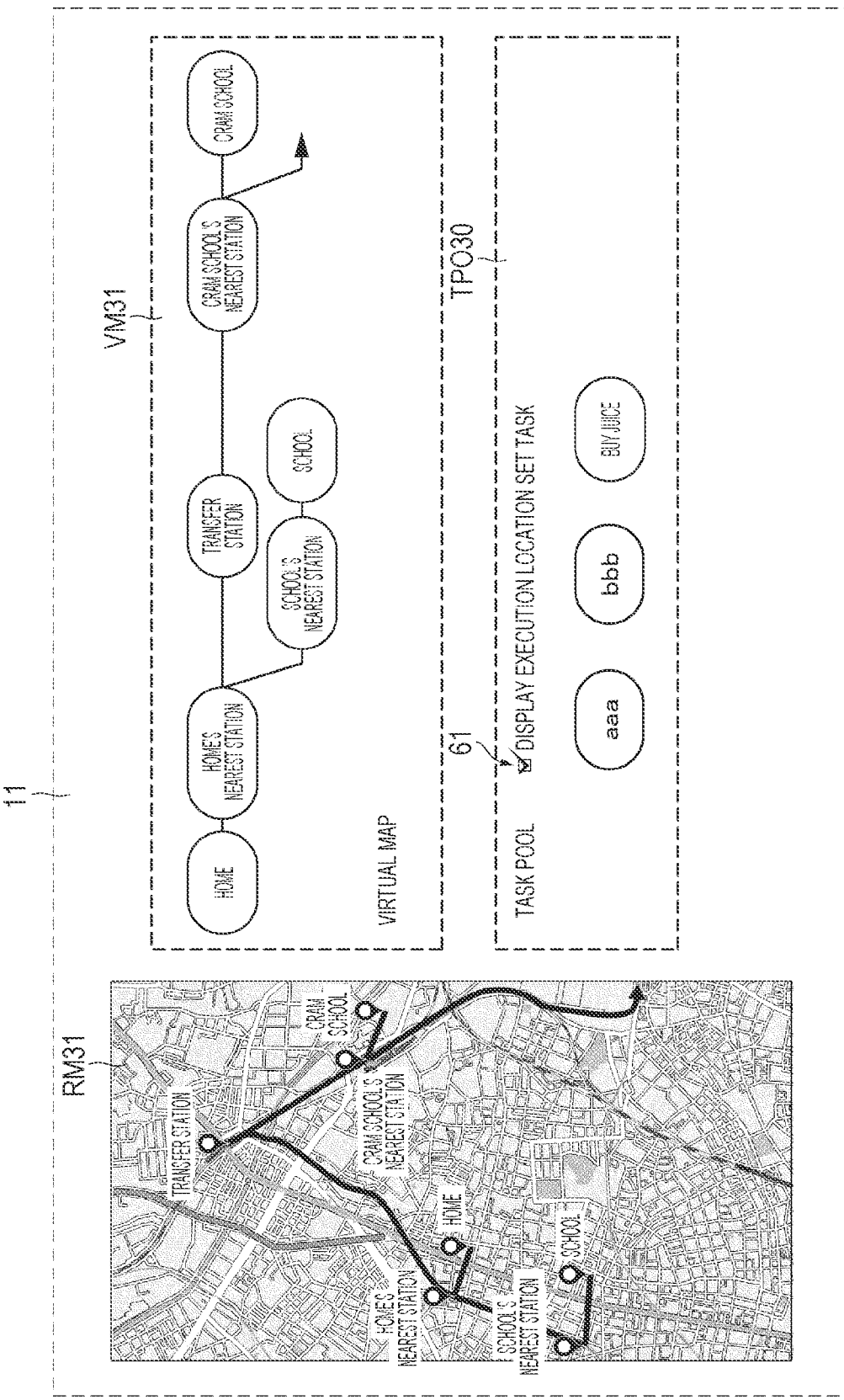
FIG. 45 is a diagram referred to when the second example is explained in which the display content changes depending on the operation onto the display unit.

In accordance with the operation, as illustrated in FIG. 45, the content of the virtual map changes from the virtual map VM30 to the virtual map VM31. Specifically, from the virtual map VM30, the virtual map VM31 is displayed in which the "cafe's nearest station" and the "cafe" are erased that are POIs corresponding to the route. With the change of the virtual map, the display content of the real map also changes from the real map RM30 to the real map RM31, and the tasks displayed in the task pool TPO30 also change. Since the contents of the real map RM31 and the tasks in the task pool TPO30 after the change are similar to those in the first example, duplicate description will be omitted.

Figure 46:
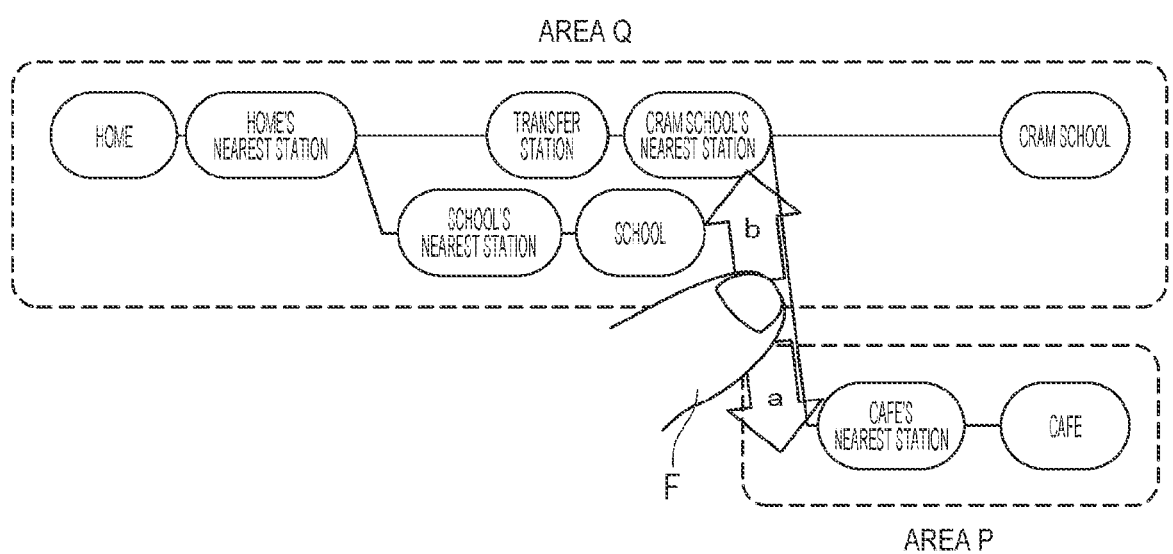
FIG. 46 is a diagram referred to when an example of operation of erasing a POI is explained.

Note that, as illustrated in FIG. 46, when the route between the "cram school's nearest station" and the "cafe's nearest station" is tapped, an area P including POIs existing ahead of the route, and an area Q including other POIs are virtually set. Then, for example, when operation is performed of pulling the route between the "cram school's nearest station" and the "cafe's nearest station" in a direction a, the POIs and the routes that belong to the area P disappear, and when operation is performed of pulling the route in an opposite direction b, the POIs and the routes that belong to the area Q disappear. Of course, when the operation is performed of pulling the route between the "cram school's nearest station" and the "cafe's nearest station" in the direction b, the POIs belonging to the area P may disappear, and when the operation is performed of pulling the route in the opposite direction a, the POIs belonging to the region Q may disappear.

Third Example

Figure 47:
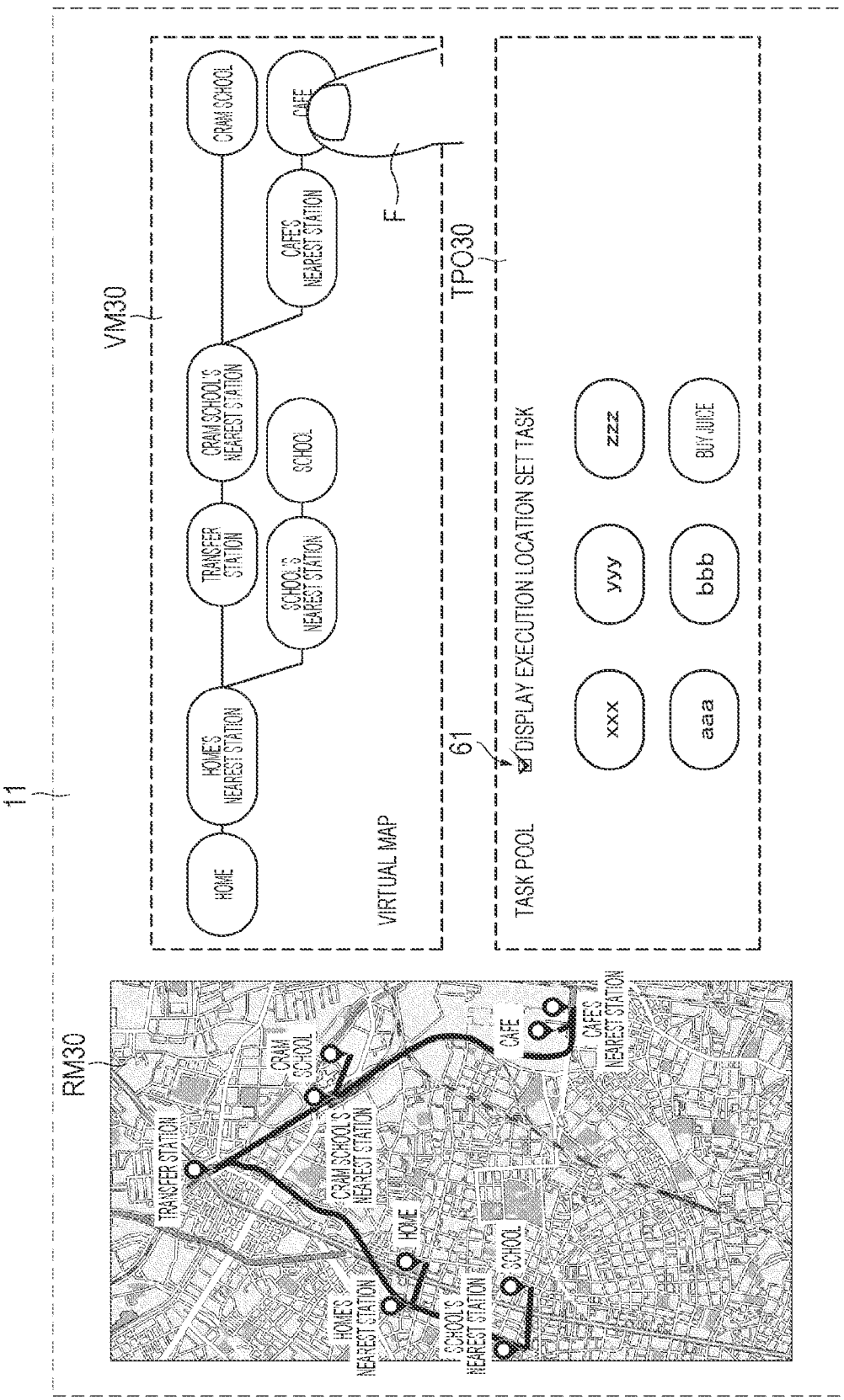
FIG. 47 is a diagram referred to when a third example is explained in which the display content changes depending on the operation onto the display unit.

Next, a third example will be described in which the display content of the display unit 11 changes depending on operation performed on a predetermined display area of the display unit 11. As illustrated in FIG. 47, the real map RM30, the virtual map VM30, and the task pool TPO30 are displayed on the display unit 11 similarly to the first example. In such a display state, for example, operation is performed of moving the POI "cafe" in the virtual map VM30 out of the area of the virtual map VM30, for example, drag operation.

Figure 48:
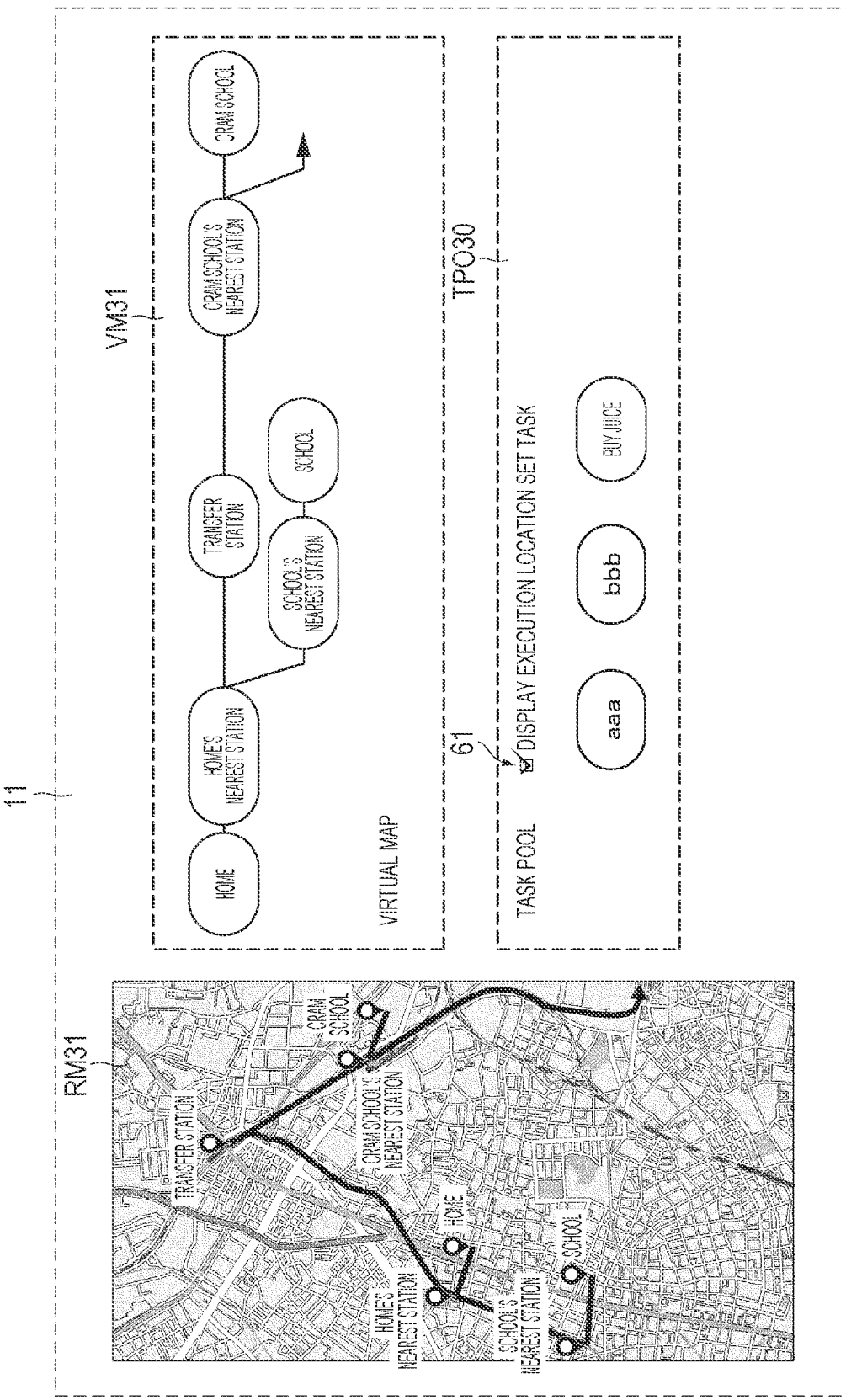
FIG. 48 is a diagram referred to when the third example is explained in which the display content changes depending on the operation onto the display unit.

Then, as illustrated in FIG. 48, a virtual map VM41 is displayed in which, from the virtual map VM30, the POI "cafe" and the "cafe's nearest station" that is the POI related to the "cafe" are erased from the virtual map VM30. Note that, in this case as well, it is preferable to leave the display of the route from the "cram school's nearest station" so that the user can recognize that there is a POI other than the "school" ahead of the "cram school's nearest station". Furthermore, whether or not it is related to the "cafe" may be determined on the basis of the name of the POI or a distance between the POIs. For example, the "cafe's nearest station" including the characters "cafe" may be determined as the POI related to the "cafe", or the POI ("cafe's nearest station" in this example) within a range of a predetermined distance to the "cafe" may be determined as the POI related to the "cafe".

As illustrated in FIG. 48, with the change of the virtual map, the display content of the real map also changes from the real map RM30 to the real map RM31, and the tasks displayed in the task pool TPO30 also change. Since the contents of the real map RM31 and the tasks in the task pool TPO30 after the change are similar to those in the first example, duplicate description will be omitted.

Note that, in this example, similar processing may be performed by other operation described in the example of dragging the "cafe" out of the range of the virtual map VM30. For example, the trash can icon may be displayed on the display unit 11, and similar processing may be performed in accordance with the drag operation in which the "cafe" moves to the trash can icon. Furthermore, there may also be a case where the content of the virtual map is updated with movement of the user, and the "cafe" is no longer included in the virtual map VM30 with the update of the virtual map. Similar processing may be performed also in a case where the "cafe" is outside the virtual map VM30.

Figure 49:
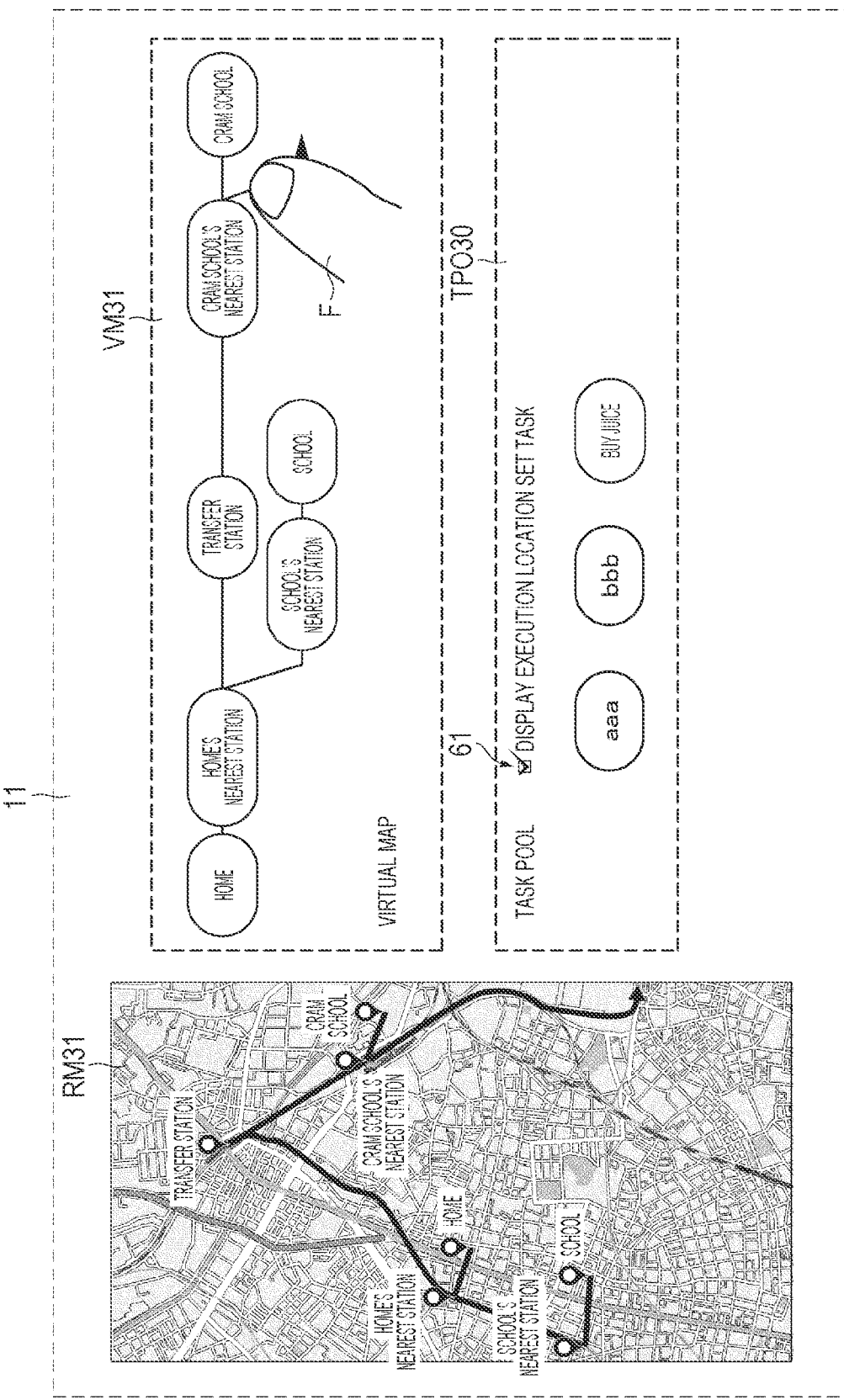
FIG. 49 is a diagram referred to when a modification is explained that corresponds to the third example in which the display content changes depending on the operation onto the display unit.
Figure 50:
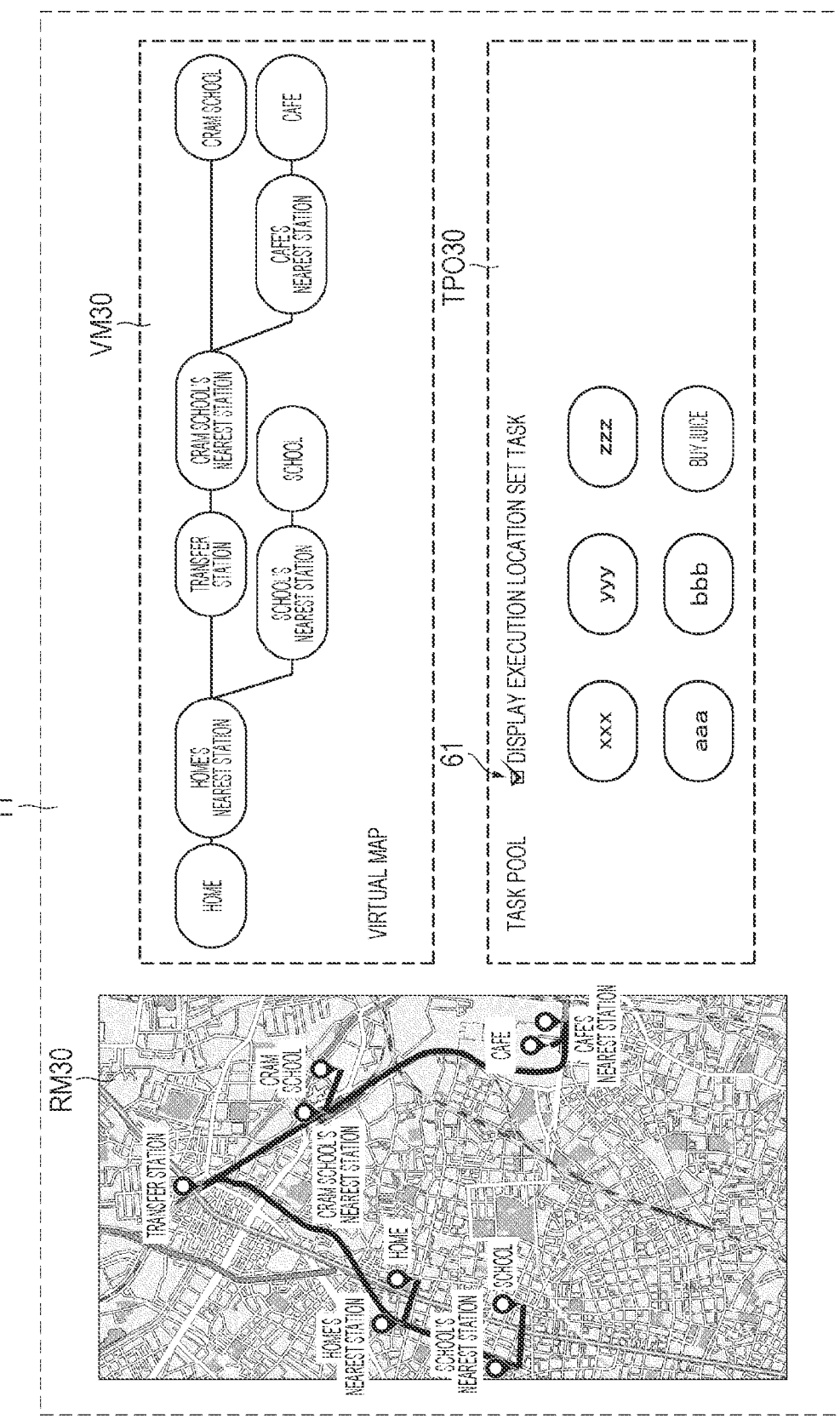
FIG. 50 is a diagram referred to when the modification is explained that corresponds to the third example in which the display content changes depending on the operation onto the display unit.

Note that, as illustrated in FIG. 49, in a case where an open route (a route that is not connected to a waypoint or a destination) extending from the "cram school's nearest station" is designated by, for example, tapping, a waypoint or a destination that exists ahead of the designated route may be displayed. For example, as illustrated in FIG. 50, the content of the virtual map changes from the virtual map VM31 to the virtual map VM30. Then, in accordance with this change, the real map also changes from the real map RM31 to the real map RM30, and the content of the tasks in the task pool TPO30 also changes.

Fourth Example

Figure 51:
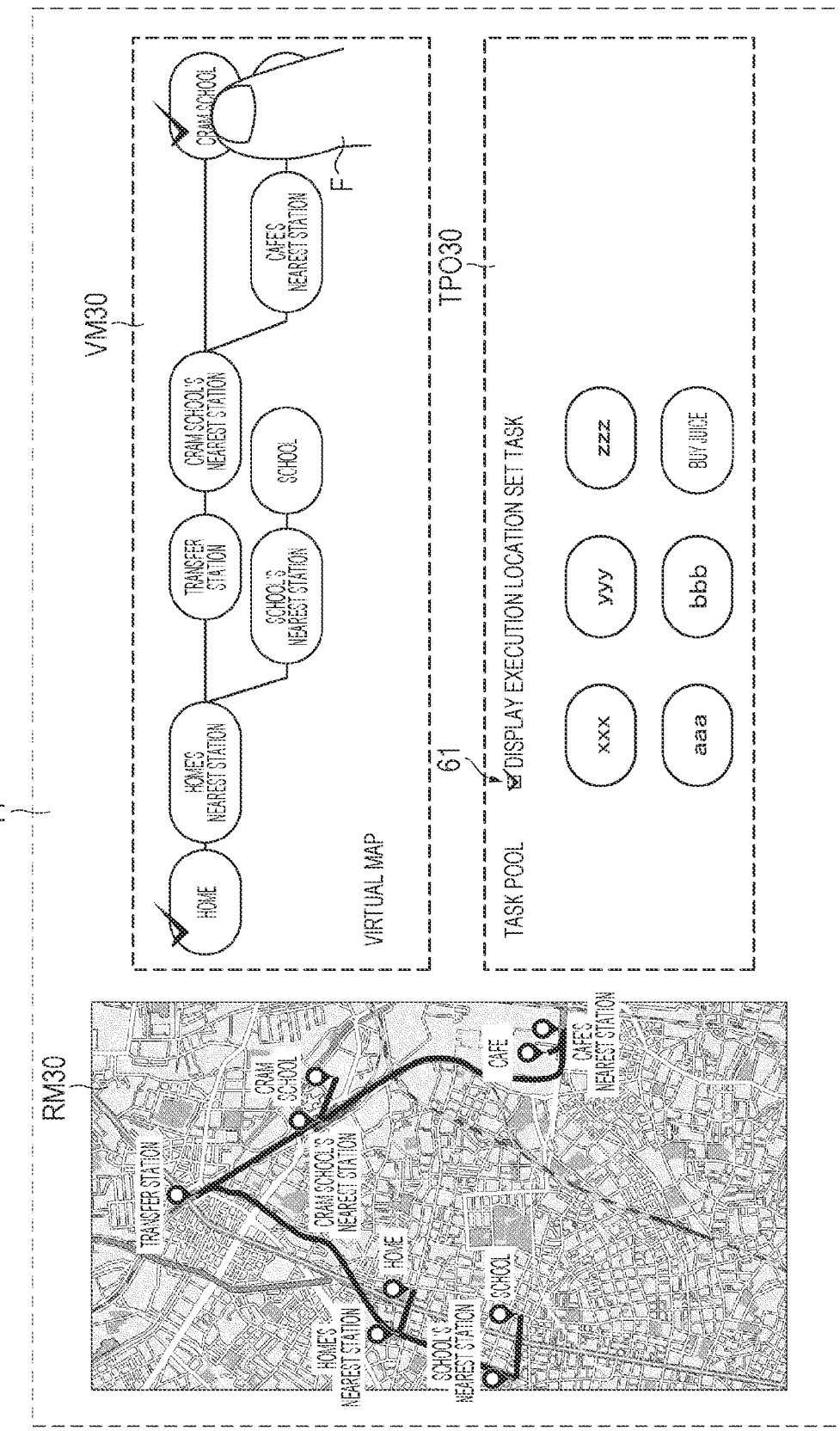
FIG. 51 is a diagram referred to when a modification is explained that corresponds to a fourth example in which the display content changes depending on the operation onto the display unit.

Next, a fourth example will be described in which the display content of the display unit 11 changes depending on operation performed on a predetermined display area of the display unit 11. As illustrated in FIG. 51, the real map RM30, the virtual map VM30, and the task pool TPO30 are displayed on the display unit 11 similarly to the first example. In such a display state, operation is performed of designating a departure point and an arrival point, for example, tap operation of tapping a POI. Specifically, the "home" is tapped as the departure point, the "cram school" is tapped as the arrival point, and each POI is selected. In this example, check boxes are displayed in the vicinity of the "home" and the "cram school" so that the user can recognize that they are selected, but the check boxes do not have to be displayed. Furthermore, the "home" may be colored and displayed in an appropriate color corresponding to the departure point, and the "cram school" may be colored and displayed in an appropriate color corresponding to the arrival point.

Figure 52:
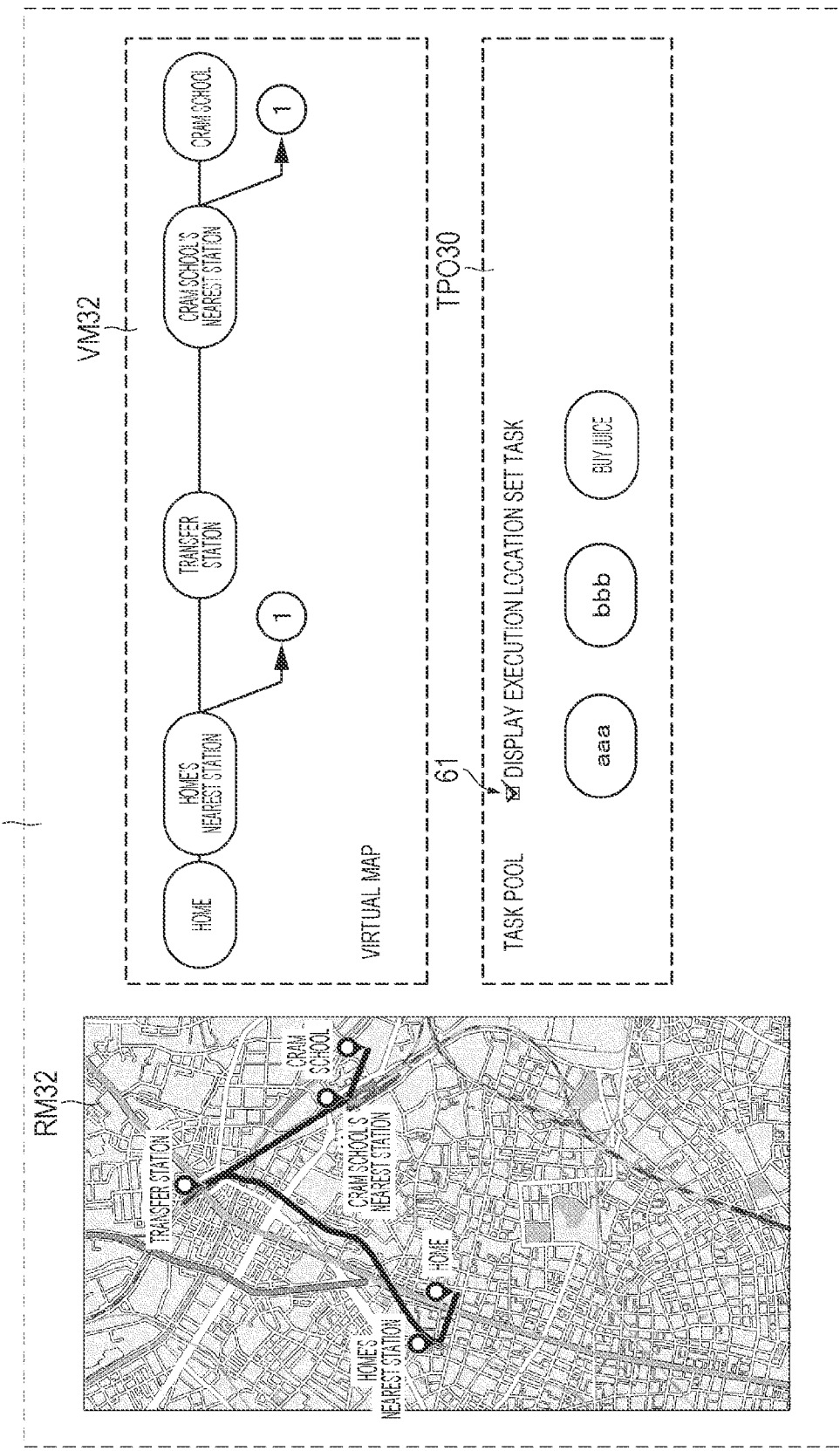
FIG. 52 is a diagram referred to when the fourth example is explained in which the display content changes depending on the operation onto the display unit.

Then, as illustrated in FIG. 52, the content of the virtual map changes from the virtual map VM30 to a virtual map VM32. The virtual map VM32 includes the departure point "home" and the arrival point "cram school", and the route connecting them to each other. Other POIs (the "school" and "cafe" that are other destinations, and the "school's nearest station" and "cafe's nearest station" related thereto) are erased. Note that, as illustrated in FIG. 52, to indicate that another POI exists ahead of each of the "home's nearest station" and the "cram school's nearest station", a route may be indicated extending from each of the "home's nearest station" and the "cram school's nearest station". Moreover, it may be indicated by numerals or the like that one destination each ("school" and "cafe" in this example) exist ahead of each route.

As illustrated in FIG. 52, with the change of the virtual map, the display content of the real map also changes from the real map RM30 to a real map RM32, and the tasks displayed in the task pool TPO30 also change. In the real map RM32, for example, only a route connecting the departure point "home" to the arrival point "cram school" is displayed. In the task pool TPO30, the tasks to be performed on the route are displayed.

Fifth Example

Figure 53:
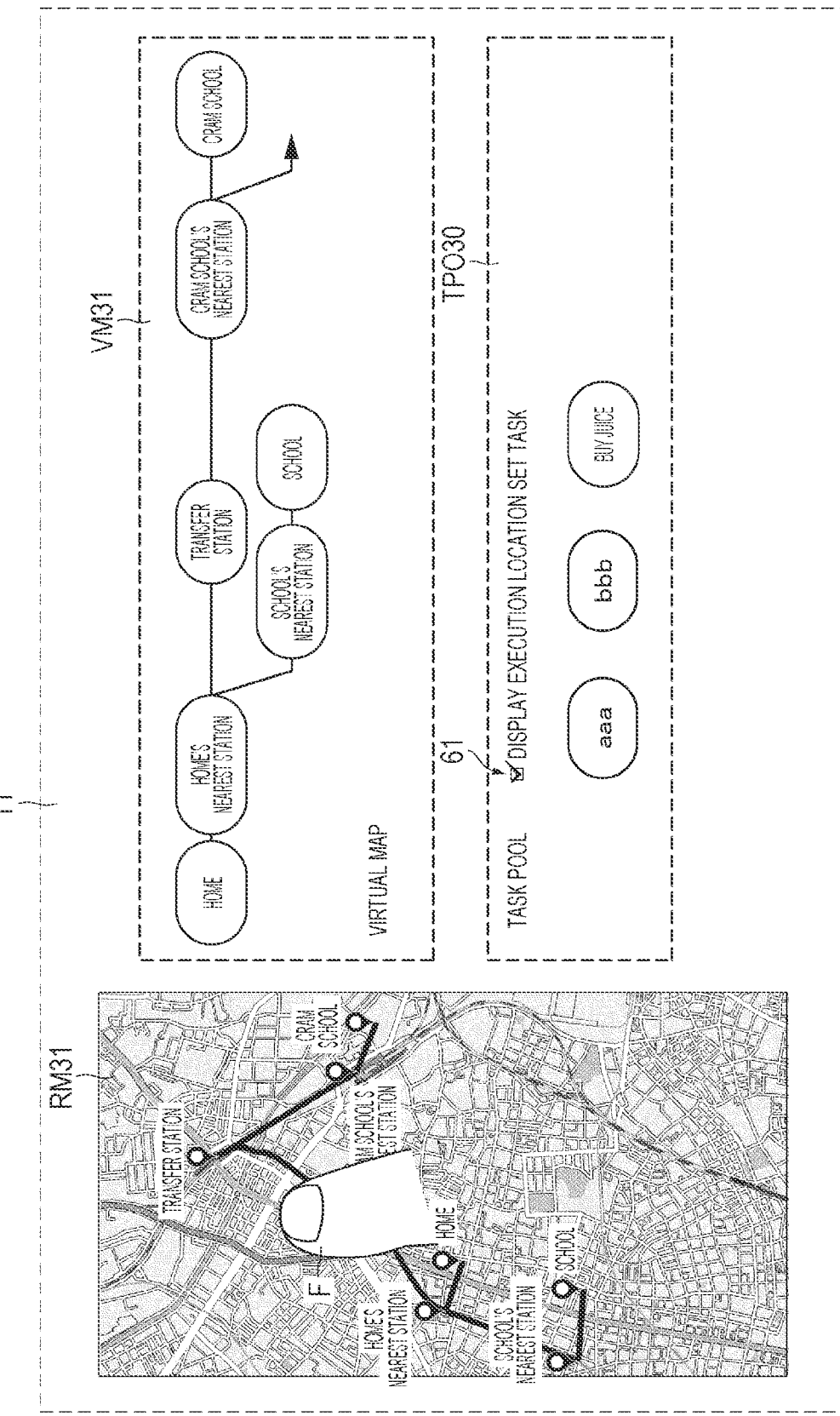
FIG. 53 is a diagram referred to when a fifth example is explained in which the display content changes depending on the operation onto the display unit.

Next, a fifth example will be described in which the display content of the display unit 11 changes depending on operation performed on a predetermined display area of the display unit 11. As illustrated in FIG. 53, the real map RM31, the virtual map VM31, and the task pool TPO30 are displayed on the display unit 11. The contents of the real map RM31 and the like are the same as in FIG. 45. This example is an example in which the real map RM31 is zoomed out by, for example, pinch operation using the finger F.

Figure 54:
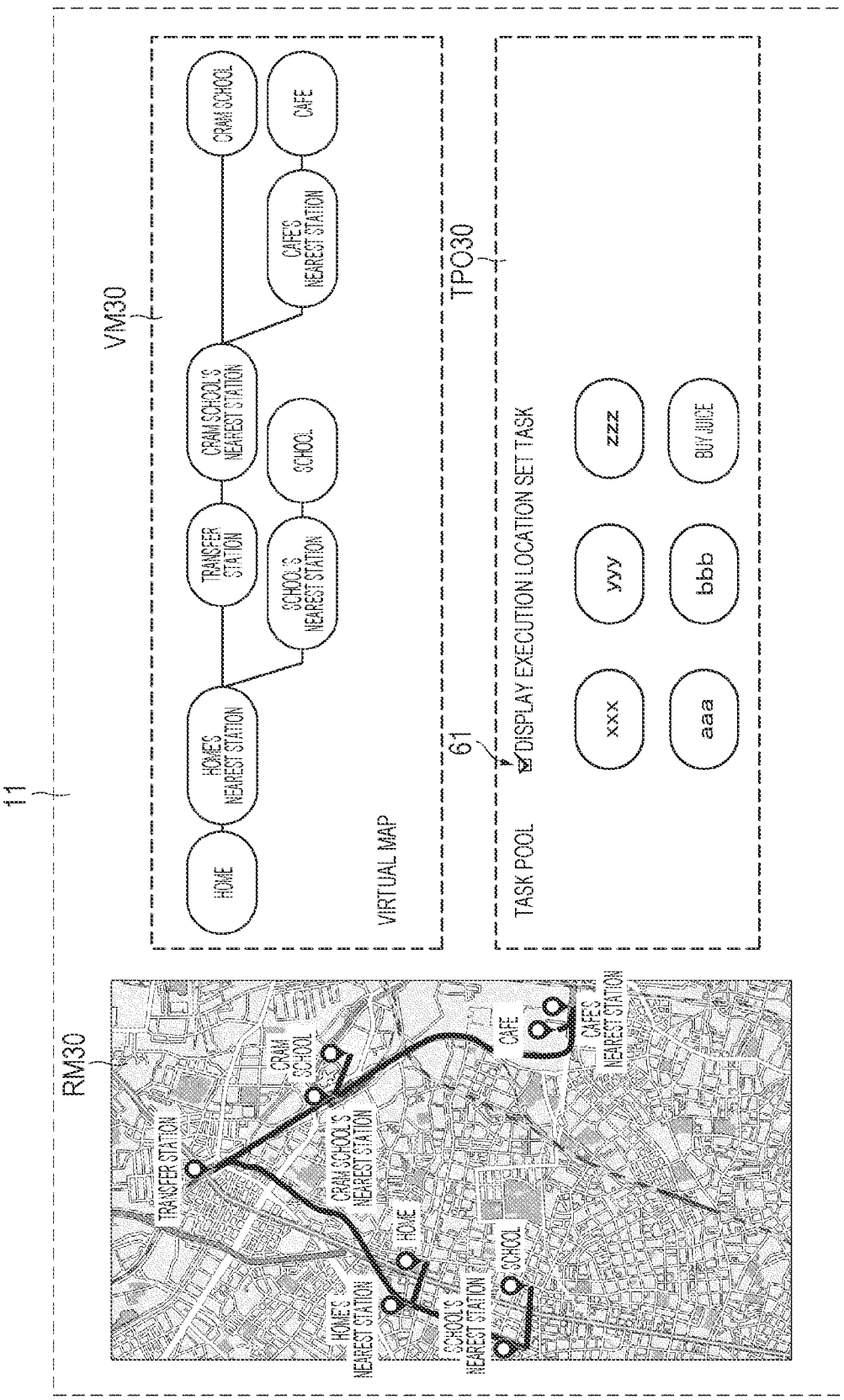
FIG. 54 is a diagram referred to when the fifth example is explained in which the display content changes depending on the operation onto the display unit.

Then, as illustrated in FIG. 54, the real map RM31 changes to the real map RM30. The real map RM30 indicates a wider range than the real map RM31. Thus, a new POI can be displayed on the real map RM30. In this example, the "cafe's nearest station" and "cafe" that has not been included in the range of the real map RM31 are included in the real map RM30.

With the change of the content of the real map, the contents of the virtual map VM31 and the tasks in the task pool TPO30 also change. That is, the content of the virtual map changes from the virtual map VM31 to the virtual map VM30 that is a virtual map including the "cafe's nearest station" and "cafe" that are POIs. Furthermore, the tasks to be performed on the real map RM30 are displayed in the task pool TPO30. In this example, since the locational range indicated by the real map has been enlarged, the tasks "xxx", "yyy", and "zzz" are added and displayed as the tasks to be performed in the range.

Sixth Example

Next, a sixth example will be described in which the display content of the display unit 11 changes depending on operation performed on a predetermined display area of the display unit 11. This example is an example in which a location can be set by a simple and intuitive operation, the location being an execution location of a task for which a location where the task should be performed has not been set.

Figure 55:
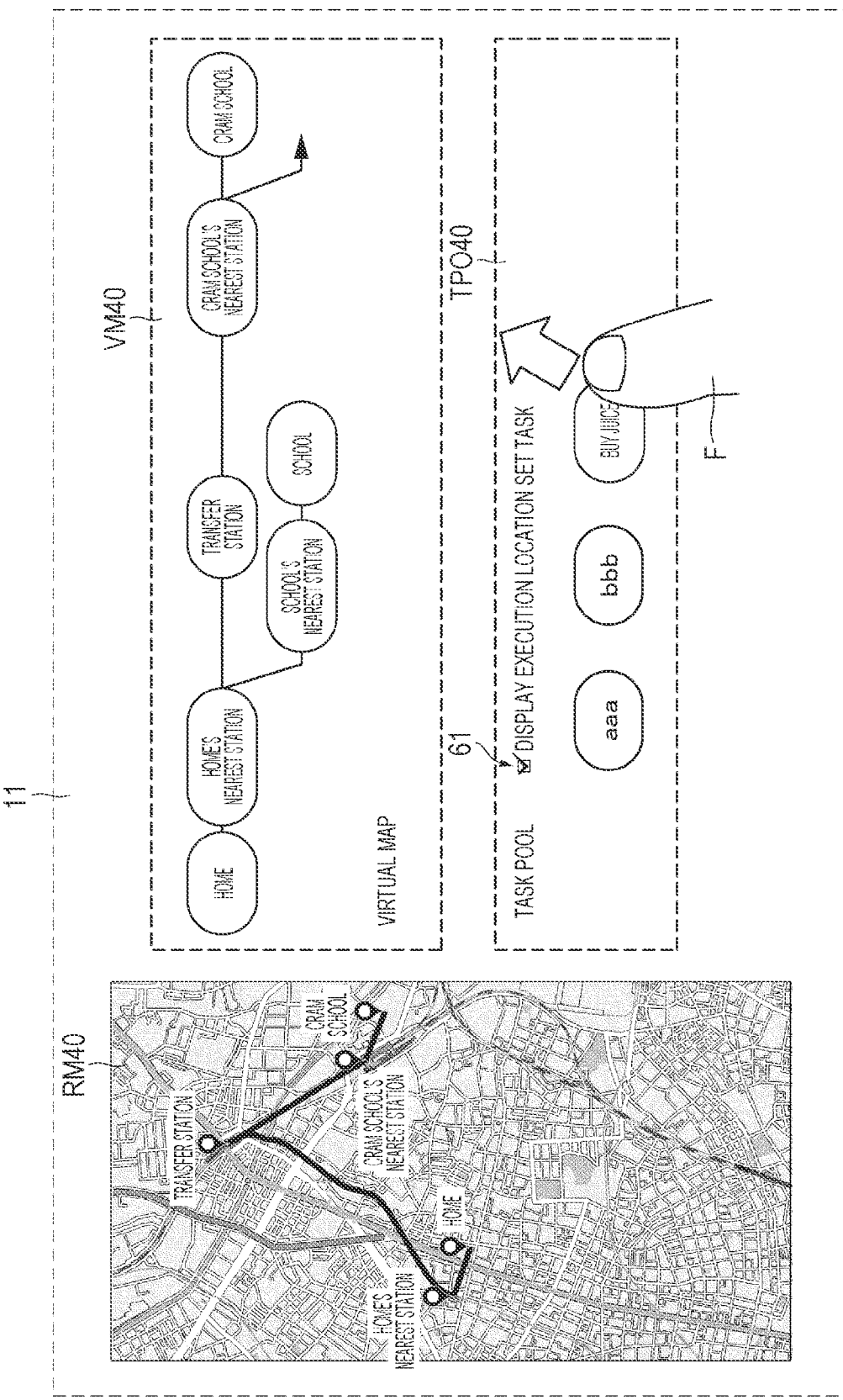
FIG. 55 is a diagram referred to when a sixth example is explained in which the display content changes depending on the operation onto the display unit.

As illustrated in FIG. 55, it is assumed that a real map RM40, a virtual map VM40, and a task pool TPO40 are displayed on the display unit 11. As POIs, "home", "home's nearest station", "transfer station", "cram school's nearest station", "cram school", "school's nearest station", and "school" are included, and in the virtual map VM40, the POIs are connected to each other by lines indicating routes.

In the task pool TPO40, three tasks "aaa", "bbb", and "buy juice" are displayed as tasks for which the execution location has not been set. Here, a case is considered where setting is performed in which the user performs a task "buy juice" between the "school's nearest station" and the "school". In this case, the user taps the task "buy juice" in the task pool TPO40, and then moves the display of the task "buy juice" to a location between "school's nearest station" and "school" by drag operation.

Figure 56:
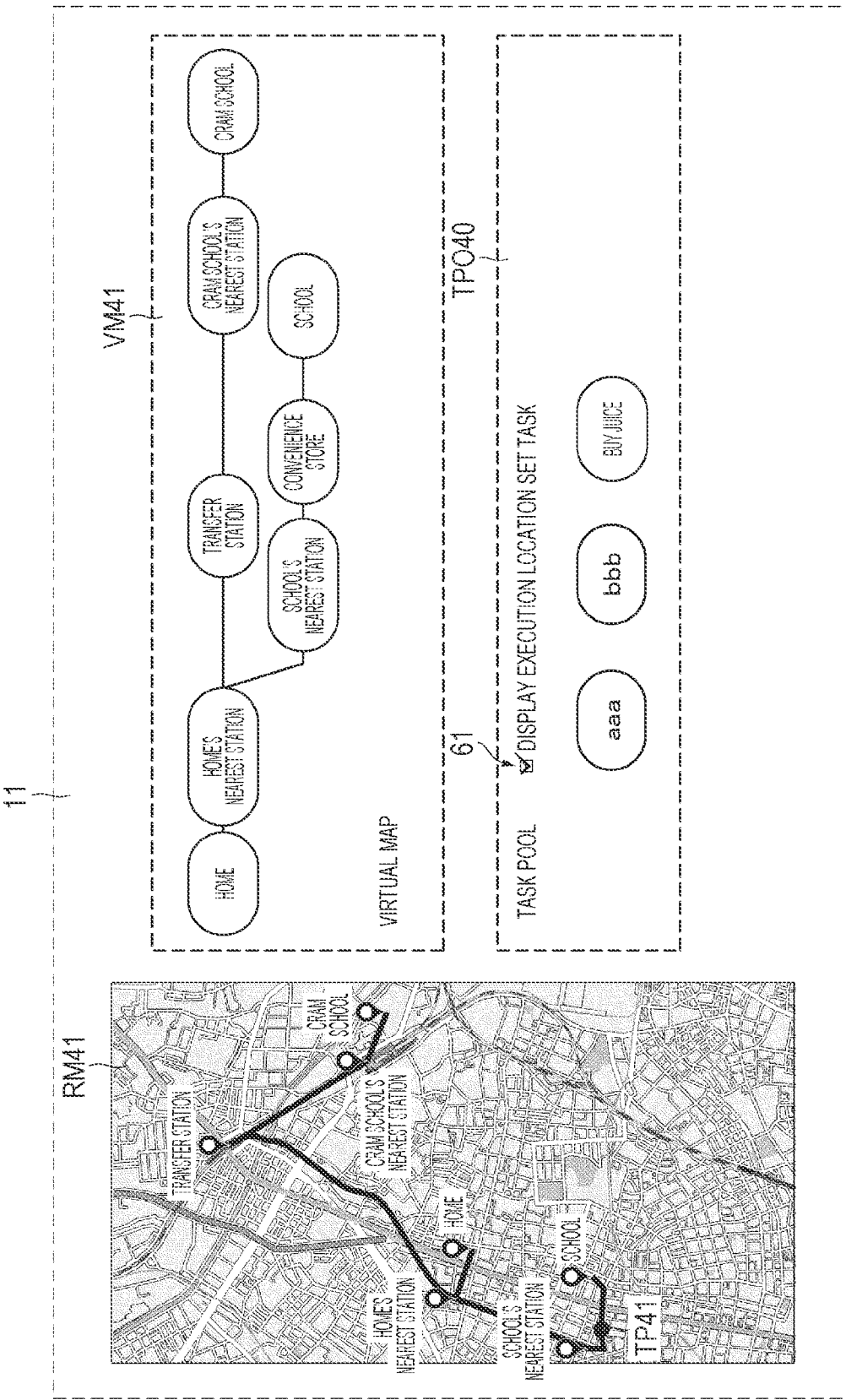
FIG. 56 is a diagram referred to when the sixth example is explained in which the display content changes depending on the operation onto the display unit.

Then, as illustrated in FIG. 56, the content of the virtual map changes from the virtual map VM40 to the virtual map VM41. That is, the task is added between the "school's nearest station" and the "school". At this time, the content of the task added to the virtual map VM41 may be displayed, but a location where the task can be performed may be searched for, and the location ("convenience store" in this example) may be displayed as illustrated in FIG. 56. Note that, the task "buy juice" is erased from the task pool TPO40. As described above, by checking the check box 61, it is possible to display the task for which the execution location is set, in the task pool TPO40.

In accordance with the change of the content of the virtual map, the content of the real map changes from the real map RM40 to a real map RM41. That is, as illustrated in FIG. 56, the route between the "school's nearest station" and the "school" is changed to the route that passes through the "convenience store". The "convenience store" is displayed as, for example, a task point TP41. As described above, when the task point TP41 is tapped, details of the task can be confirmed.

Seventh Example

Next, a seventh example will be described in which the display content of the display unit 11 changes depending on operation performed on a predetermined display area of the display unit 11. This example is an example in which a location can be set by a simple and intuitive operation, the location being an execution location of a task for which a location where the task should be performed has not been set and whose execution location is relatively limited.

Figure 57:
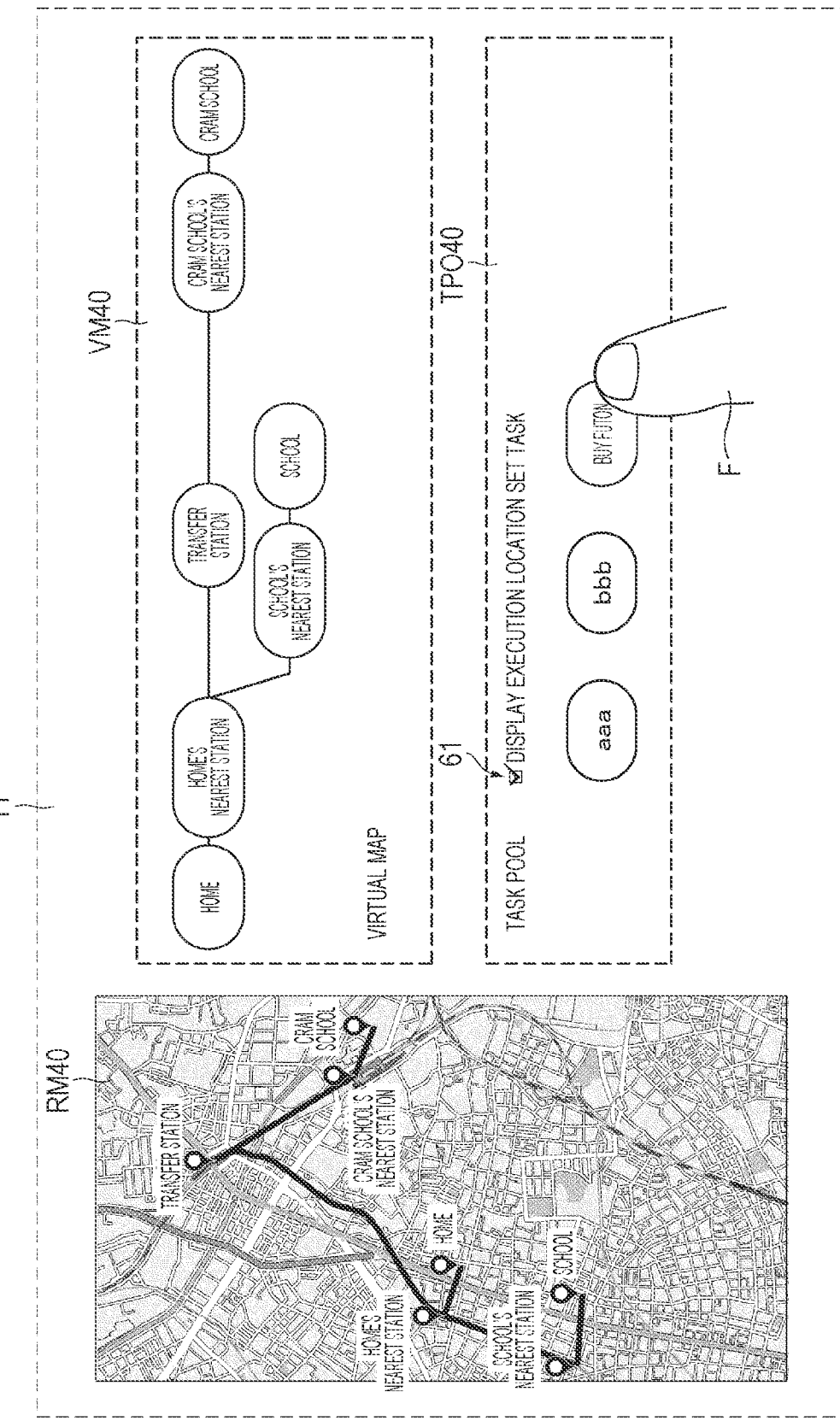
FIG. 57 is a diagram referred to when a seventh example is explained in which the display content changes depending on the operation onto the display unit.

As illustrated in FIG. 57, the real map RM40, the virtual map VM40, and the task pool TPO40 are displayed on the display unit 11. In the task pool TPO40, three tasks "aaa", "bbb", and "buy a futon" are displayed. Here, the task "buy a futon" is different from the task "buy juice" described above, and is a task for which the location where it can be performed is limited. Thus, it is desirable that the location where the task can be performed is presented to the user in an easy-to-understand manner.

Figure 58:
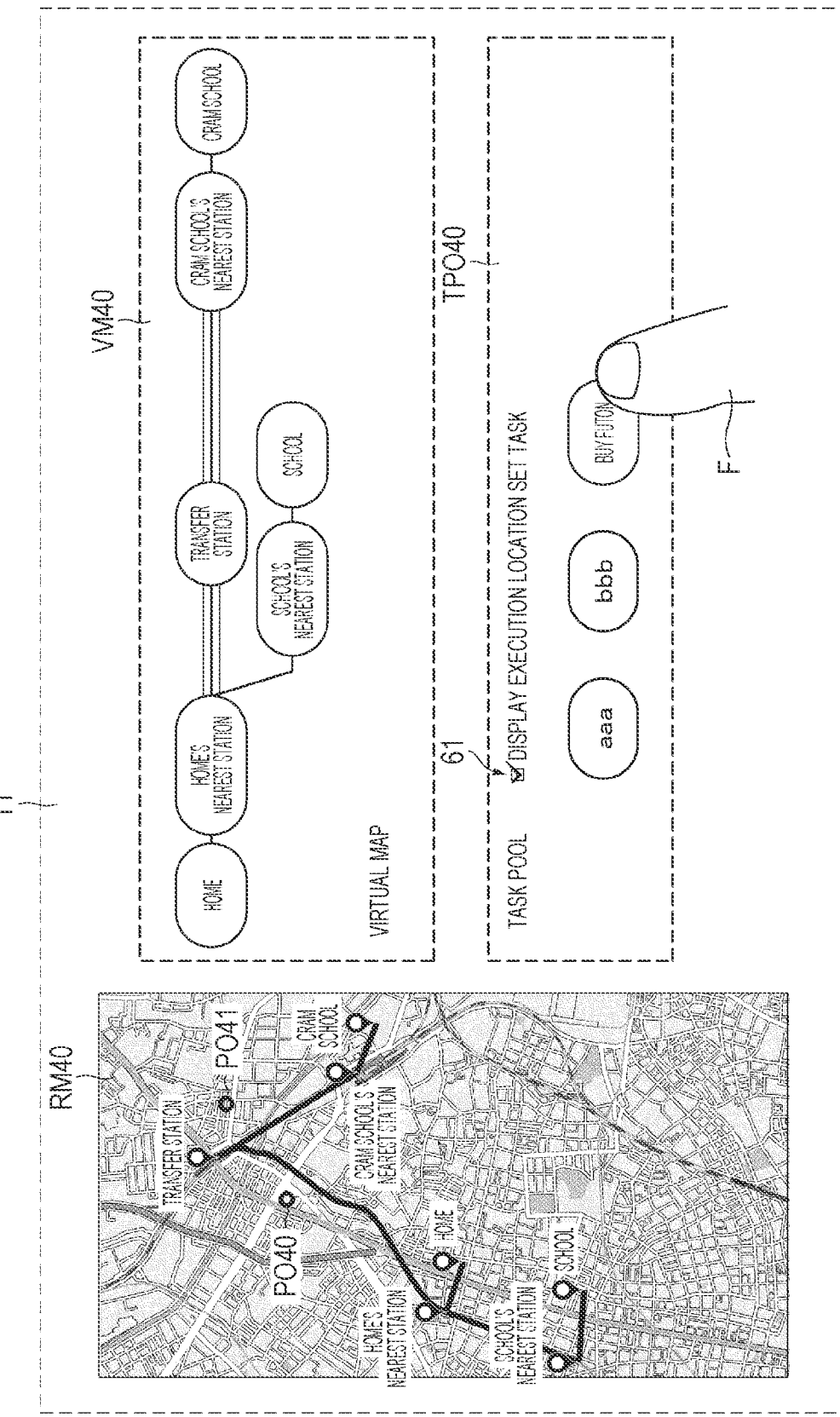
FIG. 58 is a diagram referred to when the seventh example is explained in which the display content changes depending on the operation onto the display unit.

Thus, as illustrated in FIG. 57, in a case where the task "buy a futon" is tapped with the finger F, a location where the task can be executed is searched for. In a case where the number of search results is a certain number, it is determined as the task for which the location where it can be performed is limited, and the display is made as illustrated in FIG. 58.

For example, it is assumed that a location where the task "buy a futon" can be performed (for example, "department store") exists between the "home's nearest station" and the "transfer station", and between the "transfer station" and the "cram school's nearest station". In this case, in the virtual map VM40, compared to other routes, highlighting is made for the route between the "home's nearest station" and the "transfer station", and the route between the "transfer station" and the "cram school's nearest station". For example, highlight display (blinking display), and highlighting in which the thickness, color, and the like of a line corresponding to the route are changed are performed. Furthermore, also on the real map RM40, candidate points P040 and P041 are displayed as candidates for locations where the task "buy a futon" can be performed. In this way, the user can easily understand the candidates of the location where the task can be performed even in the case of a task for which a location where it can be performed is relatively limited. Furthermore, a specific position of the candidate of the location can be confirmed on the real map. Note that, in a case where there is no location where the task "buy a futon" can be performed in a certain range, that fact may be displayed.

Figure 59:
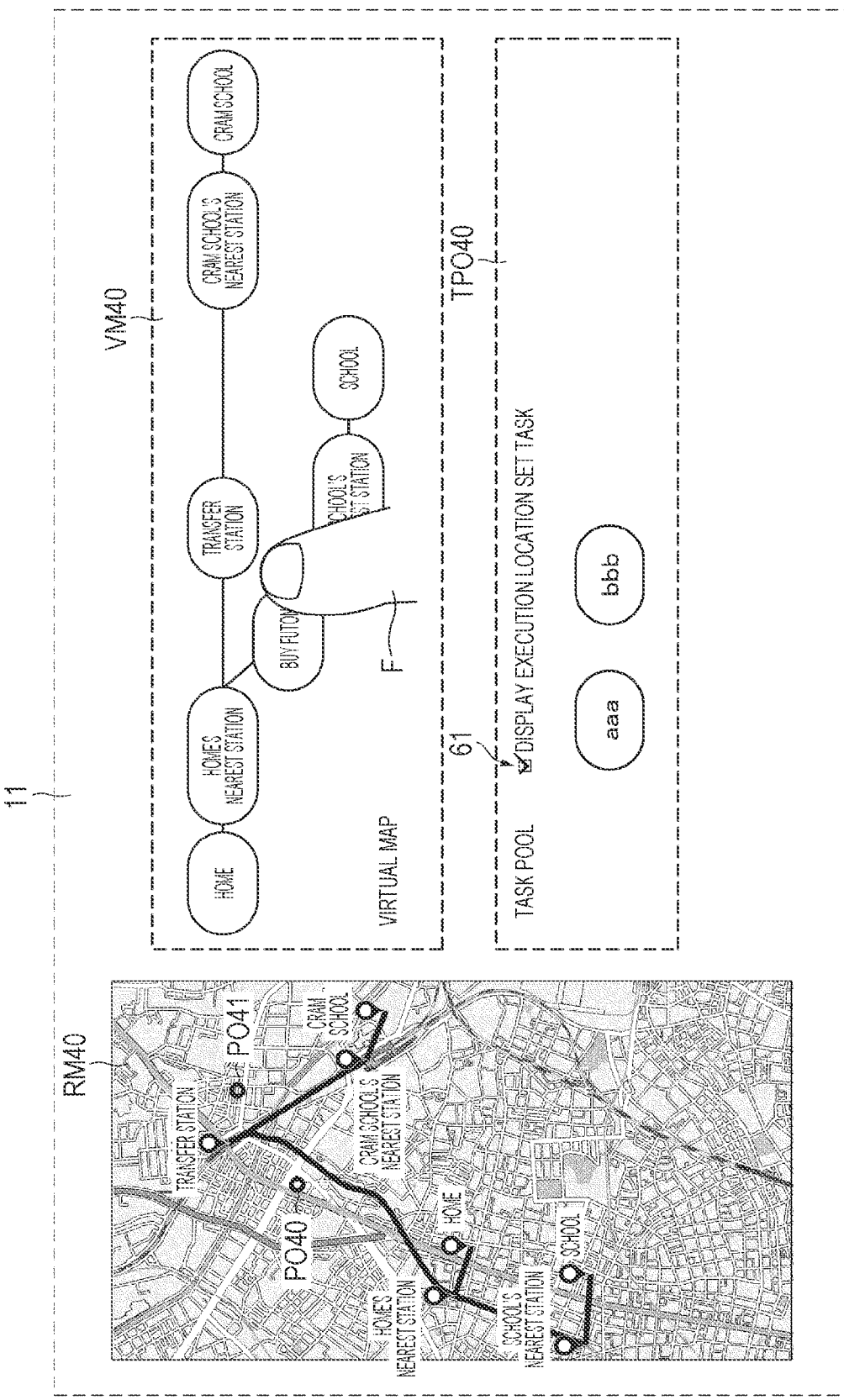
FIG. 59 is a diagram referred to when the seventh example is explained in which the display content changes depending on the operation onto the display unit.

Processing of setting the task execution location using the virtual map VM40 is similar to that in the sixth example, so it will be described schematically. As illustrated in FIG. 59, the task "buy a futon" in the task pool TPO40 is moved to the virtual map VM40 by drag operation or the like. The task "buy a futon" in the task pool TPO40 is moved to, for example, the route between the "home's nearest station" and the "transfer station".

Figure 60:
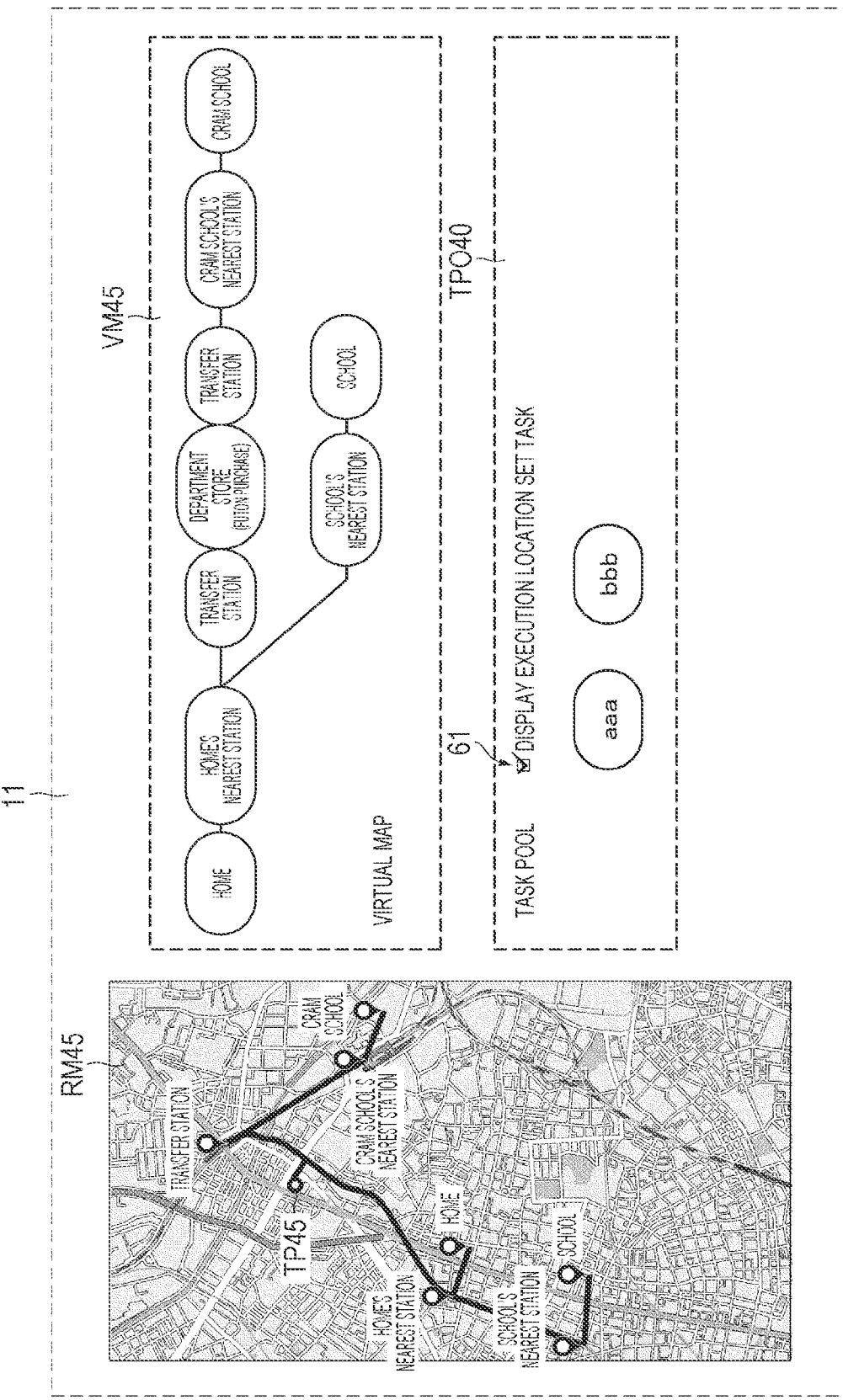
FIG. 60 is a diagram referred to when the seventh example is explained in which the display content changes depending on the operation onto the display unit.

Then, as illustrated in FIG. 60, the content of the virtual map changes from the virtual map VM40 to a virtual map VM45. Specifically, a task is added of getting off once at the "transfer station" and "buying a futon" at a department store. The added task is displayed in association with the location. For example, the location and task are displayed in parallel in two rows. In the virtual map VM45, since the location is mainly displayed, the task is displayed subordinately to the location. Specifically, the location (in this example, "department store") is displayed in the upper row, and the task (in this example, "buy a futon") is displayed in the lower row and with parentheses. Of course, the location and the task may be displayed in association with each other in a mode other than the illustrated one. With the change of the virtual map, the content of the real map changes from the real map RM40 to a real map RM45. On the real map RM45, a location where the task "buy a futon" is performed is displayed as a task point TP45. Note that, regarding presentation of the location where the task can be performed displayed on the virtual map VM40, and the task point TP45 displayed on the real map RM45, either one may be presented.

Note that, as illustrated in FIG. 61A, in a case where there is a location where the task can be performed other than the destination and waypoint, only the route may be highlighted, and as illustrated in FIG. 61B, in a case where the destination and waypoint are also locations where the task can be performed, highlighting may be performed including the destination and waypoint.

Figure 62:
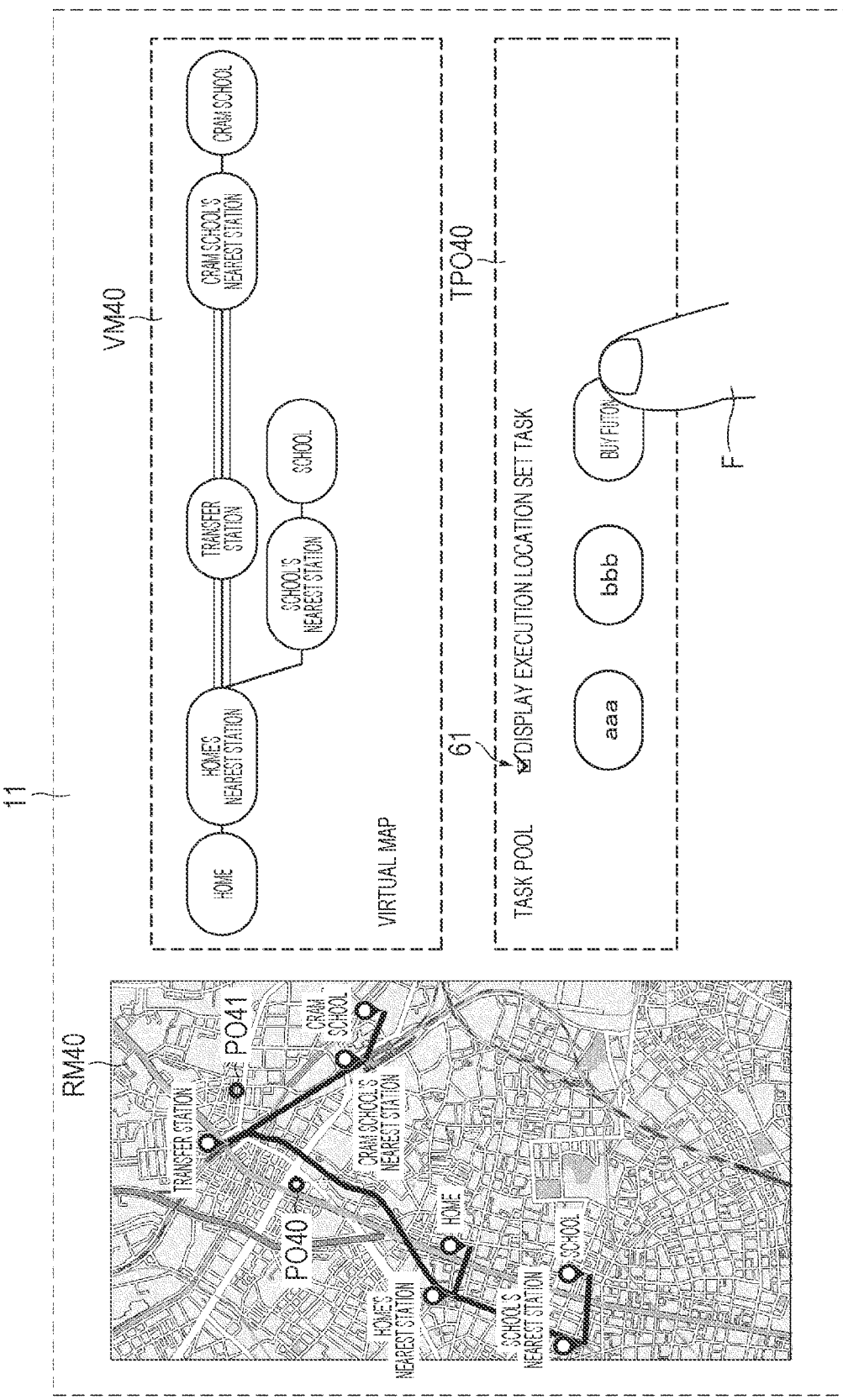
FIG. 62 is a diagram referred to when the modification is explained that corresponds to the seventh example in which the display content changes depending on the operation onto the display unit.

Furthermore, in the seventh example described above, the task "buy a futon" has been described as an example, but this is not a limitation. For example, in FIG. 62, it is assumed that three tasks "aaa", "bbb", and "buy a futon" are displayed in the task pool TPO40. For example, it is assumed that the task "bbb" is tapped and then the task "buy a futon" is tapped. In this case, a candidate for a location where two tasks can be performed at the same time may be presented. For example, as illustrated in FIG. 62, highlighting is made for the route between the "home's nearest station" and the "transfer station", and the route between the "transfer station" and the "cram school's nearest station" where there is a location where the two tasks can be performed at the same time. Note that, the number of tasks may be three or more. Furthermore, the plurality of tasks may or may not include a task that is relatively limited to be performed, such as the task "buy a futon".

Eighth Example

Next, an eighth example will be described in which the display content of the display unit 11 changes depending on operation performed on a predetermined display area of the display unit 11. This example is an example in which processing is performed in consideration of the time when setting the execution location of the task for which a location where the task should be performed has not been set.

Figure 63:
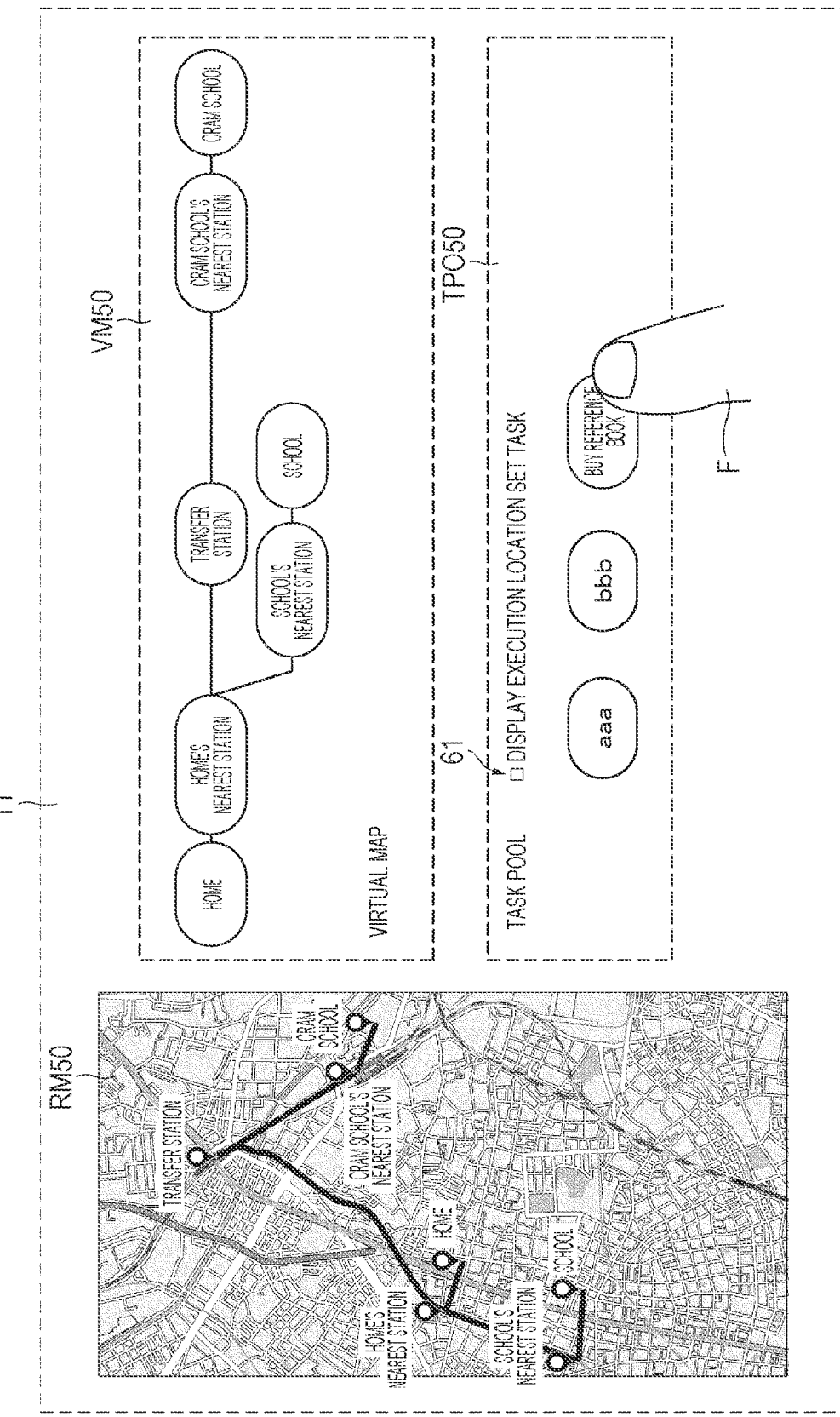
FIG. 63 is a diagram referred to when an eighth example is explained in which the display content changes depending on the operation onto the display unit.

As illustrated in FIG. 63, a real map RM50, a virtual map VM50, and a task pool TPO50 are displayed on the display unit 11. The display contents of the real map RM50 and the virtual map VM50 are the same as those of the real map RM40 and the virtual map VM40, respectively. In the task pool TPO50, three tasks "aaa", "bbb", and "buy a reference book" are displayed.

For example, the task "buy a reference book" is tapped. Then, a location where the task "buy a reference book" can be performed is searched for. In this example, it is assumed that a bookstore existing between the "cram school's nearest station" and the "cram school" is found as a location where the task "buy a reference book" can be performed. Moreover, a search is performed not only for the location but also for the time, for example, the business hours of the bookstore. Such a search is performed by the information acquisition unit 124 accessing the homepage of a bookstore or the like. In this example, it is assumed that the business hours of the bookstore are "10: 00-23: 00". Moreover, by referring to the action history stored in the database 15, learning and estimation are performed of the time when the user passes between the "cram school's nearest station" and the "cram school". Here, "17:00" is estimated as the passage time on the outbound route from the "cram school's nearest station" to the "cram school", more specifically, the time when the user passes near the bookstore during heading to the "cram school". On the other hand, "23:00" is estimated as the passage time on the inbound route from the "cram school" to the "cram school's nearest station", more specifically, the time when the user passes near the bookstore during returning from the "cram school".

Figure 64:
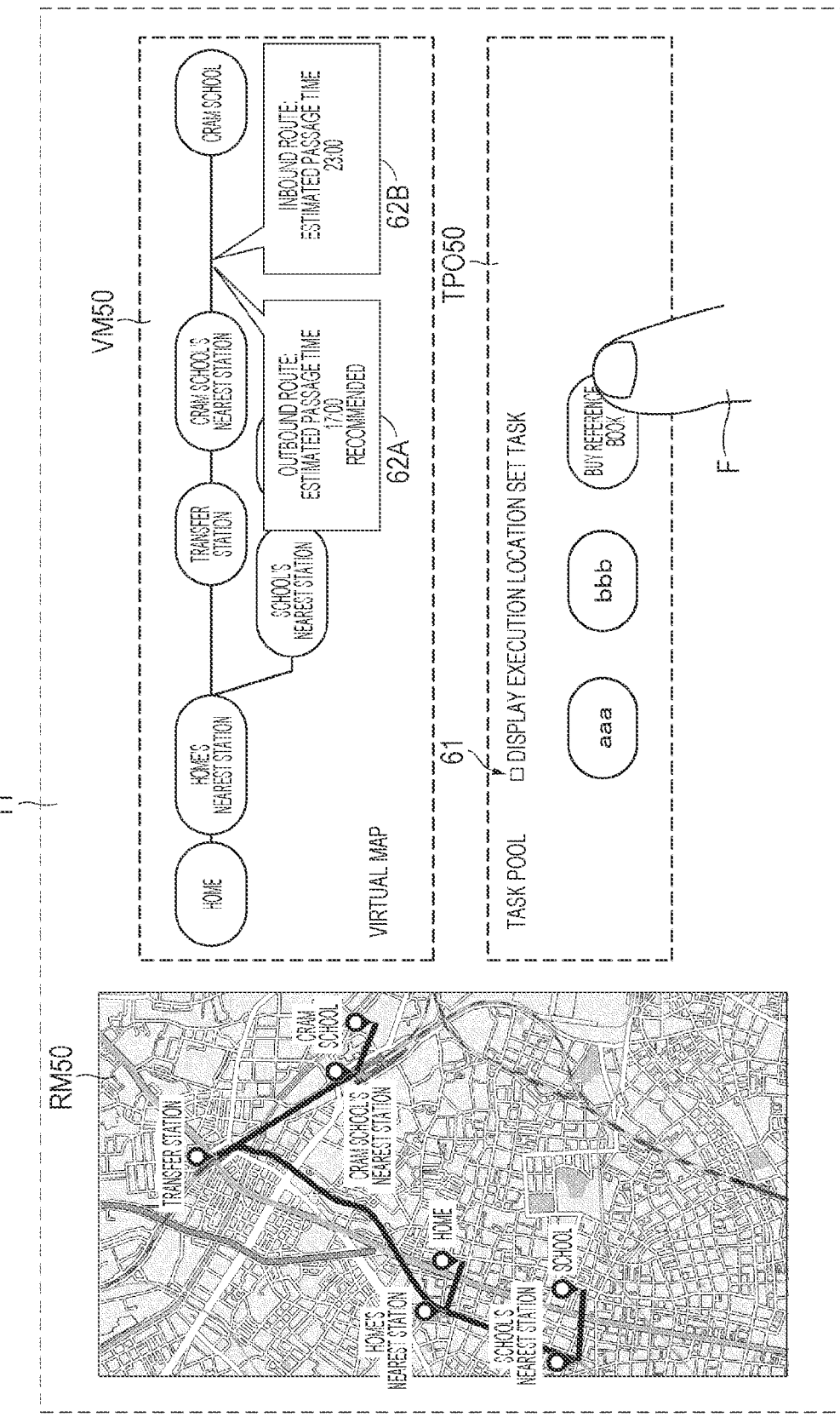
FIG. 64 is a diagram referred to when the eighth example is explained in which the display content changes depending on the operation onto the display unit.

Then, as illustrated in FIG. 64, passage information 62A and 62B including the location of the bookstore and the time when the user passes through the bookstore is displayed on the virtual map VM50. The passage information 62A and 62B is displayed to be pulled out from between the "cram school's nearest station" and the "cram school", whereby the location of the bookstore is indicated. Furthermore, the passage information 62A includes information "17:00" that is the time when the user passes through the bookstore on the outbound route. Furthermore, the passage information 62B includes information "23:00" that is the time when the user passes through the bookstore on the inbound route. Moreover, in the present embodiment, it is indicated at which time it is appropriate to buy a reference book. For example, "23:00" is just before the bookstore is closed. Thus, it is appropriate to buy a reference book at "17:00", that is, during going to the "cram school". Thus, the passage information 62A includes information "recommended", for example.

Figure 65:
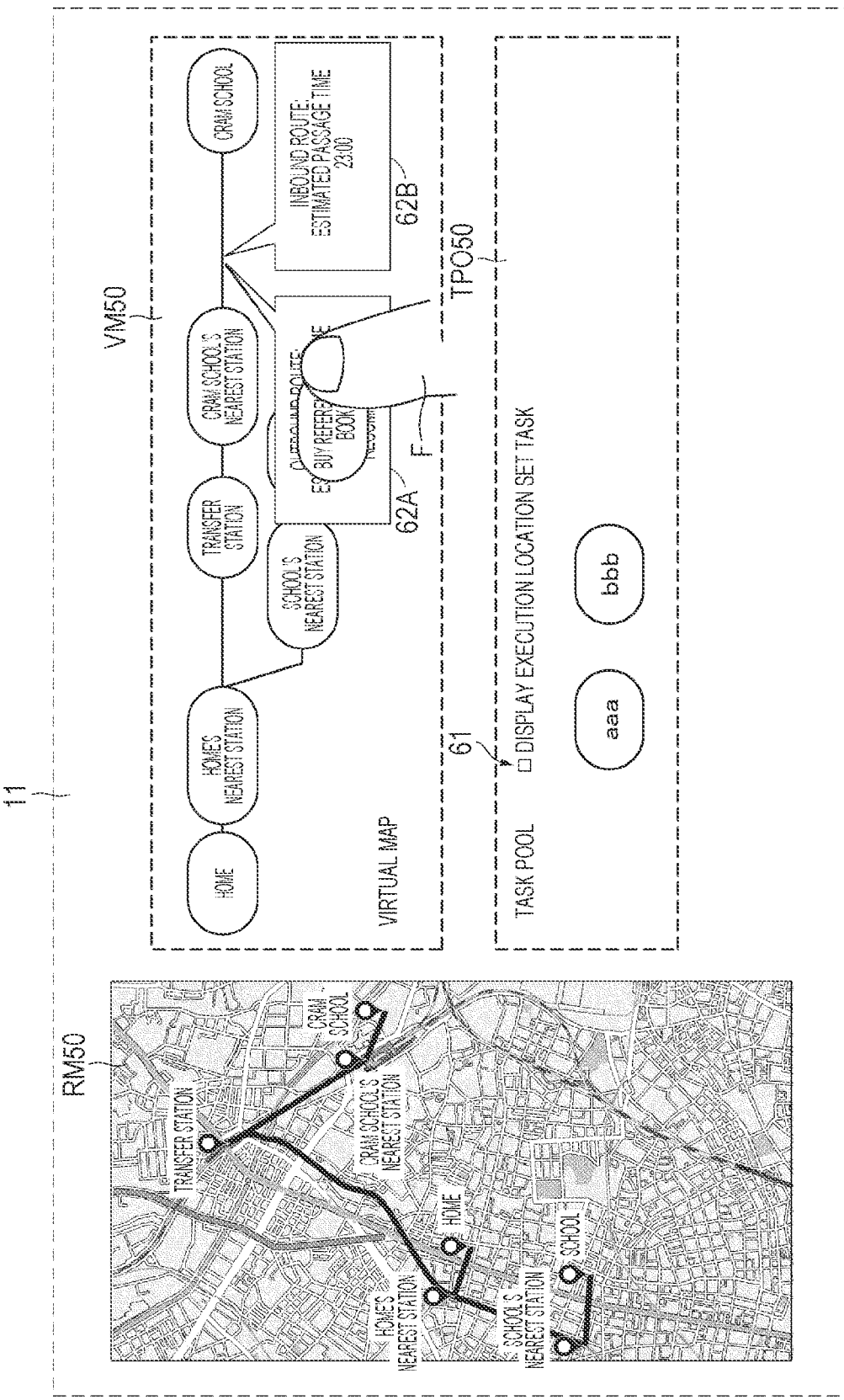
FIG. 65 is a diagram referred to when the eighth example is explained in which the display content changes depending on the operation onto the display unit.

Then, for example, as illustrated in FIG. 65, the task "buy a reference book" selected in the task pool TPO50 is moved toward the passage information 62A by drag operation or the like. In accordance with the operation, the task "buy a reference book" is erased from the task pool TPO50.

Figure 66:
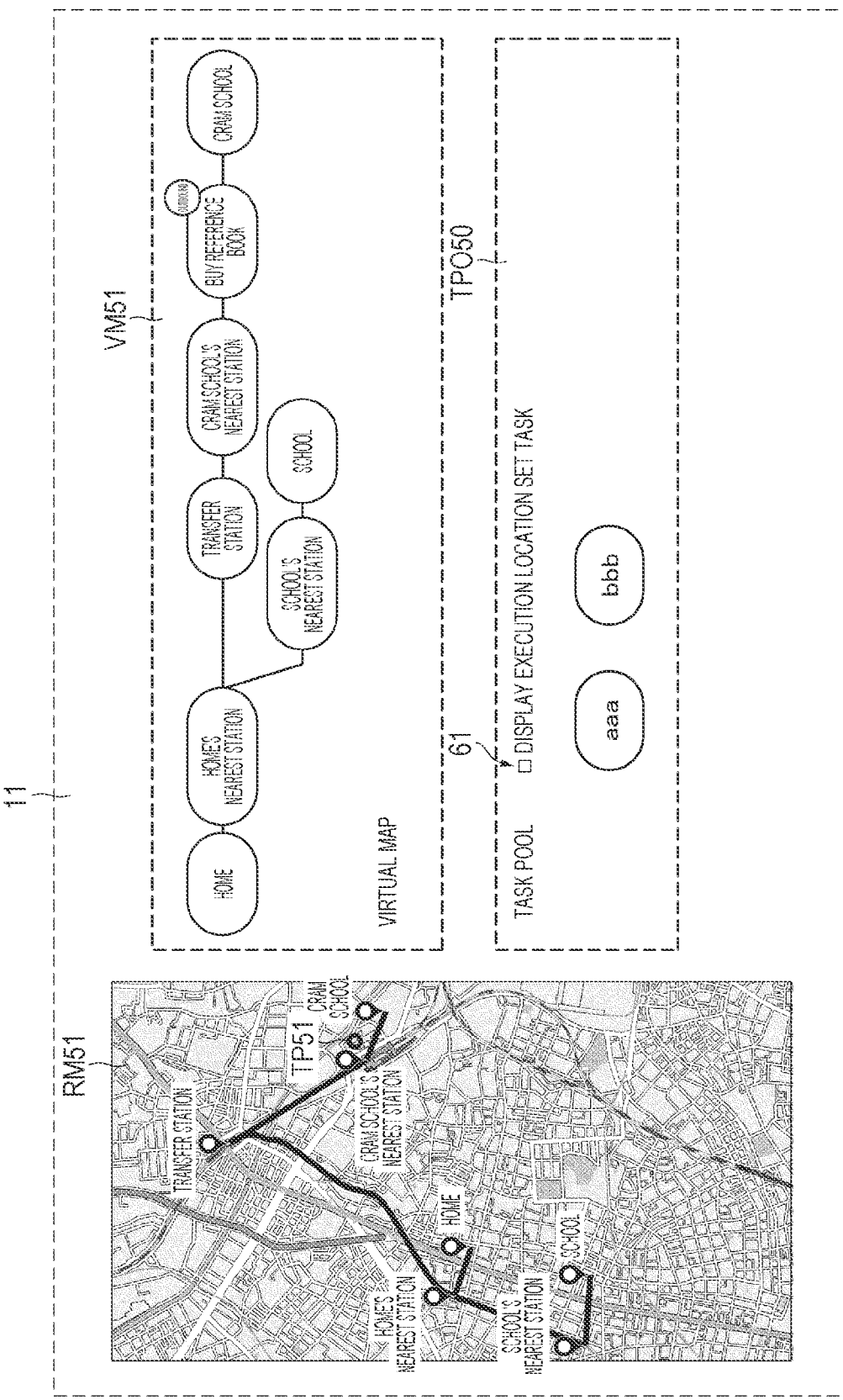
FIG. 66 is a diagram referred to when a modification is explained that corresponds to the eighth example in which the display content changes depending on the operation onto the display unit.

Then, as illustrated in FIG. 66, the content of the virtual map changes from the virtual map VM50 to a virtual map VM51. Specifically, a display "buy a reference book" is added between "the cram school's nearest station" and "the cram school". Note that, the display "buy a reference book" may be a specific location, for example, "bookstore". Furthermore, a display may be provided so that the user can recognize whether to buy a reference book on the outbound route or the inbound route. Such a display is, for example, a mark indicating "outbound route" displayed in the vicinity of the display "buy a reference book". The mark indicating the "outbound route" may be an arrow or the like.

(Current Situation Display and Task Rescheduling)

"Current Situation Display"

Next, descriptions will be given of processing of displaying a current situation and processing of rescheduling a task that are performed in a display mode in which a real map, a virtual map, and a task pool are displayed on the display unit 11. First, the processing of displaying the current situation will be described.

Figure 67:
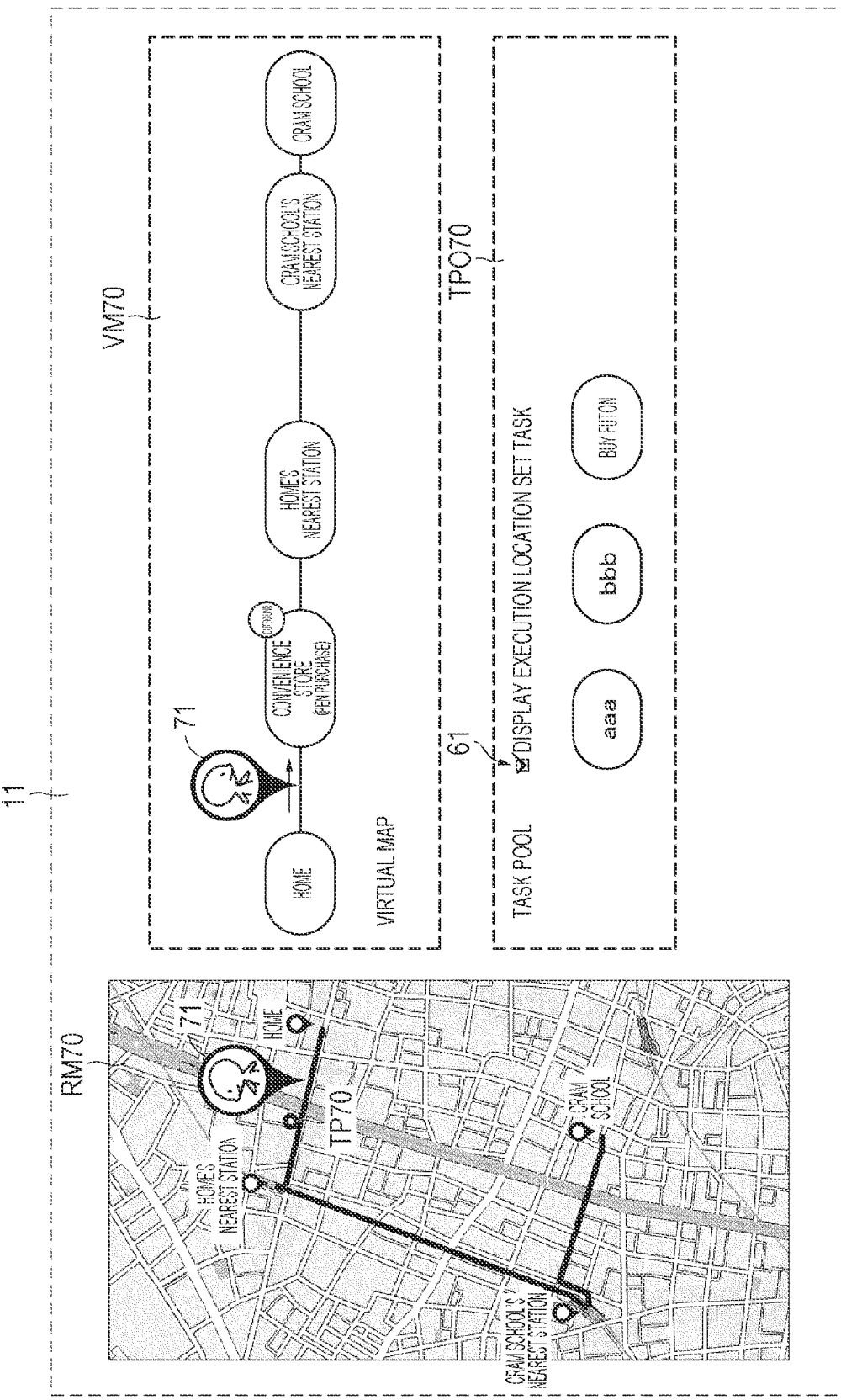
FIG. 67 is a diagram referred to when processing is explained of displaying a current situation in the embodiment.

As illustrated in FIG. 67, a real map RM70, a virtual map VM70, and a task pool TPO70 are displayed on the display unit 11. The virtual map VM70 includes, for example, "home", "convenience store", "home's nearest station", "cram school's nearest station", and "cram school" as POIs. In the "convenience store", a task is set that "purchase a pen" during heading from the "home" to the "home's nearest station". In this example, the "convenience store" and the task set in the location are displayed in two rows. Furthermore, the virtual map VM70 includes a move icon 71 that moves on a route in the virtual map VM70. The move icon 71 is, for example, a character including a face display, but may be a vehicle or the like.

The real map RM70 reflects the route of the virtual map VM70 on a real map. On the real map RM70, positions are indicated of the "home", "home's nearest station", "cram school's nearest station", and "cram school" on the real map. Routes connecting points together are indicated by solid lines. Furthermore, a point of the "convenience store" where the task is set is indicated as a task point TP70. As described above, when the location of the task point TP70 is designated by tap operation or the like, details of the task set in the task point TP70 are displayed.

Furthermore, the real map RM70 also includes the move icon 71 that moves on the route in the real map RM70. The move icons in the real map RM70 and the virtual map M70 may be different from each other, but there is an advantage that the same icon is easier for the user to recognize.

The move icon 71 is an icon corresponding to the user. Thus, when the user moves or stops, the move icon 71 also moves or stops on the route. Display control regarding the move icon 71 is performed as follows, for example. On the basis of the position information obtained from the position sensor 132, the situation recognition unit 121 acquires a current position of the user. Then, information regarding the acquired current position of the user is supplied to the task management unit 126. The task management unit 126 appropriately refers to the information, and appropriately changes the display position of the move icon 71.

"Task Rescheduling"

Figure 68:
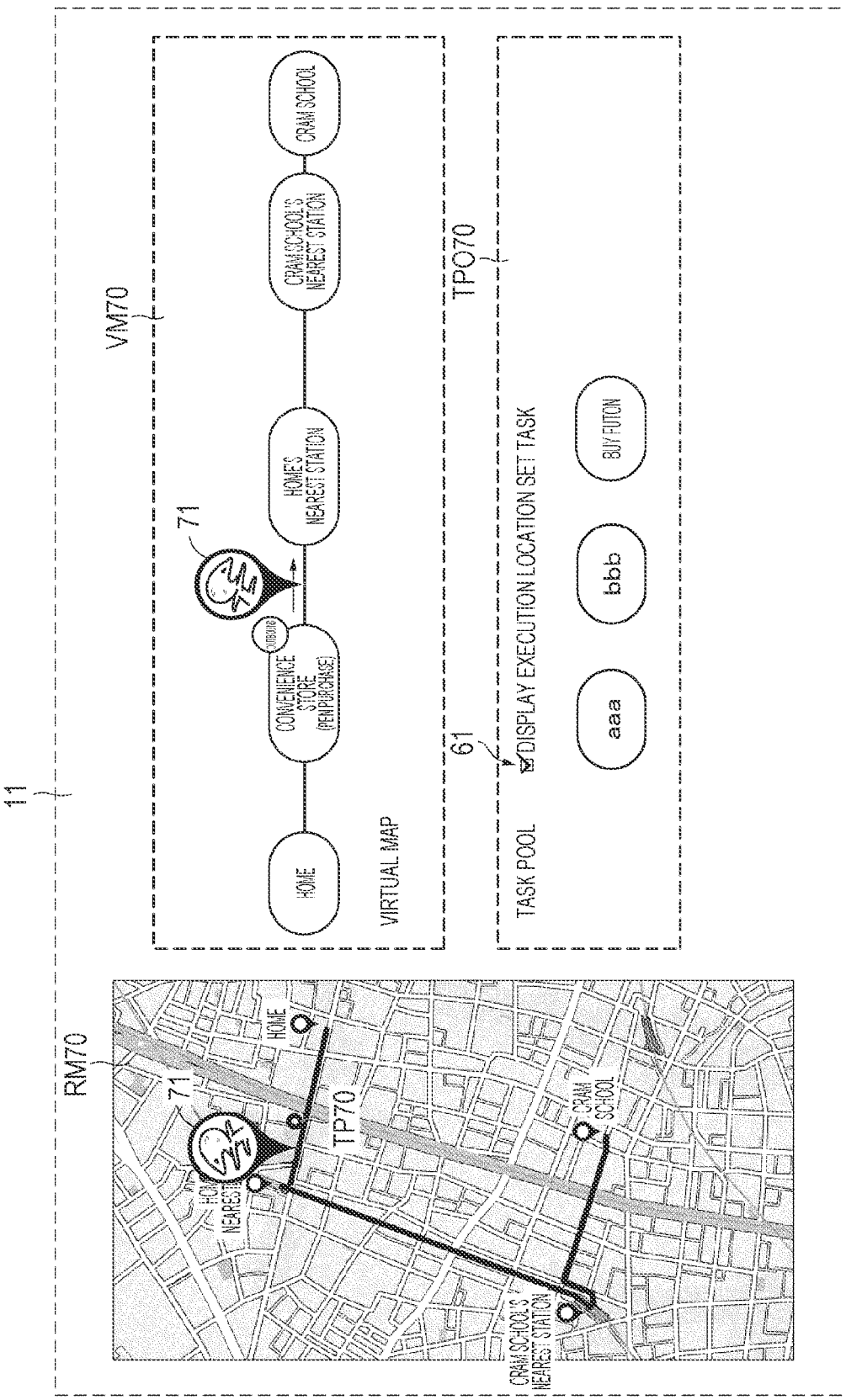
FIG. 68 is a diagram referred to when processing is explained that is performed in a case where a task is not executed in the embodiment.

In a case where the task set in the "convenience store" is not executed, processing described below may be performed. For example, as illustrated in FIG. 68, a display mode of the move icon 71, for example, a facial expression of the character may be changed. For example, since the task has not been executed, the facial expression of the character may be changed to an impatient facial expression. Whether or not the task has been executed is determined on the basis of, for example, a residence time at the location of the "convenience store", or the like.

Figure 69:
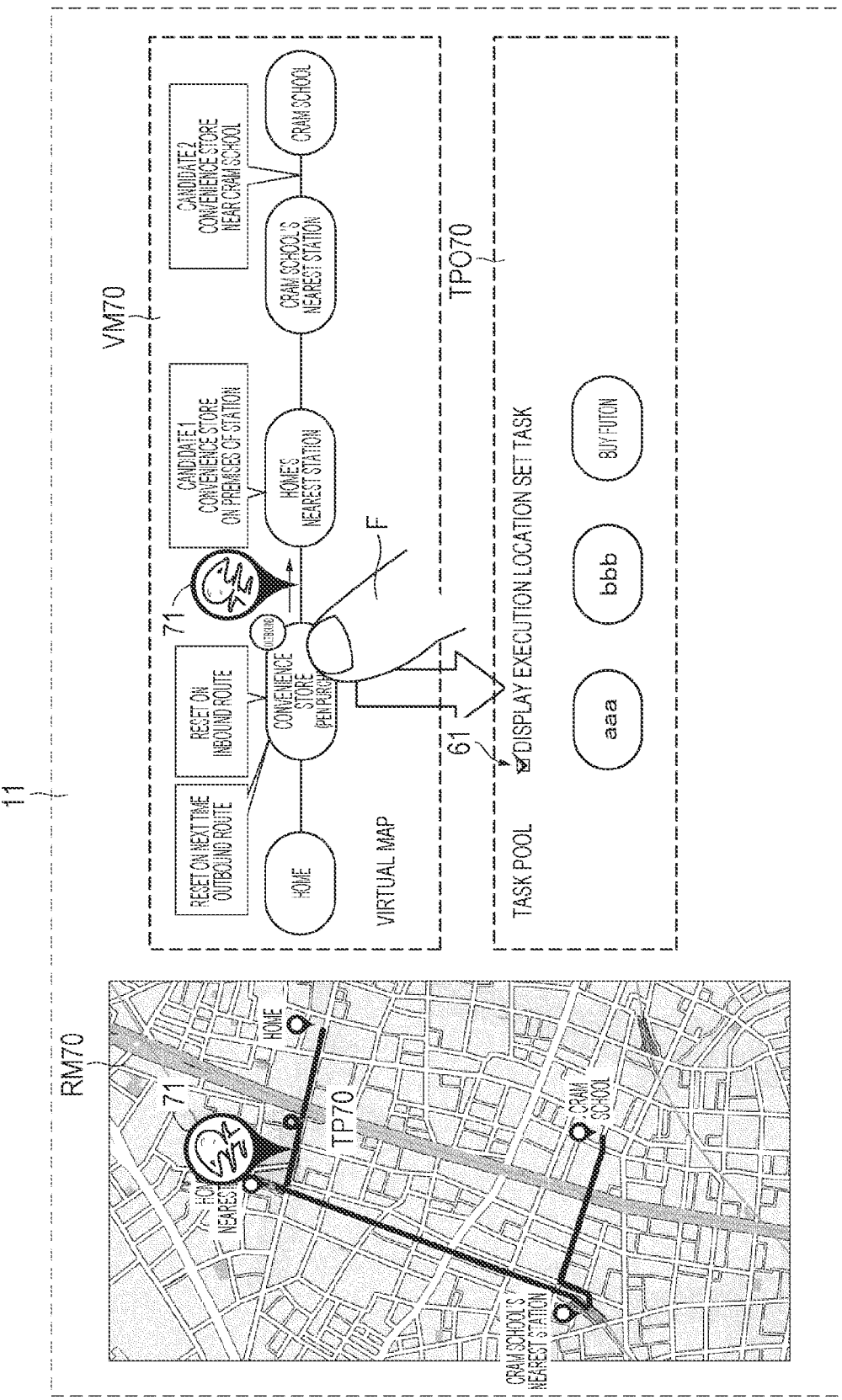
FIG. 69 is a diagram referred to when the processing is explained that is performed in the case where the task is not executed in the embodiment.

Furthermore, as illustrated in FIG. 69, in a case where the task can be performed during heading from the "home's nearest station" to the "home", that is, on the inbound route, that fact may be displayed in the vicinity of the "convenience store" on the virtual map M70. In a case where the user passes through the outbound route of the same route next time, for example, tomorrow, the task may be displayed at that time. Furthermore, another candidate location where the task can be performed may be presented to a destination of the user in the future. In a case where there is a "convenience store" as a location where the task can be performed, for example, on the premises of the "home's nearest station" or between the "cram school's nearest station" and the "cram school", it may be presented to the user that there is a location where the task can be executed exists on a route on which the user is going to move. The candidate location may be one location or multiple locations. Furthermore, in a case where there is a place where the user wants to perform the task "pen purchase", the location where the task is performed can be set manually by moving the location of the "convenience store" to the location of an arbitrary route where the place exists. Furthermore, if there are multiple candidates for the location where the task can be performed in a case where high urgency is set as a task property, a location where the task can be performed as soon as possible (for example, a location close to the current location) may be emphasized and presented.

Note that, it may be considered that the user does not need to hurry to perform the task "pen purchase". In that case, as illustrated in FIG. 69, the location of the "convenience store" is moved into the task pool TPO70, whereby the location where the task "pen purchase" is performed is changed to the unset task. Then, it is possible to prevent the notification of the rescheduled task.

(Real Time Notification of Rescheduled Task)

Figure 70:
FIG. 70 is a diagram illustrating an example of a task and properties of the task.

Next, real time notification of a rescheduled task will be described. As illustrated in FIG. 70, a task "buy a ballpoint pen" is set. The task has properties with set contents that category: shopping, location category: store, convenience store, deadline: 2018 Jun. 7, importance: 1, required time: 10 minutes: comment: used at the cram school.

Figure 71A:
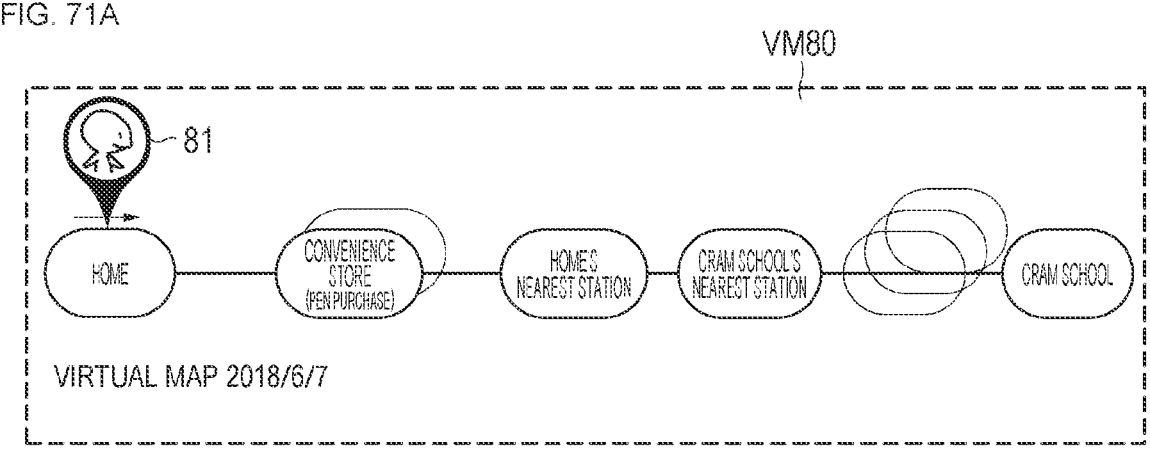
FIGS. 71A and 71B are diagrams referred to when processing is explained of performing notification of a rescheduled task in real time in the embodiment.
Figure 71B:
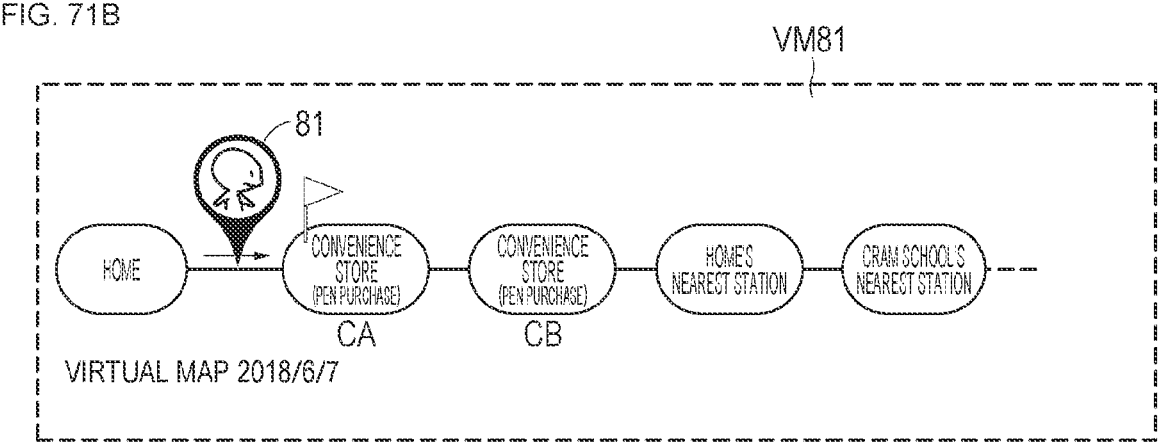

FIGS. 71A and 71B illustrate a virtual map in this example, FIG. 71A illustrates a virtual map VM80, and FIG. 71B illustrates a virtual map VM81. Note that, in the following description, for convenience of explanation, only the virtual map will be illustrated and described, but the virtual maps VM80 and VM81 are displayed on the display unit 11 together with real maps and task pools.

The virtual map VM80 includes "home", "convenience store", "home's nearest station", "cram school's nearest station", and "cram school" as examples of the POI. Furthermore, the virtual map VM80 includes a move icon 81 similar to the move icon 71. It is assumed that a task is set that "buy a pen" at the "convenience store" between the "home" and the "home's nearest station". Since the number of stores of the "convenience store" is large, in this example, an example is assumed in which there is a plurality of the "convenience stores" between the "home" and the "home's nearest station". Thus, in the virtual map VM80, the plurality of "convenience stores" is displayed in a convoluted manner so that the user can recognize that there is a plurality of (two in the illustrated example) "convenience stores" between the "home" and the "home's nearest station".

When movement of the user from the "home" is detected on the basis of the sensing data from the position sensor 132, the move icon 81 moves toward the right side. Note that, although not illustrated, the move icon on the real map also moves. When the user approaches a location where the task is performed, that is, the first "convenience store", the content of the virtual map changes from the virtual map VM80 to the virtual map VM81. In the virtual map VM81, the convoluted display is expanded and displayed. Specifically, the route between the "home" and the "home's nearest station" is lengthened, and details are displayed of the location where the task is performed, that is, existence of two "convenience stores" (convenience stores CA, CB) as candidates for the location where the task is performed, between the "home" and the "home's nearest station". Note that, in a case where there is a restriction on the display area of the display unit 11, illustration of some POIs (for example, "cram school") may be omitted as appropriate.

Note that, in a case where the user approaches the first "convenience store CA" on the real map, that location may be highlighted by blinking or the like.

Figure 72A:
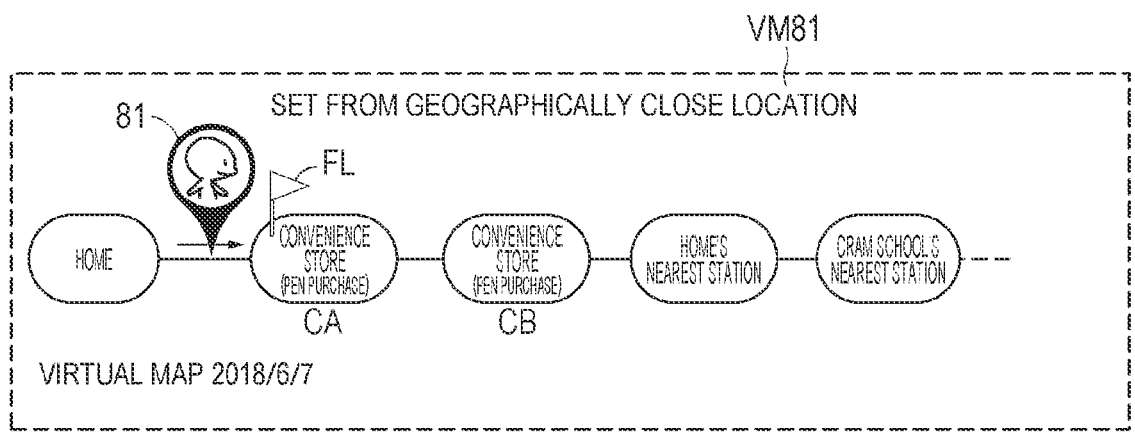
FIGS. 72A and 72B are diagrams referred to when the processing is explained of performing notification of the rescheduled task in real time in the embodiment.

In a case where there is a plurality of locations as the location where the task is performed, and setting of a specific task execution location has not been performed by the user, a geographically close location with respect to the moving direction of the user, the "convenience store CA" in this example, is set as the location where the task is performed, as illustrated in FIG. 72A. In such a case, in the virtual map VM81, a mark FL imitating a flag may be displayed at the location of the "convenience store CA" so that the user can recognize that the task can be performed at the "convenience store CA" soon.

Figure 72B:
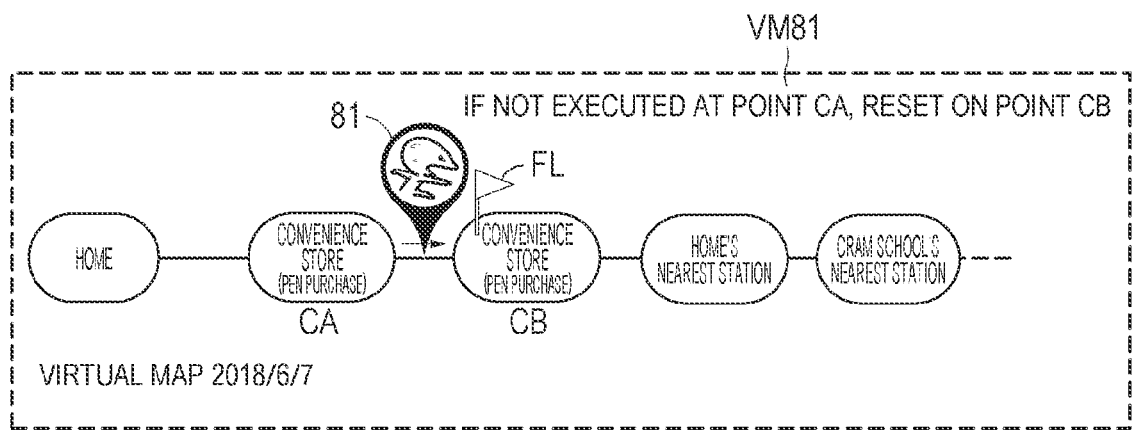

If the task is not performed in the "convenience store CA", the "convenience store CB" that is a next candidate for the task execution location is set as the task execution location. Then, the mark FL is displayed at the location of the "convenience store CB". Note that, in a case where the task has not been executed at the "convenience store CA", a facial expression of the move icon 81 may be changed as illustrated in FIG. 72B. In this case, the facial expression of the move icon 81 may change to an original facial expression when the task is executed. As described above, it becomes possible to notify in real time that the task execution location has been rescheduled. In addition to the virtual map, the location of the "convenience store CB" may be displayed as a task point on the real map. As described above, information based on the task can be updated in real time on the basis of the movement of the user. The information based on the task is information regarding a predetermined task displayed in at least one of the real map, the virtual map, or the task pool.

Figure 73A:
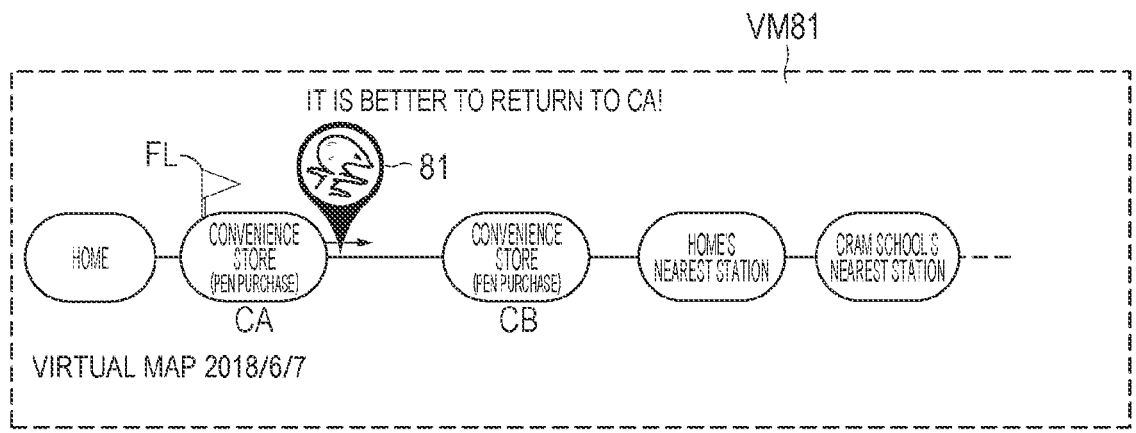
FIGS. 73A and 73B are diagrams referred to when the processing is explained of performing notification of the rescheduled task in real time in the embodiment.
Figure 73B:
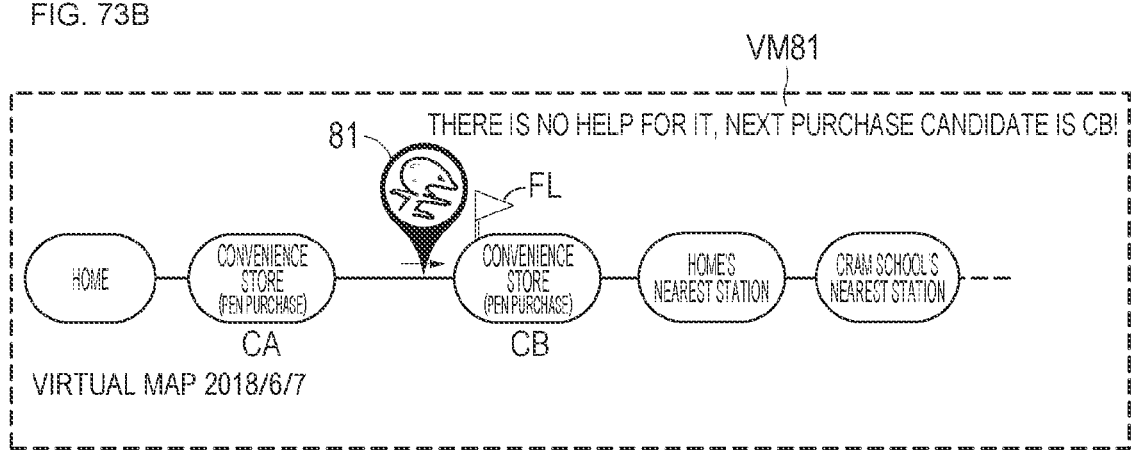

Note that, even in a case where the user passes through the "convenience store CA", it may be more efficient to return to the "convenience store CA" than to go to the "convenience store CB". In consideration of this point, even in a case where the user passes through the "convenience store CA", it is preferable that the "convenience store CA" is set as the task execution location up to a certain point (hereinafter, appropriately referred to as a turning point). Thus, as illustrated in FIG. 73A, the "convenience store CA" is continuously set as a candidate for a location where the task is performed from the time when the user passes through the "convenience store CA" without executing the task until the turning point is reached. In this case, on the display unit 11, a display may be displayed prompting the user to return to the "convenience store CA", for example, a display "It is better to return to the convenience store CA".

In a case where the user passes through the "convenience store CA" without executing the task and then crosses the turning point, it is determined that it is more efficient to perform the task at the "convenience store CB". Then, the candidate for the location where the task is performed is changed from the "convenience store CA" to the "convenience store CB". The mark FL in the virtual map VM81 is displayed in the location of the "convenience store CB". In this case, on the display unit 11, a message may be displayed indicating that the location where the task is performed has been changed, for example, a message such as "There is no help for it, the next purchase candidate is a convenience store CB!".

"Processing of Calculating Turning Point"

Here, an example will be described of processing of calculating the turning point described above. In this example, a penalty score is calculated for each candidate of the task execution location at a point where the user moves. A point where the magnitude relationship of the penalty score switches is set as the turning point. The penalty score is a score that indicates the inefficiency in a case where the user stops by the point.

Figure 74:
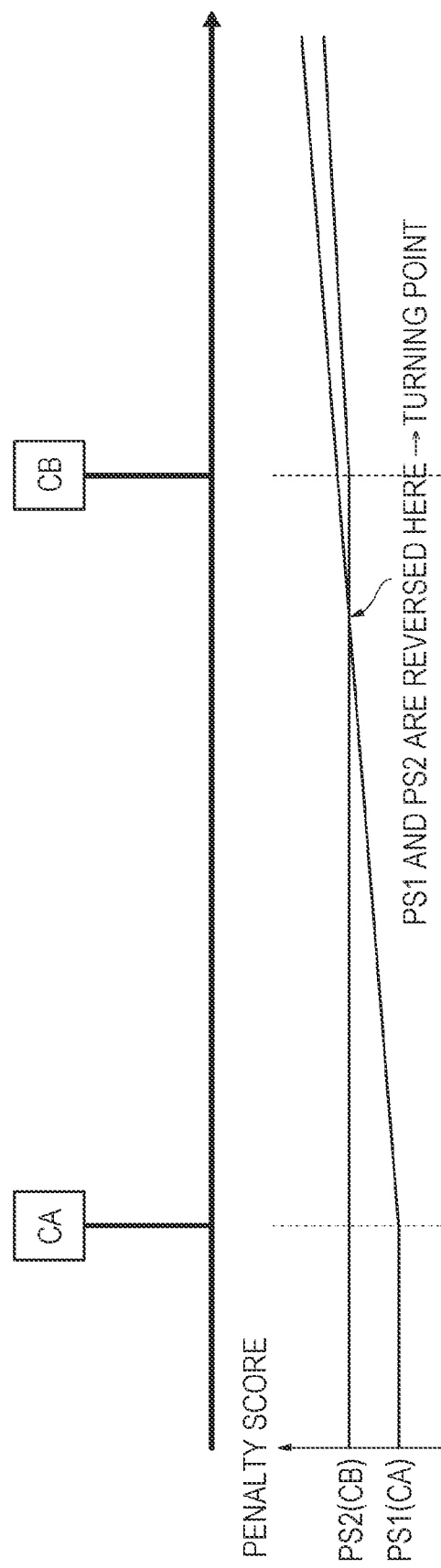
FIG. 74 is a diagram for explaining an outline of an example in which a turning point is set depending on a penalty score in the embodiment.

FIG. 74 is a diagram for explaining an outline of an example in which the turning point is set depending on the penalty score. A default penalty score is set depending on a distance from the user's departure point, for example, the "home". It is assumed that the default penalty score of the "convenience store CA" is a penalty score PS1 and the default penalty score of the "convenience store CB" is a penalty score PS2. The default penalty score is set to increase as the distance increases. Specifically, each penalty score is set so that PS1<PS2.

Briefly, the penalty scores PS1 and PS2 do not increase while the user approaches each of the "convenience store CA" and the "convenience store CB", for example, but gradually increase after the user passes through each point. As illustrated in FIG. 74, when the user passes through the "convenience store CA", the penalty score PS1 starts to increase. As the penalty score PS1 increases, the penalty scores PS1 and PS2 are reversed at a certain point, and PS1>PS2. At this point, it is determined that it is more efficient to go to the "convenience store CB" than to go to the "convenience store CA", and the candidate for the location where the task is performed is changed from the "convenience store CA" to the "convenience store CB". Note that, the penalty score is calculated every time the user moves a certain distance, for example.

Specifically, the penalty score can be obtained by the following mathematical expression (1).

[Expression 1]

$$Score_a = W_r \times R_a + W_n \times N_a + W_p \times f(P_a) \quad (1)$$

The penalty score at point x is defined by replacing a in the generalized mathematical expression (1) with x. In the mathematical expression (1),
symbols respectively indicate
Score_x: Penalty score for point x
R_x: Separation degree of point x
W_r: Separation degree weighting factor N_x: Familiarity of point x W_n: Familiarity weighting factor P_x: Number of candidate points after point x (including x)

W_p: Weighting factor for the number of candidate points.

The separation degree is defined by, for example, "distance (m)/minute". The separation degree weighting factor is a weighting factor set depending on the separation degree. The familiarity is a numerical value corresponding to the frequency of stopping by the location. The familiarity weighting factor is a weighting factor set depending on the familiarity. The weighting factor for the number of candidate points is a weighting factor set depending on the number of candidate points.

The penalty score for each of the "convenience store CA" and the "convenience store CB" is calculated using the mathematical expression (1). Then, a point where the penalty score PS1 of the "convenience store CA" is larger than the penalty score PS2 of the "convenience store CB" is set as a turning point.

Note that, each weighting factor may be a value set to be the same for all users, or may be a different value set for each user. For example, Wp in the mathematical expression (1) may be increased as the user has more "missing purchases". In the case of the example described above, the number of "messages urging the return" increases until just before arrival at the "convenience store CB point", and the deterrent to forgetting to buy increases.

A specific example using the mathematical expression (1) will be described.

In a case where a predetermined function f(x)=1/x, Pa is used as the reciprocal for score calculation.

In this case, the term "+Wp×f(Pa)" in the mathematical expression (1) is Wp/Pa, and the smaller Pa, the larger the added value. This tendency is remarkable in a case where f(x)=1(x<1), 0 (other than that).

In a case where the predetermined function f(x)=−1/x, the term "+Wp×f(Pa)" in the mathematical expression (1) is −Wp/Pa, and the smaller Pa, the smaller the score.

(Limitation of Search Target by Task Deadline)

Next, limitation of a search target by a task deadline will be described. Specifically, in a case where a deadline is set for a task, an example will be described of limiting a search range of a location where the task is performed.

First Example

Figures 75A, 75B:
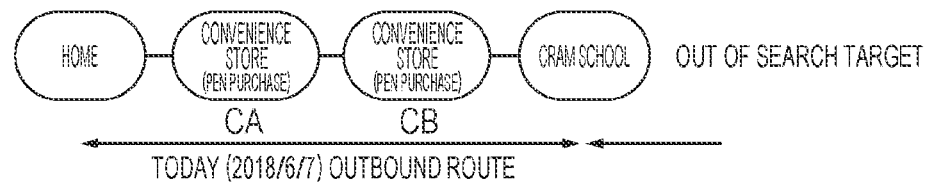
FIGS. 75A and 75B are diagrams referred to when a first example is explained of limiting a search range of a location where a task is performed in a case where a deadline is set for the task in the embodiment.

First, a first example will be described of limiting the search range of the location where the task is performed in a case where the deadline is set for the task. FIG. 75A is a diagram illustrating a task "buy a pen" and contents of properties set in the task. The task has properties with set contents that category: shopping, location category: store, convenience store, deadline: 2018 Jun. 7, importance: 1, required time: 10 minutes: comment: used at the cram school.

Here, an example is considered in which a location where a task "buy a ballpoint pen" can be performed is searched for. The search is performed by referring to the properties associated with the task. In the comment section of the properties, it says "used at the cram school". Thus, a search is performed for a task executable location existing between the "home" and the "cram school". For example, as illustrated in FIG. 75B, as the task executable location, "convenience stores" (convenience store CA, CB) are found that are scheduled to be passed today (for example, 2018 Jun. 7) and exist between the "home" and the "cram school". It is meaningless to purchase a ballpoint pen used in the "cram school" after going to the "cram school". Thus, the "convenience store" to be passed by the user on the route ahead of the "cram school" or the inbound route returning from the "cram school" to the "home", is out of a search range of the task executable location. As a result, it is possible to prevent a meaningless task executable location from being presented.

Second Example

First, a second example will be described of limiting the search range of the location where the task is performed in a case where the deadline is set for the task. FIG. 76A is a diagram illustrating a task according to the second example and properties corresponding to the task. The point different from the contents illustrated in FIG. 75A is that a content is set as "used at home" instead of "used at the cram school" as the comment. In this case, it is sufficient that a "ballpoint pen" is purchased during a period while the user heads from the "home" to the "cram school" and then returns from the "cram school" to the "home". Thus, for example, as illustrated in FIG. 76B, as the task executable location, convenience stores are found that are scheduled to be passed today (2018 Jun. 7) and exists before the user returns to the "home". Since a deadline (2018 Jun. 7) for executing the task is set, stores and convenience stores that exist on the route (or in the vicinity thereof) that are scheduled to be passed the next day are excluded from the search target.

Third Example

Figure 77A:
FIGS. 77A and 77B are diagrams referred to when a third example is explained of limiting the search range of the location where the task is performed in the case where the deadline is set for the task in the embodiment.
Figure 77B:
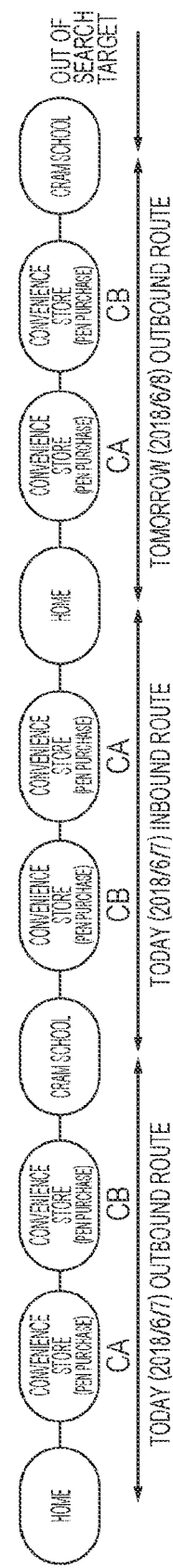

First, a third example will be described of limiting the search range of the location where the task is performed in a case where the deadline is set for the task. FIG. 77A is a diagram illustrating a task according to the third example and properties corresponding to the task. The point different from the contents illustrated in FIG. 75A is that the deadline for executing the task is set tomorrow (2018 Jun. 8) based on today (2018 Jun. 7). In this case, it is sufficient that the task "buy a ballpoint pen" is executed before arrival at the "cram school" tomorrow. Thus, as illustrated in FIG. 77B, the search targets are stores and convenience stores that exist on the route that are scheduled to be passed before tomorrow's "cram school". Note that, in the example illustrated in FIG. 77B, for convenience of explanation, the route on 2018 Jun. 8 is also set to be between the "home" and the "cram school"; however, it is not necessarily limited to this, and it may be a route that passes through another POI.

Note that, as illustrated in FIG. 78, in the first example described above, a recommended candidate for the task executable location may be presented on the basis of the penalty score described above. For example, while the calculated penalty score PS1 of the "convenience store CA" is less than or equal to the penalty score PS2 of the "convenience store CB", the "convenience store CA" is presented as a recommended location where the task is performed. For example, in a case where the calculated penalty score PS1 of the "convenience store CA" is greater than the penalty score PS2 of the "convenience store CB", thereafter the "convenience store CB" is presented as the recommended location where the task is performed.

Figure 79:
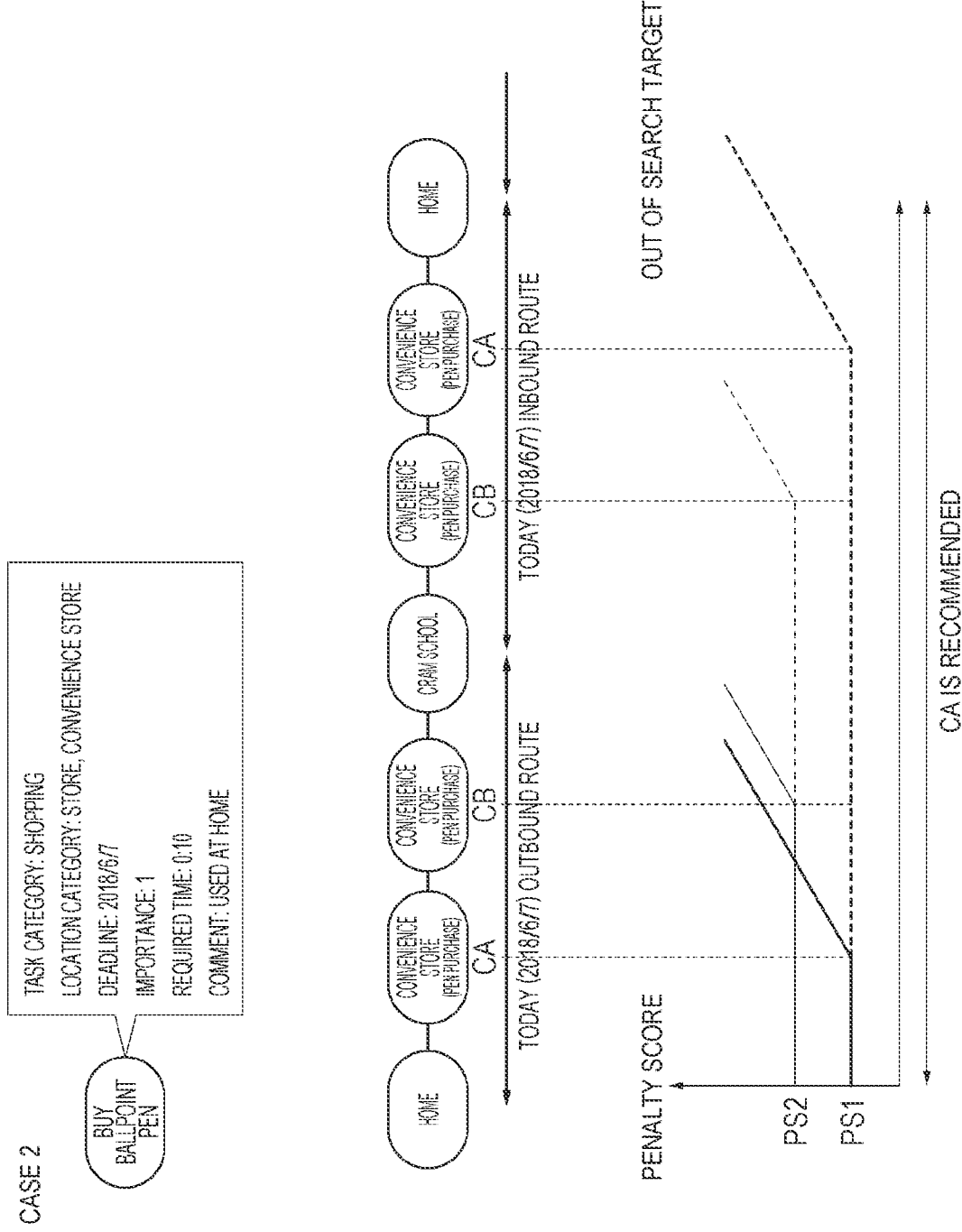
FIG. 79 is a diagram referred to when the processing is explained of presenting the recommended location where the task is performed in the embodiment.
Figure 80:
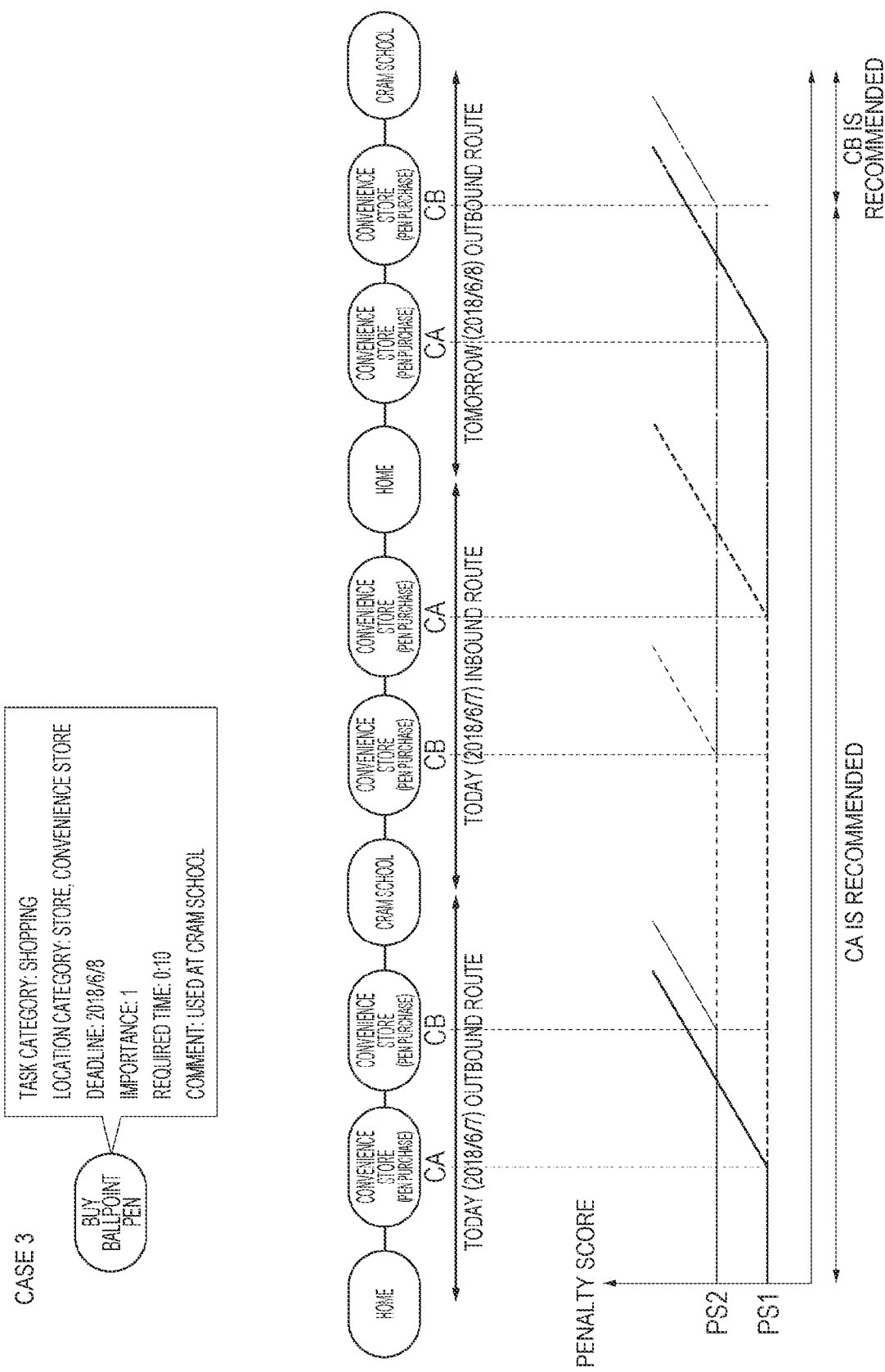
FIG. 80 is a diagram referred to when the processing is explained of presenting the recommended location where the task is performed in the embodiment.

Note that, processing of presenting a recommendation of the location where the task can be performed by using the penalty score may be performed in the second and third examples described above. FIG. 79 is a diagram for explaining the processing of presenting a recommendation of the location where the task can be performed by using the penalty score, in the second example described above. The example illustrated in FIG. 79 is an example of a restriction that a pen may be purchased at any time until returning home. In such a restriction, the "convenience store CA" with a small separation degree from the route and close to a final destination is presented as the recommended location where the task is performed. Furthermore, FIG. 80 is a diagram for explaining the processing of presenting a recommendation of the location where the task can be performed by using the penalty score, in the third example described above. The example illustrated in FIG. 80 is an example of a restriction that a pen may be purchased at any time until the second visit to the cram school. In such a restriction, the "convenience store CA" is recommended that has a small separation degree from the route for the outbound route and inbound route on June 7. However, if the pen has not been purchased when the user passes the "convenience store CA" on June 8, the "convenience store CB" is recommended as a task executable location. Note that, in a case where the penalty score from a "current location" is small, for example, in a case where a friend invites the user to a detour on the inbound route on June 7, the "convenience store CB" can be presented as a recommended location where the task is executed.

"Flow of Processing"

Figure 81:
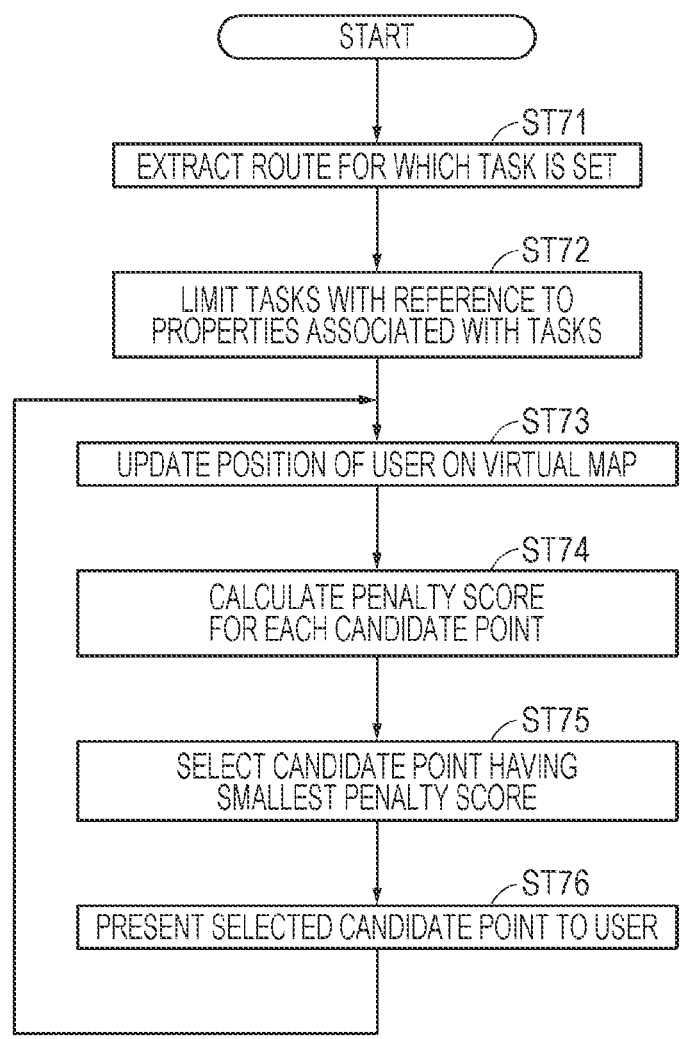
FIG. 81 is a flowchart illustrating a flow of processing of searching for a location where a task is performed and presenting a search result to a user in the embodiment.

Next, with reference to a flowchart illustrated in FIG. 81, a description will be given of a flow of processing of presenting a recommended location where a task is performed to the user.

In step ST71, a route for which the task is set is extracted. Then, the processing proceeds to step ST72.

In step ST72, a search range of the location where the task is performed is limited with reference to properties (for example, a deadline, or a purpose described in the comment section) associated with the task, and a search is performed for a candidate for the location where the task is performed within the search range. As a result, candidate points for the location where the task is performed are limited. Then, the processing proceeds to step ST73.

In step ST73, a position of the user on the virtual map is updated as the user moves. For example, as the user moves, the move icon on the virtual map moves. Then, the processing proceeds to step ST74.

In step ST74, processing of calculating a penalty score is performed for each of the plurality of candidate points where the task found in the processing of step ST72 can be performed. The processing of calculating the penalty score is performed, for example, in a case where a movement of a certain amount or more of the user is detected. Then, the processing proceeds to step ST75.

In step ST75, processing is performed of selecting a candidate point having the smallest penalty score with reference to the calculated penalty score for each candidate point. Then, the processing proceeds to step ST76.

In step ST76, processing is performed of presenting the candidate point selected in step ST75 to the user. Although it is assumed that the selected candidate point is presented by display, it may be performed by voice, presentation of data (for example, address or abbreviation) related to the location, or the like.

Figure 82:
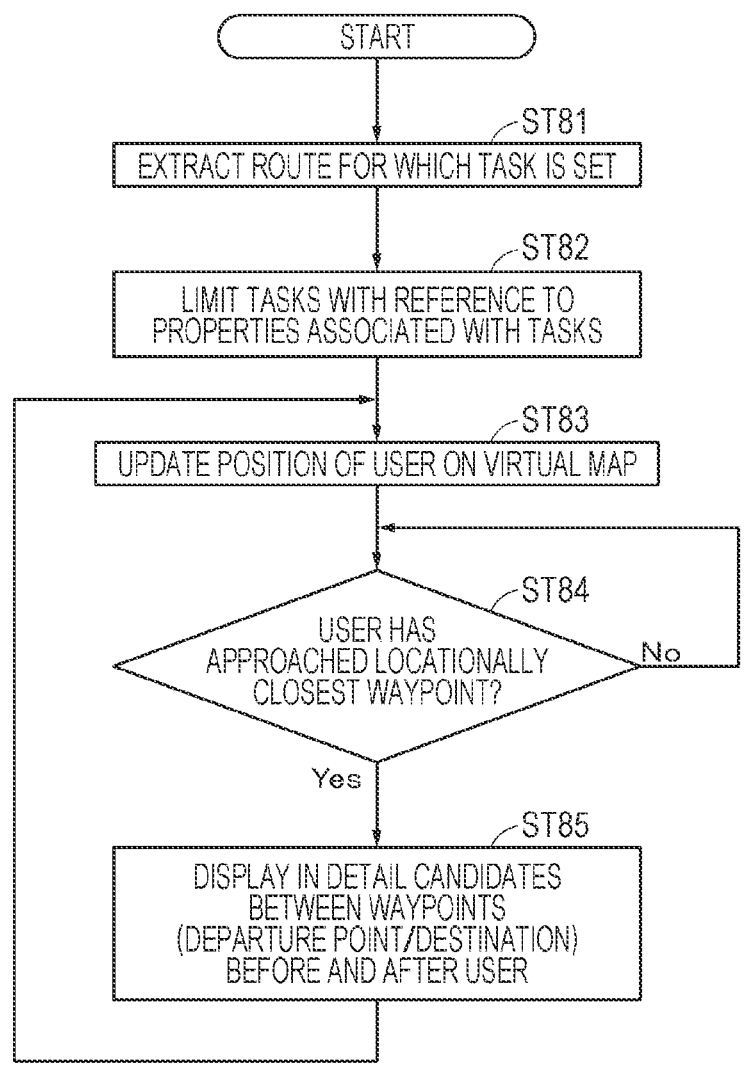
FIG. 82 is a flowchart illustrating a flow of processing of presenting detailed information of the location where the task is performed to the user.

Next, with reference to a flowchart illustrated in FIG. 82, a description will be given of a flow of processing of presenting detailed information of the location where the task is performed to the user.

In step ST81, a route for which the task is set is extracted. Then, the processing proceeds to step ST82.

In step ST82, a search range of the location where the task is performed is limited with reference to properties (for example, a deadline, or a purpose described in the comment section) associated with the task, and a search is performed for a candidate for the location where the task is performed within the search range. As a result, candidate points for the location where the task is performed are limited. Then, the processing proceeds to step ST83.

In step ST83, a position of the user on the virtual map is updated as the user moves. For example, as the user moves, the move icon on the virtual map moves. Then, the processing proceeds to step ST84.

In step ST84, it is determined whether or not the user has approached a candidate point at a location nearest to the user among the plurality of candidate points found in step ST82 (whether or not a distance between the user and the candidate point is less than or equal to a threshold value). In a case where the user has not approached the candidate point, the processing returns to step ST84. In a case where the user has approached the candidate point, the processing proceeds to step ST85.

In step ST85, details are displayed of the candidate points between waypoints (that may be the departure point or destination) before and after a route on which the user currently is. For example, a plurality of convoluted candidate points is expanded and displayed. More detailed information (for example, store name) of the candidate point, and the like may be displayed.

<Modifications>

The embodiment of the present disclosure has been specifically described above, but the contents of the present disclosure are not limited to the above-described embodiments, and various modifications can be made based on the technical idea of the present disclosure.

In the above-described embodiment, for example, altitude information may be used that is a result of three-dimensional positioning. By using the altitude information, it is possible to identify not only the user's two-dimensional position, but also, for example, whether the user is on the first floor or another floor (for example, the third floor) in the same building.

The processing in each item described in the embodiment may be performed independently or in combination with other processing.

The present disclosure can also be implemented by a device, a method, a program, a system, and the like. For example, a program that performs a function described in the above embodiment is made to be downloadable, and a device not having the function described in the embodiment downloads and installs the program, whereby the control described in the embodiment can be performed in the device. The present disclosure can also be implemented by a server that distributes such a program. Furthermore, items described in each of the embodiment and modifications can be combined as appropriate.

Note that, the contents of the present disclosure are not to be construed as being limited by the effect exemplified in the present disclosure.

The present disclosure can also adopt the following configurations.

(1)

An information processing device including
a display control unit that displays map information including a plurality of points and a route between the plurality of points, and displays at least a setting screen that enables setting of a trigger and a task to be performed in a case where the trigger is established, on the basis of a predetermined input made to the map information.

(2)

The information processing device according to (1), in which
a content of the trigger is automatically set on the basis of the predetermined input.

(3)

The information processing device according to (2), in which
the display control unit displays, on the setting screen, the content of the trigger automatically set.

(4)

The information processing device according to (2) or (3), in which
on the basis of at least one of inputs including an input for selecting a predetermined point and an input for designating a direction toward the predetermined point on the route, at least one of a trigger whose content is existence at the predetermined point, a trigger whose content is departure from the predetermined point, or a trigger whose content is arrival at the predetermined point is automatically set.

(5)

The information processing device according to (4), in which
the display control unit causes time information to be displayed on the basis of an input for movement from the predetermined point in a direction different from a route connected to the predetermined point.

(6)

The information processing device according to any of (2) to (5), in which
in a case where a plurality of routes is connected to a predetermined point, on the basis of an input for specifying a predetermined route among the plurality of routes, a trigger of a content based on the predetermined route specified is automatically set.

(7)

The information processing device according to any of (1) to (6), in which
on the basis of an input including an input from a first point toward a second point and an input for displaying time information, the display control unit displays information indicating a direction from the first point toward the second point, and displays the time information that enables a time to be set near the second point.

(8)

The information processing device according to any of (1) to (7), in which
the display control unit displays a content of a set task on the basis of an input to the map information.

(9)

The information processing device according to any of (1) to (8), in which
the task is at least one of a task set by a user oneself or a task set by another user.

(10)

The information processing device according to any of (1) to (9), in which
the display control unit hierarchically displays a content of the task.

(11)

The information processing device according to (10), in which
the display control unit limits display of a lower level layer than a predetermined layer on the basis of a predetermined condition.

(12)

The information processing device according to (10), in which
the display control unit displays information indicating the number of tasks included in a lower level layer than a predetermined layer.

(13)

The information processing device according to any of (1) to (12), in which
the display control unit displays a ratio of a task set by another user to each of the plurality of points.

(14)

The information processing device according to any of (1) to (13), in which
the display control unit displays a setting screen that enables a user to set a task set by another user as a task of the user oneself.

(15)

The information processing device according to any of (1) to (14), in which
the display control unit displays a route in which execution of a task set with use of the setting screen is prioritized.

(16)

The information processing device according to any of (1) to (15), in which
on the basis of a change of the route, the display control unit displays an execution location of a task executable on a changed route out of tasks set on the setting screen.

(17)

The information processing device according to any of (1) to (16), in which
the map information is information corresponding to an actual map or information corresponding to a virtual map based on the actual map.

(18)

The information processing device according to any of (1) to (17), in which
each of the plurality of points is either a point automatically set or a point set by a user.

(19)

An information processing method including
displaying map information including a plurality of points and a route between the plurality of points, and displaying at least a setting screen that enables setting of a trigger and a task to be performed in a case where the trigger is established, on the basis of a predetermined input made to the map information, by a display control unit.

(20)

A program causing a computer to execute an information processing method including
displaying map information including a plurality of points and a route between the plurality of points, and displaying at least a setting screen that enables setting of a trigger and a task to be performed in a case where the trigger is established, on the basis of a predetermined input made to the map information, by a display control unit.

REFERENCE SIGNS LIST

1 Smartphone
11 Display unit

12 Control unit
14 Communication unit
15 Database
VM Virtual map
RM Real map
TPO Task pool
IC1 Clock icon

The invention claimed is:

1. An information processing device, comprising a set of sensors configured to determine user position information; and
   circuitry configured to:
      control display of map information that includes a plurality of points and a route between the plurality of points, wherein the map information comprises a virtual map adapted to a log of daily actions of a first user of the information processing device;
      receive an input corresponding to the map information, wherein
         the input comprises a direction of a drag operation between a first point of the plurality of points and a second point of the plurality of points,
         the direction of the drag operation indicates a condition for a trigger corresponding to a timing of approach of the first user within a determined range of the second point,
         the timing is based on the log of the daily actions of the first user, and
         the input further comprises a selection of the second point;
      set the trigger based on the received input;
      determine that the trigger is established, wherein the determination is based on the user position information; and
      control display of a setting screen that includes the trigger and a first task, wherein the first task corresponds to a process to be performed based on the establishment of the trigger.

2. The information processing device according to claim 1, wherein the circuitry is further configured to set content of the trigger based on the received input.

3. The information processing device according to claim 2, wherein the circuitry is further configured to control display of the content of the trigger on the setting screen.

4. The information processing device according to claim 2, wherein the circuitry is further configured to set, based on at least one of inputs including an input for selecting the second point of the plurality of points or an input for designating a direction toward the second point on the route, at least one of a trigger whose content is existence at the second point, a trigger whose content is departure from the second point, or a trigger whose content is arrival at the second point.

5. The information processing device according to claim 4, wherein the circuitry is further configured to control display of time information based on an input for movement from the second point in a direction different from the route connected to the second point.

6. The information processing device according to claim 2, wherein in a case where a plurality of routes is connected to the second point, the circuitry is further configured to set the trigger based on an input for specifying the route among the plurality of routes.

7. The information processing device according to claim 1, wherein the circuitry is further configured to control, based on an input for displaying time information, display of the time information that enables a time to be set near the second point.

8. The information processing device according to claim 1, wherein the circuitry is further configured to:
   set the first task based on the received input; and
   control display of content of the set first task.

9. The information processing device according to claim 1, wherein the first task is set by the first user.

10. The information processing device according to claim 1, wherein the circuitry is further configured to:
    generate a user interface as a hierarchical structure including a plurality of layers; and
    control display of content of the first task in a specific layer of the plurality of layers.

11. The information processing device according to claim 10, wherein the circuitry is further configured to limit display of a lower level layer than the specific layer based on a specific condition.

12. The information processing device according to claim 10, wherein the circuitry is further configured to control display of information indicating a number of tasks included in a lower level layer than the specific layer.

13. The information processing device according to claim 1, wherein the circuitry is further configured to control display of a ratio of a second task set by the first user to each of the plurality of points.

14. The information processing device according to claim 1, wherein the circuitry is further configured to control display of the setting screen that enables the first user to view a second task set by a second user as a task of the first user.

15. The information processing device according to claim 1, wherein the circuitry is further configured to control display of the route in which execution of the first task is prioritized.

16. The information processing device according to claim 1, wherein
    based on a change of the route, the circuitry is further configured to control display of an execution location of a second task of a plurality of tasks,
    the second task is executable on a changed route, and
    the second task is set on the setting screen.

17. The information processing device according to claim 1, wherein the map information is one of information corresponding to an actual map or information corresponding to the virtual map based on the actual map.

18. The information processing device according to claim 1, wherein each of the plurality of points is one of a point automatically set or a point set by the first user.

19. An information processing method, comprising: in an information processing device:
    determining, by a set of sensors, user position information;
    displaying map information including a plurality of points and a route between the plurality of points, wherein the map information comprises a virtual map adapted to a log of daily actions of a user of the information processing device;
    receiving an input corresponding to the map information, wherein
       the input comprises a direction of a drag operation between a first point of the plurality of points and a second point of the plurality of points, the direction of the drag operation indicates a condition for a trigger corresponding to a timing of approach of the user within a determined range of the second point, the timing is based on the log of the daily actions of the user, and the input further comprises a selection of the second point;

setting the trigger based on the received input;

determining that the trigger is established, wherein the determination is based on the user position information; and controlling display of a setting screen that includes the trigger and a task, wherein the task corresponds to a process to be performed based on the establishment of the trigger.

20. A non-transitory computer-readable medium having stored thereon, computer-executable instructions which, when executed by a computer, cause the computer to execute operations, the operations comprising:

determining user position information;

displaying map information including a plurality of points and a route between the plurality of points, wherein the map information comprises a virtual map adapted to a log of daily actions of a user of an information processing device;

receiving an input corresponding to the map information, wherein the input comprises a direction of a drag operation between a first point of the plurality of points and a second point of the plurality of points, the direction of the drag operation indicates a condition for a trigger corresponding to a timing of approach of the user within a determined range of the second point, the timing is based on the log of the daily actions of the user, and the input further comprises a selection of the second point;

setting the trigger based on the received input;

determining that the trigger is established, wherein the determination is based on the user position information; and controlling display of a setting screen that includes the trigger and a task, wherein the task corresponds to a process to be performed based on the establishment of the trigger.

* * * * *